(12) United States Patent
Nakamura et al.

(10) Patent No.: US 8,134,972 B2
(45) Date of Patent: Mar. 13, 2012

(54) COMMUNICATION SYSTEM AND GATEWAY APPARATUS

(75) Inventors: Hitomi Nakamura, Kokubunji (JP); Masashi Yano, Kawasaki (JP); Koji Watanabe, Kawasaki (JP); Naruhito Nakahara, Yokohama (JP); Yosuke Takahashi, Yokohama (JP)

(73) Assignee: Hitachi, Ltd, Tokyo (JP)

( * ) Notice: Subject to any disclaimer, the term of this patent is extended or adjusted under 35 U.S.C. 154(b) by 707 days.

(21) Appl. No.: 12/256,902

(22) Filed: Oct. 23, 2008

(65) Prior Publication Data

US 2009/0109925 A1    Apr. 30, 2009

(30) Foreign Application Priority Data

Oct. 26, 2007 (JP) .................................. 2007-278457
Aug. 28, 2008 (JP) .................................. 2008-219213

(51) Int. Cl.
  H04W 4/00 (2009.01)
  H04W 36/00 (2009.01)
  H04L 12/28 (2006.01)
  H04L 9/00 (2006.01)
  H04L 29/06 (2006.01)
  H04L 9/32 (2006.01)
  H04K 1/00 (2006.01)
  H04M 1/66 (2006.01)

(52) U.S. Cl. .......... 370/331; 380/45; 380/247; 380/249; 455/411; 455/437; 713/155; 713/171; 370/338; 370/401

(58) Field of Classification Search .................. 370/311, 370/338, 401; 455/411, 437; 380/45, 247, 380/249; 713/155, 171
See application file for complete search history.

(56) References Cited

U.S. PATENT DOCUMENTS

| | | | |
|---|---|---|---|
| 7,421,268 B2 * | 9/2008 | Lee et al. ...................... | 455/411 |
| 7,738,871 B2 * | 6/2010 | Olvera-Hernandez et al. ............................. | 455/436 |
| 2005/0078824 A1 * | 4/2005 | Malinen et al. ............... | 380/247 |
| 2005/0166043 A1 * | 7/2005 | Zhang et al. ................... | 713/155 |
| 2007/0156804 A1 * | 7/2007 | Mo ................................ | 709/200 |
| 2007/0208864 A1 * | 9/2007 | Flynn et al. .................... | 709/227 |
| 2007/0249352 A1 * | 10/2007 | Song et al. ..................... | 455/436 |
| 2008/0159310 A1 | 7/2008 | Senga et al. | |
| 2009/0217048 A1 * | 8/2009 | Smith ........................... | 713/176 |
| 2010/0191963 A1 * | 7/2010 | Premec et al. ................. | 713/168 |

FOREIGN PATENT DOCUMENTS

JP    2006-203641    8/2006

OTHER PUBLICATIONS

3GPP2X.R0046 v0.4, Mar. 2007.

(Continued)

*Primary Examiner* — Alpus H Hsu
*Assistant Examiner* — Yee Lam
(74) *Attorney, Agent, or Firm* — Mattingly & Malur, PC

(57) ABSTRACT

A relay gateway apparatus (HandOver-Gateway (HO-GW) is provided between heterogeneous access networks (a WiMAX access network and a UMB access network). The HO-GW performs conversion of a movement control signal (an Inter-Access Gateway (AGW) handover control signal) and relay of communication data. When the relay is performed, user data from a correspondent node (CN) reaches a wireless terminal (mobile node (MN)) through a host agent (HA) of a core network, an access router ASN-GW, the HO-GW, and a base station eBS.

17 Claims, 37 Drawing Sheets

OTHER PUBLICATIONS

RFC: 3344, Aug. 2002.
RFC: 3775, Jun. 2004.
RFC: 2003, Oct. 1996.
RFC: 2784, Mar. 2000.
Gundavelli, et al, Jun. 2007, Proxy Mobile IPv6.
3GPP2 A.S0020-0 v0.4, Jul. 2007.
RFC:3748, Jun. 2004.
RFC:4187, Jan. 2006.
3GPP2 TSG-S WG4, May 2007.
3GPPTS 22.234 V8.1.0(Jun. 2007).
3GPPTS23.234 V7.5.0 (Mar. 2007).
3GPPTS 33.234 V7.50.0 (Jun. 2007).
WiMAX Forum Network Architecture—Stage 2—3GPP2-WiMAX Interworking—Release 1.1.0, Jul. 11, 2007.
WiMAX Forum Network Architecture—Stage 3—Annex: 3GPP2-WiMAX Interworking—Release 1.1.0, Jul. 11, 2007.
3GPP2 C.S0084-005-0 v1.6, May 2007.

* cited by examiner

100 WiMAX CONTEXT TABLE (HO-GW4)

| MN ID (MAC) | CONNECTION DESTINATION INFORMATION | QoS INFORMATION | AUTHENTICATION INFORMATION | DATA PATH INFORMATION | POINTER TO UMB CONTEXT | ... |
|---|---|---|---|---|---|---|
| xxx ... | BS ID, ASN-GW ID, ... | TFT, QoS CLASS ... | AK_GW, AK_BS ... | IP ADDRESS OF TUNNEL ENDPOINT (BS) AND GRE Key ... | ... | |
| | | | | | | |

FIG.3A

120 UMB CONTEXT TABLE (HO-GW4)

| MN ID (UATI) | CONNECTION DESTINATION INFORMATION | QoS INFORMATION | AUTHENTICATION INFORMATION | DATA PATH INFORMATION | POINTER TO WiMAX CONTEXT | ... |
|---|---|---|---|---|---|---|
| yyy | eBS ID, SRNC ID, ... | TFT, QoS CLASS ... | MSK_GW, MSK_eBS ... | IP ADDRESS AND OF TUNNEL ENDPOINT (eBS OR AGW) AND ENCRYPTION KEY (TSK_GW) BETWEEN HO-GW AND MN (NOTE) ... | ... | |
| ... | | | | | | |

(NOTE) ENCRYPTION KEY (TSK_GW) BETWEEN HO-GW 4 AND MN IS USED WHEN HO-GW 4 TRANSFERS USER DATA WITH METHOD SHOWN IN FIG. 8A.

FIG.3B

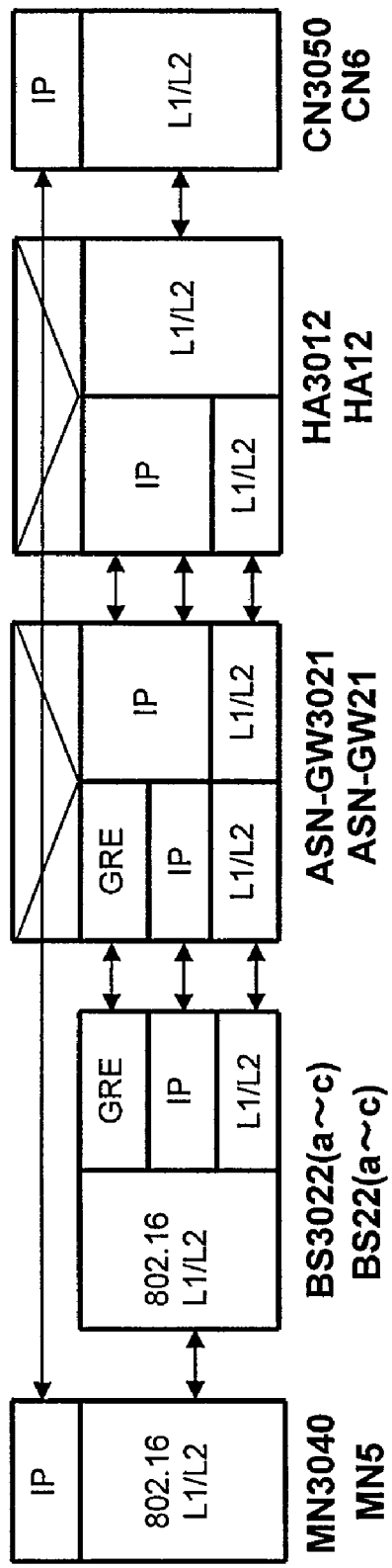
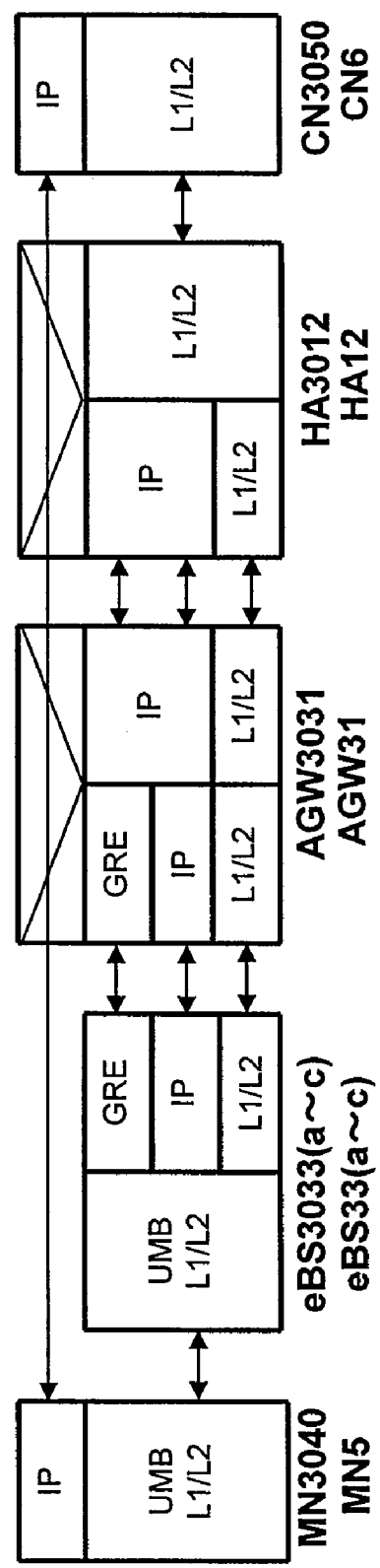
FIG. 16A
FIG. 16B

1100 WiMAX CONTEXT TABLE (HO-GW1040)

| MN ID (MAC) | CONNECTION DESTINATION INFORMATION | FLOW INFORMATION | AUTHENTICATION INFORMATION | DATA TRANSFER INFORMATION | POINTER TO LTE CONTEXT | ... |
|---|---|---|---|---|---|---|
| xxx | BS ID, ASN-GW ID, HA ID, | FLOW FILTER, QoS, ... | AK_GW, AK_BS, ... | IP ADDRESS OF TUNNEL ENDPOINT (ASN-GW AND HO-GW) AND GRE Key, ... | ... | |
| ... | | | | | | |

FIG.25A

1120 LTE CONTEXT TABLE (HO-GW1040)

| MN ID (IMSI) | CONNECTION DESTINATION INFORMATION | FLOW INFORMATION | AUTHENTICATION INFORMATION | DATA TRANSFER INFORMATION | POINTER TO WiMAX CONTEXT | ... |
|---|---|---|---|---|---|---|
| xxx | eNB ID, MME ID, SGW ID, HA ID, ... | FLOW FILTER, QoS, ... | K_eNB*, K_eNB*+, ... | IP ADDRESS OF TUNNEL ENDPOINT (eNB AND HO-GW) AND GTP TEID, ... | ... | |
| ... | | | | | | |

FIG.25B

COMMUNICATION SYSTEM AND GATEWAY APPARATUS

CLAIM OF PRIORITY

The present application claims priority from Japanese patent applications JP 2007-278457 filed on Oct. 26, 2007 and JP 2008-219213 filed on Aug. 28, 2008, the content of which is hereby incorporated by reference into this application.

BACKGROUND OF THE INVENTION

1. Field of the Invention

The present invention relates to a communication system and a gateway apparatus, and, more particularly to a communication system and a gateway apparatus that increase the speed of handover between heterogeneous access networks. The present invention relates to, for example, a technique for increasing the speed of handover between 3.9th generation mobile communication system UMB (Ultra Mobile Broadband) of 3GPP2 (3$^{rd}$ Generation Partnership Project 2) and WiMAX (Worldwide Interoperability for Microwave Access). However, the present invention is not limited to this and can be applied to various access networks.

2. Description of the Related Art

In recent years, services for seamlessly associating mobile communication networks having different coverage areas, throughputs, and communication costs are examined. As an example of systems studied in the technical field, there is a system that provides a WiMAX area with low equipment cost in a UMB area for covering a wide range and provides users in the WiMAX area with data communication at low cost.

A method of associating a UMB access network and a WiMAX access network is specified in X.P0046 of 3GPP2 (Non-Patent Document 1), "WiMAX Forum Network Architecture Stage 2: 3GPP2-WiMAX Interworking" of WiMAX Forum (Non-Patent Document 2) and "WiMAX Forum Network Architecture Stage 3 Annex: 3GPP2-WiMAX Interworking" of WiMAX Forum (Non-Patent Document 3), and the like. In these standards, a system in which respective access networks loosely associate with one another via an HA (Home Agent) of a Mobile IP (Non-Patent Documents 4 and 5) is adopted. Such an association system is referred to as Loosely Coupled Interworking.

A handover procedure between WiMAX-UMBs by the Loosely Coupled Interworking is explained with reference to FIGS. 15 to 19.

1. System Configuration

FIG. 15 is a diagram of a configuration example of a network configured by the related art. An MN (Mobile Node: mobile terminal) 3040 is a terminal that has access means to both a WiMAX access network 3020 and a UMB access network 3030. A CN (Correspondent Node: counter node) 3050 is a terminal or a server that communicates with the MN 3040.

A core network 3010 is a communication network that accommodates both the WiMAX access network 3020 and the UMB access network 3030. An AAA (Authentication Authorization Accounting) 3011 and an HA (Home Agent) 3012 are connected to the core network 3010. The AAA 3011 is a server that manages association between an identifier and authentication information of a terminal and authenticates the terminal. The HA 3012 is a node specified by the Mobile IP (Non-Patent Documents 4 and 5) and manages association between an HoA (Home Address: an IP address that does not change even if a position of the MN changes) and a CoA (Care of Address: an IP address allocated to the MN by a moving destination network) of the MN 3040. The HA 3012 converts an IP packet addressed to the HoA of the MN 3040 received from the CN 3050 into an IPinIP packet (Non-Patent Document 6) addressed to the CoA of the MN 3040 and transfers the IPinIP packet to the MN 3040 such that communication by the HoA can be continued even when the MN 3040 moves to another network. Conversely, the HA 3012 decapsulates an IPinIP packet received from the MN 3040 and transfers the IPinIP packet to the CN 3050.

BSs (Base Stations) 3022 (a to c) and an ASN-GW (Access Service Network—Gateway) 3021 are connected to the WiMAX access network 3020. The BSs 3022 (a to c) are nodes that inter-convert a WiMAX wireless signal from the MN 3040 into a wired signal and transfer the wired signal. The BSs 3022 (a to c) transmit and receive control signals and user data to and from the MN 3040 and the ASN-GW 3021.

FIG. 16A is a diagram of a protocol stack of user data in the WiMAX access network 3020. As shown in FIG. 16A, the BSs 3022 (a to c) extract an IP packet from the WiMAX wireless signal received from the MN 3040, apply GRE (Generic Routing Encapsulation) (Non-Patent Document 7) to the IP packet, and transfer the IP packet to the ASN-GW 3021. The BSs 3022 (a to c) receive a GRE packet from the ASN-GW 3021, convert the GRE packet into a WiMAX wireless signal, and transfer the WiMAX wireless signal to the MN 3040.

The ASN-GW 3021 is an access router that accommodates the MN 3040 and has a function of a PMA of the Proxy MIP (Non-Patent Document 8: a Mobile IP protocol with which a node called PMA (Proxy Mobile Agent) registers the association between the HoA and the CoA in the HA on behalf of a terminal). In other words, the ASN-GW 3021 registers an IP address thereof in the HA 3012 as the CoA on behalf of the MN 3040. The ASN-GW 3021 transmits and receives control signals and user data to and from the HA 3012 and the BSs 3022 (a to c).

As shown in FIG. 16A, the ASN-GW 3021 receives a GRE-encapsulated user packet from the BSs 3022 (a to c), converts the user packet into an IPinIP packet, and transfers the IPinIP packet to the HA 3012. The ASN-GW 3021 receives the IPinIP packet from the HA 3012, converts the IPinIP packet into a GRE packet, and transfers the GRE packet to the BSs 3022 (a to c).

eBSs (Evolved Basic Stations) 3033 (a to c), an AGW (Access Gateway) 3031, and an SRNC (Session Reference Network Controller) 3032 are connected to the UMB access network 3030. The eBSs 3033 (a to c) are nodes that inter-convert a UMB wireless signal into a wired signal and transfer the wired signal. Each of the eBSs 3033 (a to c) transmits and receives control signals to and from the MN 3040, the AGW 3031, the SRNC 3032, and the other eBS 3033 (a to c). Each of the eBSs 3033 (a to c) transmits and receives user data to and from the MN 3040, the AGW 3031, and the other eBSs 3033 (a to c).

FIG. 16B is a diagram of a protocol stack of user data in the UMB access network 3030. As shown in FIG. 16B, the eBSs 3033 (a to c) extract an IP packet from the UMB wireless signal received from the MN 3040, GRE-encapsulate the IP packet, and transfer the IP packet to the AGW 3031. The eBSs 3033 (a to c) receive a GRE packet from the AGW 3031, convert the GRE packet into a UMB wireless signal, and transfer the UMB wireless signal to the MN 3040.

The AGW 3031 is an access router that accommodates the MN 3040 and has a function of a PMA of the Proxy MIP. In other words, the AGW 3031 registers an IP address thereof in the HA 3012 as the CoA on behalf of the MN 3040. The AGW 3031 transmits and receives control signals to and from the HA 3012, the SRNC 3032, and the eBSs 3033 (a to c). The AGW 3031 transmits and receives user data to and from the HA 3012 and the eBSs 3033 (a to c).

As shown in FIG. 16B, the AGW 3031 receives a GRE-encapsulated user packet from the eBSs 3033 (a to c), converts the user packet into an IPinIP packet, and transfers the IPinIP packet to the HA 3012. The AGW 3031 receives the IPinIP packet from the HA 3012, converts the IPinIP packet into a GRE packet, and transfers the GRE packet to the eBSs 3033 (a to c).

The SRNC 3032 is a node that manages communication session information (i.e., an ID of an eBS to which a terminal is connected, an ID of an AGW, and a state of wireless connection) in the UMB access network 3030. The SRNC 3032 transmits and receives control signals to and from the eBSs 3033 (a to c) and the AGW 3031.

2. Handover Processing

FIG. 17 is a diagram of a procedure in which the MN 3040 performs handover from the WiMAX access network 3020 to the UMB access network 3030 according to the Loosely Coupled Interworking of the related art.

First, the MN 3040 is connected to only the WiMAX access network 3020 and performs data communication with the CN 3050 through the BS 3022c, the ASN-GW 3021, and the HA 3012 (3101). At this point, the MN 3040 stores a communication context of the WiMAX on a memory thereof. The communication context of the WiMAX includes at least an ID of a connected BS (the BS 3022c), QoS information for each IP flow (a filter TFT (Traffic Flow Template) for identifying the IP flow), a QoS class of each IP flow, etc.), and an encryption key for protecting wireless communication between the MN 3040 and the BS 3022c. The ID of the connected BS is acquired from an advertisement message periodically informed by the BS. The QoS information for each IP flow is set during connection to the WiMAX access network 3020 or during the start of data communication with the CN 3050. However, explanation of a setting procedure is omitted. The encryption key for protecting the wireless communication between the MN 3040 and the BS 3022c is generated in user authentication processing performed during connection to the WiMAX access network 3020 and MN-BS key exchange processing performed during connection to the BS 3022c (since these kinds of processing are performed before step 3101, these kinds of processing are not shown in FIG. 17).

A method of generating a WiMAX encryption key based on the related art is shown in FIG. 18. A procedure in which the MN 3040 and the BS 3022c generate an encryption key in a wireless section is explained below with reference to FIG. 18.

First, when the MN 3040 makes connection to the WiMAX access network 3020, user authentication by an EAP (Extensible Authentication Protocol) is performed and the AAA 3011 and the MN 3040 share an MSK (Master Session Key). The MSK is notified from the AAA 3011 to the ASN-GW 3021 in an EAP authentication process. The ASN-GW 3021 generates a PMK (Pairwise Master Key) from the MSK and stores the PMK on a memory. Thereafter, when the MN 3040 makes connection to the BS 3022c, the ASN-GW 3021 generates an AK (Authorization Key)_BS from the PMK and the ID of the BS 3022c and notifies the BS 3022c of the AK_BS. Since the AK_BS is a function of a BS ID, the AK_BS has a different value for each of the BSs. On the other hand, the MN 3040 generates the AK_BS for the BS 3022c using an algorithm set beforehand, which is the same as that for the ASN-GW 3021. At this point, the MN 3040 and the BS 3022c share the same AK_BS. The MN 3040 and the BS 3022c perform key exchange processing using the AK_BS and exchange an encryption key TEK (Transport Encryption Key)_BS in the wireless section. The generation of the encryption key (TEK_BS) in the wireless section is completed.

Referring back to FIG. 17, the explanation of the handover procedure of the related art is continued. After step 3101, the MN 3040 determines handover to the UMB access network 3030 because, for example, a wireless wave state of WiMAX is deteriorated (3102). The MN 3040 starts a connection procedure (3103 to 3111) for connection to the UMB access network 3030. The connection procedure (3103 to 3111) for connection to the UMB access network 3030 specified by Non-Patent Document 9 is explained below.

First, the MN 3040 measures a wireless wave state of the UMB access network 3030 and requests an eBS in a best wireless wave state (e.g., eBS 3033a) to make connection (3103). A connection request transmitted from the MN 3040 to the eBS 3033a includes at least a terminal ID generated by the MN 3040 at random (RATI: Random Access Terminal Identifier) and an identifier allocated to a route in the UMB access network 3030 by the MN 3040 (a route counter). The eBS 3033a receives the connection request of the MN 3040 and returns a success response. The eBS 3033a notifies the MN 3040 of an ID of an SRNC (the SRNC 3032) to which the MN 3040 should make connection.

The MN 3040 requests the SRNC (the SRNC 3032), the ID of which is notified in step 3103, to make connection (3104). The connection request transmitted to the SRNC 3032 by the MN 3040 includes at least the RATI generated by the MN 3040 and the route counter for identifying a route to the SRNC 3032. The SRNC 3032 returns a success response to the MN 3040 and allocates a unicast ID (UATI: Unicast Access Terminal Identifier) to the MN 3040.

Subsequently, EAP-AKA (Extensible Authentication Protocol Method for $3^{rd}$ Generation Authentication and Key Agreement) authentication (Non-Patent Documents 10 and 11) is performed (3105). As a result of the EAP-AKA authentication, the MN 3040 and the SRNC 3032 share the MSK and MN-SRNC key exchange is performed between the MN 3040 and the SRNC 3032 (3106). Parameters related to the MN-SRNC key exchange are explained with reference to FIG. 19 later. As a result of the key exchange, an encryption key (TSK_SRNC (see FIG. 19, explained later)) for protecting communication between the MN 3040 and the SRNC 3032 is generated. Thereafter, wireless data link setting and the like between the MN 3040 and the SRNC 3032 are performed in a message protected by the encryption key (TSK_SRNC) (3107).

The SRNC 3032 notifies the eBS 3033a of UMB connection information (an ID of the AGW 3031) and UMB authentication information (a parameter MSK_eBS generated from the MSK (see FIG. 19, explained later) (3108). The eBS 3033a performs key exchange with the MN 3040 using the UMB authentication information (the MSK_eBS) and generates an encryption key (TSK_eBS (see FIG. 19, explained later) for protecting communication between the MN 3040 and eBS 3033a (3109).

A method of generating a UMB encryption key based on the related art is shown in FIG. 19. Parameters treated in the key exchange processing (steps 3106 and 3109 shown in FIG. 17) between the MN 3040 and the SRNC 3032 and between the MN 3040 and the eBS 3033a are explained below with reference to FIG. 19. (Details of the key exchange processing explained below are specified in Non-Patent Documents 12 and 13). First, in the EAP-AKA authentication in step 3105 shown in FIG. 17, the AAA 3011 and the MN 3040 share an MSK (Master Session Key)_SRNC. The MSK_SRNC is notified from the AAA 3011 to the SRNC 3032 in an EAP-AKA authentication process. The MN 3040 and the SRNC 3032 generate a PMK (Pairwise Master Key)_SRNC from the MSK_SRNC using the same algorithm set beforehand and perform the MN-SRNC key exchange processing (step 3106 shown in FIG. 17) using the PMK_SRNC. As a result of the MN-SRNC key exchange processing, an encryption key TSK (Transient Session Key)_SRNC for protecting communication between the SRNC 3032 and the MN 3040 is generated.

Thereafter, in step 3108 shown in FIG. 17, the SRNC 3032 notifies the eBS 3033a of a route counter for identifying a route to the eBS 3033a and the parameter MSK_eBS generated from the MSK_SRNC. Since the MSK_eBS is a function of the route counter for identifying a route in the UMB access network, the MSK_eBS has a different value for each of the eBSs. The eBS 3033a generates a PMK_eBS from the MSK_eBS using the shared algorithm set beforehand in the same manner as the SRNC 3032 and performs the key exchange processing (step 3109 shown in FIG. 17) with the eBS 3033a using the PMK_eBS. As a result, an encryption key (TSK_eBS) for protecting communication between the MN 3040 and the eBS 3033a is generated.

Referring back to FIG. 17, the explanation of the handover procedure based on the related art is continued. After the key exchange (step 3109) between the MN 3040 and the eBS 3033a, the MN 3040 and the eBS 3033a perform setting of a wireless data link in a message protected by the encryption key (TSK_eBS) (3110). Finally, GRE tunnel setting between the eBS 3033a and the AGW 3031, IPinIP tunnel setting between the AGW 3031 and the HA 3012, and IP address allocation from the AGW 3031 to the MN 3040 are performed (3111) and the connection to the UMB access network 3030 is completed. After this, the MN 3040 performs data communication with the CN 3050 through the eBS 3033a, the AGW 3031, and the HA 3012 (3112). The handover procedure based on the related art is completed.

As an example of other systems that perform association between heterogeneous access networks according to the Loosely Coupled Interworking, there is an association system of W-CDMA (Wideband Code Division Multiple Access) and a WLAN (Wireless Local Area Network) specified in Non-Patent Documents 14 to 16. In handover between the W-CDMA and the WLAN, as in the handover between the WiMAX and the UMB explained above, switching of a data path is performed after processing for connection to an access network at a moving destination is completed.

As an invention for increasing the speed of the handover between the W-CDMA and the WLAN, JP-A-2006-203641 is disclosed. In JP-A-2006-203641, a packet control apparatus (SGSN: Serving GPRS Support Node) of the W-CDMA and mobile network packet relay apparatus (GGSN: Gateway GPRS Support Node) perform setting of an IP address, change of a data path, and an increase in the speed of re-authentication processing by housing WLAN relay apparatuses (WAG: WLAN Access Gateway) of the WLAN as well.

Patent Document 1: JP-A-2006-203641
Non Patent Document 1: 3GPP2 X.P0046-0 v0.4, TEF: Technology Evolution Framework, Sec.7, Sec.9
Non Patent Document 2: WiMAX Forum Network Architecture -Stage2-3GPP2-WiMAX Interworking-Release1.1.0
Non Patent Document 3: WiMAX Forum Network Architecture -Stage3-Annex: 3GPP2-WiMAX Interworking-Release1.1.0
Non Patent Document 4: IETF RFC3344, IP Mobility Support for IPv4
Non Patent Document 5: IETF RFC3775, Mobility Support in IPv6
Non Patent Document 6: IETF RFC2003, IP Encapsulation within IP
Non Patent Document 7: IETF RFC2784, Generic Routing Encapsulation (GRE)
Non Patent Document 8: IETF draft-ietf-netlmm-proxymip6-01, Proxy Mobile Ipv6, http://www.ietf.org/internet -drafts/draft-ietf-netlmm-proxymip6-01.txt
Non Patent Document 9: 3GPP2 A.S0020-0 v0.4, Interoperability Specification (IOS) for Ultra Mobile Broadband (UMB) Radio Access Network Interfaces, Sec. 3.1.1
Non Patent Document 10: IETF RFC3748, Extensible Authentication Protocol (EAP)
Non Patent Document 11: IETF RFC4187, Extensible Authentication Protocol Method for $3^{rd}$ Generation Authentication and Key Agreement (EAP-AKA)
Non Patent Document 12: 3GPP C.S0084-005-0 v1.6, Security Functions for Ultra Mobile Broadband (UMB) Air Interface Specification Sec. 4
Non Patent Document 13: 3GPP2 S40-20070618-007R7 UMB Access Authentication Architecture
Non Patent Document 14: 3GPP TS22.234, Requirements on 3GPP system to Wireless Local Area Network (WLAN) interworking
Non Patent Document 15: 3GPP TS23.234, 3GPP system to Wireless Local Area Network (WLAN) interworking; System description
Non Patent Document 16: 3GPP TS33.234, 3G security; Wireless Local Area Network (WLAN) inteworking security

SUMMARY OF THE INVENTION

When the handover between the heterogeneous access networks is performed by the Loosely Coupled Interworking explained above, a data path cannot be switched until connection processing to a moving destination access network is completed. Therefore, it is likely that disconnection occurs in applications such as an IP telephone, a video conference, and moving image distribution. In particular, in the EPA authentication processing (or the EAP-AKA authentication processing) performed during the connection processing to the moving destination access network, since communication is performed with the AAA of the core network, time in second units is required depending on a condition.

When an apparatus of a first access network directly accommodates an apparatus of a second access network as disclosed in JP-A-2006-203641, since an access gateway for performing processing such as accounting is shared, it is difficult to apply the gateway between access networks of different communication carriers.

The invention has been devised in view of the background explained above and it is an object of the present invention to increase the speed of switching of a data path during handover between heterogeneous access networks while securing independency of respective access networks.

In order to solve the problem, in the present invention, an HO-GW (HandOver-Gateway) is provided between the heterogeneous access networks. An Inter-AGW handover procedure (a handover procedure involving a change of an AGW) in the first access network is converted into an Inter-AGW handover procedure in the second access network to relay the handover procedure. In the Inter-AGW handover procedure of the UMB and the WiMAX, time-consuming processing such as EAP authentication (or EAP-AKA authentication) is performed after a data path is switched to a base station at a moving destination. Therefore, compared with the Loosely Coupled Interworking, it is possible to switch the data path at high speed.

Relay processing performed by the HO-GW includes relay processing for control signals and relay processing for communication data. In the relay processing for control signals, a communication context of the second access network is generated from a communication text (i.e., QoS information and authentication parameters used for generation of an encryption key) of the first access network and set in the second access network. In the relay processing for communication data, user data received from the first access network is converted into a format for the second access network and transferred.

A communication system according to the present invention includes a terminal having connecting means for at least two different mobile communication networks, a first mobile communication network that accommodates the terminal, a second mobile communication network that accommodates the terminal, and a gateway apparatus connected to the first mobile communication network and the second mobile communication network.

The gateway apparatus relays, when the terminal moves from the first mobile communication network to the second mobile communication network, a movement control signal received from the first mobile communication network to the second mobile communication network and transfers communication data received from the first mobile communication network to the second mobile communication network.

The gateway apparatus can generate a communication context in the second mobile communication network on the basis of a communication context included in the movement control signal received from the first mobile communication network and transfer the generated communication context to the second mobile communication network.

The communication context relayed by the gateway apparatus can include, for example, at least one of transfer filter information, QoS information, and an encryption key.

The movement control signal can include, for example, a control signal for transferring the communication context in the first or second mobile communication network and a control signal for setting a transfer route for the communication data.

According to the first solving means of the present invention, there is provided a communication system comprising:

a first access network including plural first base stations that inter-convert a first wireless signal from a wireless terminal into a wired signal and transfer the wired signal, and a first access router that accommodates the first base stations;

a second access network including plural second base stations that inter-convert a second wireless signal of a communication format different from that of the first wireless signal from the wireless terminal into a wired signal and transfer the wired signal, and a second access router that accommodates the second base stations, the second access network adopting a communication format different from that of the first access network;

a wireless terminal that can access both the first access network and the second access network, which are heterogeneous access networks; and a gateway apparatus that accommodates both the first access router of the first access network and the second access router of the second access network, accommodates at least one of the first base stations and at least one of the second base stations, and inter-converts, when the wireless terminal moves between the first access network and the second access network, a handover procedure in the first access network and a handover procedure in the second access network and relays the handover procedures, wherein when the wireless terminal is connected to only the first access network and performs communication with a communication destination apparatus through the first base stations, the first access router, and the core network, the core network and the wireless terminal share an encryption key MSK according to user authentication and the wireless terminal stores first communication context information and an ID of the gateway apparatus, when the wireless terminal moves to the second access network side and determines handover to the second access network, the wireless terminal transmits a connection request for the handover including an ID of the wireless terminal, a data path between the first access router and the gateway apparatus is set by an encryption key AK_GW for protecting communication between the core network and the first access router, the encryption key AK_GW being generated by the first access router on the basis of the MSK received from the core network, data paths between the gateway apparatus and the second base stations are set by an encryption key MSK_eBS or K_eNB*+ for protecting communication between the gateway apparatus and the second base stations, the encryption key MSK_eBS or K_eNB*+ being generated by the gateway apparatus on the basis of the AK_GW transmitted from the first access router, the wireless terminal and the second base stations perform wireless data link setting on a protected communication path using an encryption key TSK_eBS or an encryption key for wireless protection for protecting communication between the wireless terminal and the second base stations, the encryption key TSK_eBS or the encryption key for wireless protection being generated by the second base stations on the basis of the MSK_eBS or the K_eNB*+ received from the gateway apparatus, and the TSK_eBS or the encryption key for wireless protection generated by the wireless terminal on the basis of the MSK or authentication information subjected to key exchange with the second base stations, the wireless terminal performs communication with the communication destination apparatus through the core network, the first access router, the gateway apparatus, and the second base stations, and thereafter, the wireless terminal performs user authentication with the second access network and executes the handover to the second access network.

According to the second solving means of the present invention, there is provided a communication system comprising:

a first access network including plural first base stations that inter-convert a first wireless signal from a wireless terminal into a wired signal and transfer the wired signal, and a first access router that accommodates the first base stations;

a second access network including plural second base stations that inter-convert a second wireless signal of a communication format different from that of the first wireless signal from the wireless terminal into a wired signal and transfer the wired signal, and a second access router that accommodates the second base stations, the second access network adopting a communication format different from that of the first access network;

a wireless terminal that can access both the first access network and the second access network, which are heterogeneous access networks; and a gateway apparatus that accommodates both the first access router of the first access network and the second access router of the second access network, accommodates at least one of the first base stations and at least one of the second base stations, and inter-converts, when the wireless terminal moves between the first access network and the second access network, a handover procedure in the first access network and a handover procedure in the second access network and relays the handover procedures, wherein when the wireless terminal is connected to the second access network and performs data communication with a communication destination apparatus through the second base stations, the second access network, and the core network, the wireless terminal and the core network share an encryption key MSK_SRNC or K_ASME according to user authentication and, when the wireless terminal moves to the first access network side and determines handover to the first access network, the wireless terminal transmits a connection request for the handover including an ID of the wireless terminal, a data path between the second access router and the gateway apparatus is set by an encryption key MSK_GW or K_eNB* for protecting communication between the second access router and the gateway apparatus, the encryption key MSK_GW or K_eNB* being generated by the second access router on the basis of the MSK_SRNC or the K_ASME received from the core network, data paths between the gateway apparatus and the first base stations are set by an encryption key AK_BS for protecting communication between the gateway apparatus and the first base stations, the encryption key AK_BS being generated by the gateway apparatus on the basis of the MSK_GW or the K_eNB* received from the second access router, the wireless terminal and the first base stations perform wireless data link setting on a protected communication path using an encryption key TEK_BS for protecting communication between the wireless terminal and the first base stations, the encryption key TEK_BS being generated by the first base stations on the basis of the AK_BS received from the gateway apparatus, and the TEK_BS generated by the wireless terminal on the basis of the MSK_SRNC or the K_ASME or authentication information subjected to key exchange with the first base stations, the wireless terminal performs communication with the communication destination apparatus through the first base stations, the gateway apparatus, the second access router, and the core network, and thereafter, the wireless terminal performs user authentication with the first access network and executes the handover to the first access network.

According to the third solving means of the present invention, there is provided a gateway apparatus comprising:

the gateway apparatus that is connected to a first access network including plural first base stations that inter-convert a first wireless signal from a wireless terminal into a wired signal and transfer the wired signal, and a first access router that accommodates the first base stations;

the gateway apparatus that is connected to a second access network including plural second base stations that inter-convert a second wireless signal of a communication format different from that of the first wireless signal from the wireless terminal into a wired signal and transfer the wired signal, and a second access router that accommodates the second base stations, the second access network adopting a communication format different from that of the first access network;

the gateway apparatus that accommodates both the first access router of the first access network and the second access router of the second access network, accommodates at least one of the first base stations and at least one of the second base stations;

the gateway apparatus that inter-converts, when a wireless terminal, the wireless terminal that can access both the first access network and the second access network, which are heterogeneous access networks, moves between the first access network and the second access network, a handover procedure in the first access network and a handover procedure in the second access network and relays the handover procedures, wherein when the wireless terminal moves from the first access network to the second access network side and determines handover to the second access network, the gateway apparatus receives an encryption key AK_GW for protecting communication between the core network and the first access router, the encryption key AK_GW being generated on the basis of an encryption key MSK shared by the core network and the wireless terminal according to user authentication, the MSK received from the core network, and sets a data path between the first access router and the gate way apparatus by the AK_GW, the gateway apparatus sends an encryption key MSK_eBS or K_eNB*+ for protecting communication between the gateway apparatus and the second base stations, the encryption key MSK_eBS or K_eNB*+ being generated by the gateway apparatus on the basis of the AK_GW transmitted from the first access router to the second base station, and sets data paths between the gateway apparatus and the second base stations by MSK_eBS or K_eNB*+, the wireless terminal and the second base stations perform wireless data link setting on a protected communication path using an encryption key TSK_eBS or an encryption key for wireless protection for protecting communication between the wireless terminal and the second base stations, the encryption key TSK_eBS or the encryption key for wireless protection being generated by the second base stations on the basis of the MSK_eBS or the K_eNB*+ received from the gateway apparatus, and the TSK_eBS or the encryption key for wireless protection generated by the wireless terminal on the basis of the MSK or authentication information subjected to key exchange with the second base stations, the wireless terminal performs communication with the communication destination apparatus through the core network, the first access router, the gateway apparatus, and the second base stations, and thereafter, the wireless terminal performs user authentication with the second access network and executes the handover to the second access network.

According to the fourth solving means of the present invention, there is provided a gateway apparatus comprising:

the gateway apparatus that is connected to a first access network including plural first base stations that inter-convert a first wireless signal from a wireless terminal into a wired signal and transfer the wired signal, and a first access router that accommodates the first base stations;

the gateway apparatus that is connected to a second access network including plural second base stations that inter-convert a second wireless signal of a communication format different from that of the first wireless signal from the wireless terminal into a wired signal and transfer the wired signal, and a second access router that accommodates the second base stations, the second access network adopting a communication format different from that of the first access network;

the gateway apparatus that accommodates both the first access router of the first access network and the second access router of the second access network, accommodates at least one of the first base stations and at least one of the second base stations;

the gateway apparatus that inter-converts, when a wireless terminal, the wireless terminal that can access both the first access network and the second access network, which are heterogeneous access networks, moves between the first access network and the second access network, a handover procedure in the first access network and a handover procedure in the second access network and relays the handover procedures, wherein when the wireless terminal moves to the first access network side and determines handover to the first access network, the gateway apparatus receives an encryption key MSK_GW or K_eNB* for protecting communication between the second access router and the gateway apparatus, the encryption key MSK_GW or K_eNB* being generated on the basis of an encryption key MSK_SRNC or K_ASME shared by the core network, the wireless terminal and the core network according to user authentication, the MSK_SRNC or the K_ASME received from the core network, and sets a data path between the second access router and the gateway apparatus is set by MSK_GW or the K_eNB*, the gateway apparatus sends an encryption key AK_BS for protecting communication between the gateway apparatus and the first base stations, the encryption key AK_BS being generated by the gateway apparatus on the basis of the MSK_GW or the K_eNB* received from the second access router, to the first base station, and sets data paths between the gateway apparatus and the first base stations by the AK_BS, the wireless terminal and the first base stations perform wireless data link setting on a protected communication path using an encryption key TEK_BS for protecting communication between the wireless terminal and the first base stations, the encryption key TEK_BS being generated by the first base stations on the basis of the AK_BS received from the gateway apparatus, and the TEK_BS generated by the wireless terminal on the basis of the MSK_SRNC or the K_ASME or authentication information subjected to key exchange with the first base stations, the wireless terminal performs communication with the communication destination apparatus through the first base stations, the gateway apparatus, the second access router, and the core network, and thereafter, the wireless terminal performs user authentication with the first access network and executes the handover to the first access network.

According to the present invention, it is possible to increase the speed of switching of a data path during handover between heterogeneous access networks while securing independency of respective access networks.

DESCRIPTION OF THE DRAWINGS

FIG. 3A is a diagram of an example of the structure of a WiMAX context table 100 included in the HO-GW 4;

FIG. 3B is a diagram of an example of the structure of a UMB context table 120 included in the HO-GW 4;

FIG. 16A is a diagram of a protocol stack of data transfer of a WiMAX access network based on the related art;

FIG. 16B is a diagram of a protocol stack of data transfer of a UMB access network based on the related art;

FIG. 25A is a diagram of an example of the structure of a WiMAX context table included in the HO-GW 1040;

FIG. 25B is a diagram of an example of the structure of a LTE context table included in the HO-GW 1040;

DETAILED DESCRIPTION OF THE INVENTION

Embodiments of the present invention are explained below with reference to the accompanying drawings.

I. First Embodiment

1. System Configuration

Figure 1:
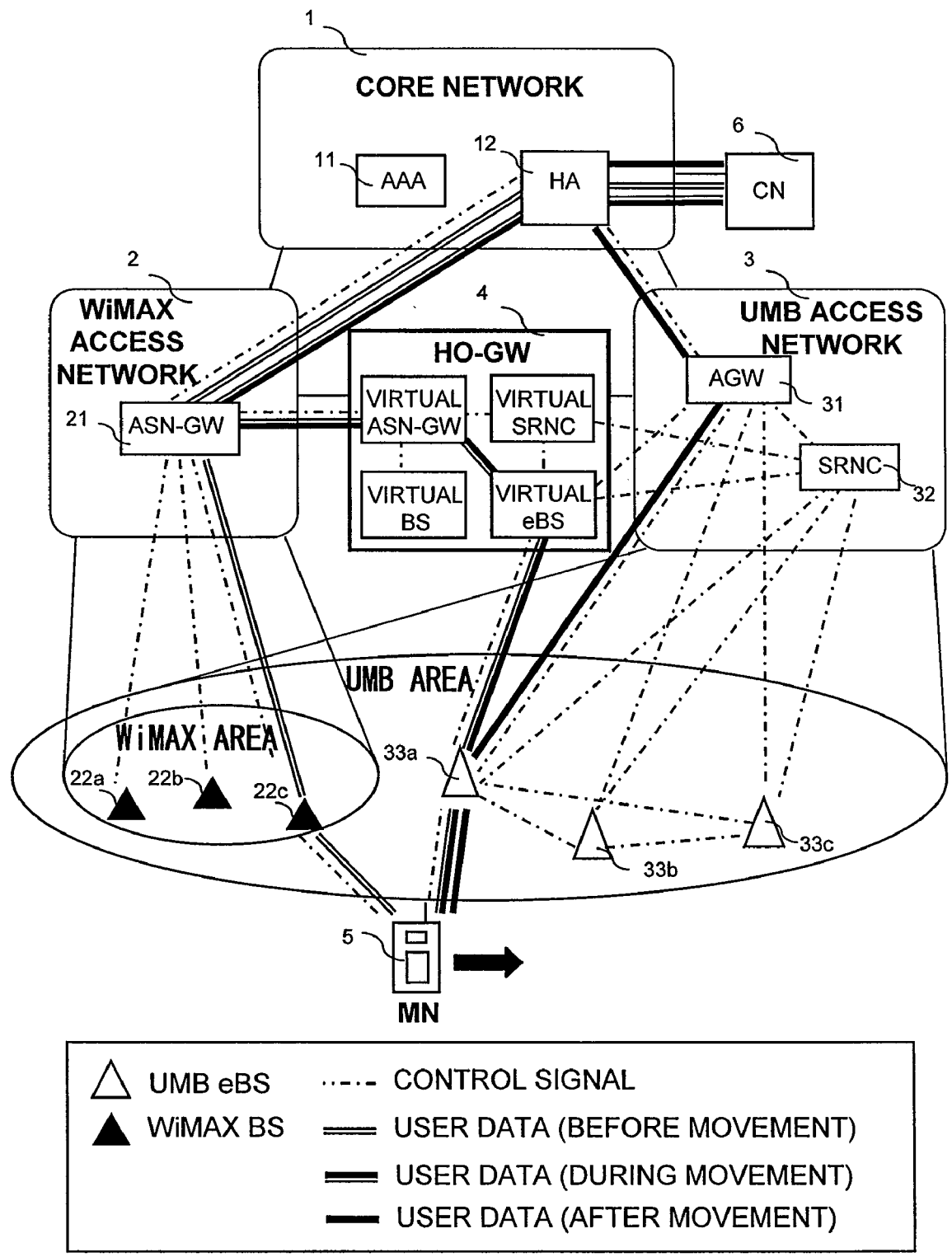
FIG. 1 is a diagram of a configuration example of a communication network and handover from a WiMAX to a UMB according to an embodiment of the present invention.

FIG. 1 is a diagram of a configuration example of a communication network according to an embodiment of the present invention.

A wireless terminal MN 5 is a terminal that has access means to both a WiMAX access network 2 and a UMB access network 3. A communication destination apparatus CN 6 is a terminal or a server that performs communication with the MN 5.

A core network 1 is a communication network that accommodates both the WiMAX access network 2 and the UMB access network 3. A server AAA 11 and a node HA 12 are connected to the core network 1. The AAA 11 is a server that manages association between an identifier and authentication information of a terminal and authenticates the terminal. The HA 12 is a node specified by the Mobile IP and manages association between an HoA and a CoA of the MN 5. The HA 12 converts an IP packet address to the HoA of the MN 5 received from the CN 6 into an IPinIP packet addressed to the CoA of the MN 5 and transfers the IPinIP packet to the MN 5 such that communication by the HoA can be continued even when the MN 5 moves to another network. Conversely, the HA 12 encapsulates the IPinIP packet received from the MN 5 and transfers the IPinIP packet to the CN 6.

Nodes (base stations) BSs 22 (a to c) and an access router ASN-GW 21 are connected to the WiMAX access network 2. The BSs 22 (a to c) are nodes that inter-convert a WiMAX wireless signal into a wired signal and transfer the wired signal. The BSs 22 (a to c) transmit and receive control signals and user data to and from the MN 5 and the ASN-GW 21.

FIG. 16A is a diagram of a protocol stack of user data in the WiMAX access network 2. As shown in FIG. 16A, the BSs 22 (a to c) extract an IP packet from the WiMAX wireless signal received from the MN 5, GRE-encapsulate the IP packet, and transfer the IP packet to the ASN-GW 21. The BSs 22 (a to c) receive a GRE packet from the ASN-GW 21, convert the GRE packet into the WiMAX wireless signal, and transfer the WiMAX wireless signal to the MN 5.

The ASN-GW 21 is an access router that accommodates the MN 5 and has a function of a PMA of the Proxy MIP. In other words, the ASN-GW 21 registers an IP address thereof in the HA 12 as the CoA on behalf of the MN 5. The ASN-GW 21 transmits and receives control signals and user data to and from the HA 12 and the BSs 22 (a to c).

As shown in FIG. 16A, the ASN-GW 21 receives a GRE-encapsulated user packet from the BS 22 (a to c), converts the user packet into an IPinIP packet, and transfers the IPinIP packet to the HA 12. The ASN-GW 21 receives the IPinIP packet from the HA 12, converts the IPinIP packet into a GRE packet, and transfers the GRE packet to the BSs 22 (a to c).

Nodes (base stations) eBSs 33 (a to c), an access router AGW 31, and a node SRNC 32 are connected to the UMB access network 3. The eBSs 33 (a to c) are nodes that inter-convert a UMB wireless signal into a wired signal and transfer the wired signal. Each of the eBSs 33 (a to c) transmits and receives control signals to and from the MN 5, the AGW 31, the SRNC 32, and the other eBS 33 (a to c). Each of the eBSs 33 (a to c) transmits and receives user data to and from the MN 5, the AGW 31, and the other eBSs 33 (a to c).

FIG. 16B is a diagram of a protocol stack of user data in the UMB access network 3. As shown in FIG. 16B, the eBSs 33 (a to c) decrypt the UMB wireless signal received from the MN 5, extract the IP packet, GRE-encapsulate the IP packet, and transfer the IP packet to the AGW 31. The eBSs 33 (a to c) receive the GRE packet from the AGW 31, convert the GRE packet into the UMB wireless signal, and transfers the UMB wireless signal to the MN 5.

The AGW 31 is an access router that accommodates the eBSs 33 (a to c) and has a function of a PMA of the Proxy MIP. In other words, the AGW 31 registers an IP address thereof in the HA 12 as the CoA on behalf of the MN 5. The AGW 31 transmits and receives control signals to and from the HA 12, the SRNC 32, and the eBSs 33 (a to c). The AGW 31 transmits and receives user data to and from the HA 12 and the eBSs 33 (a to c).

As shown in the diagram of the protocol stack in FIG. 16B, the AGW 31 receives a GRE-encapsulated user packet from the eBSs 33 (a to c), converts the user packet into an IPinIP packet, and transfers the IPinIP packet to the HA 12. The AGW 31 receives the IPinIP packet from the HA 12, converts the IPinIP packet into a GRE packet, and transfers the GRE packet to the eBSs 33 (a to c).

The SRNC 32 is a node that manages communication session information (i.e., an ID of an eBS to which a terminal is connected, an ID of an AGW, a state of wireless connection, etc.) in the UMB access network 3. The SRNC 32 transmits and receives control signals to and from the eBSs 33 (a to c) and the AGW 31.

HO-GW 4

The HO-GW 4 is a gateway apparatus connected to both the WiMAX access network 2 and the UMB access network 3. When the MN 5 moves between the WiMAX access network 2 and the UMB access network 3, the HO-GW 4 inter-converts an Inter-AGW handover procedure in the WiMAX access network 2 and an Inter-AGW handover procedure in the UMB access network 3 and relays the handover procedure.

The HO-GW 4 behaves, for the WiMAX access network 2, as a virtual ASN-GW and a virtual WiMAX BS. In other words, the HO-GW 4 makes connection to the ASN-GW 21 through an ASN-GW interface (an R4 interface of the WiMAX) and transmits and receives control signals and user data to and from the ASN-GW 21. The HO-GW 4 behaves, for the UMB access network 3, as a virtual SRNC and a virtual eBS. In other words, the HO-GW 4 makes connection to the SRNC 32 though an SRNC interface (a U4 interface of the UMB) and transmits and receives control signals to and from the SRNC 32. The HO-GW 4 makes connection to the AGW 31 through an AGW-eBS interface (a U1 interface of the UMB) and transmits and receives control signals and user data to and from the AGW 31. The HO-GW 4 makes connection to the eBSs 33 (a to c) through an eBS interface (a U3 interface of the UMB) and transmits and receives control signals and user data to and from the eBS 33s (a to c). The HO-GW 4 may make connection to all eBSs in a predetermined UMB area. The HO-GW 4 may make connection to only one or plural eBSs (in the example shown in FIG. 1, the eBS 32*a*) located in a boundary between the UMB access network 3 and the WiMAX access network 2 rather than making connection to all the eBSs. By adopting such a configuration, there is an effect that it is possible to simplify setting of the HO-GW 4 and save resources used by the HO-GW 4 for connection to the eBSs.

Figure 2:
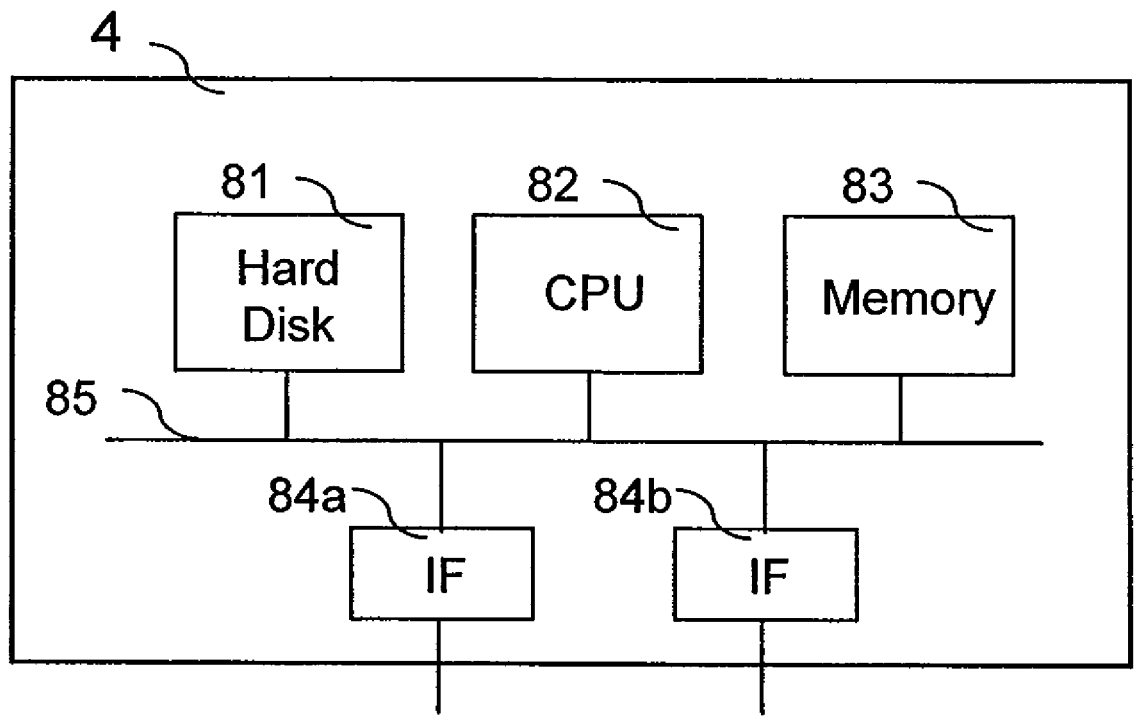
FIG. 2 is a diagram of an apparatus configuration example of an HO-GW 4.

FIG. 2 is a diagram of a configuration example of an apparatus of the HO-GW 4.

The HO-GW 4 includes a hard disk 81, a CPU 82, a memory 83, and IFs (84*a* and 84*b*). These devices are connected via a bus 85. Programs for realizing functions of the HO-GW 4 are stored in the memory 83. The CPU 82 sequentially reads out and executes the programs.

Context Table

FIG. 3A is a diagram of an example of the structure of a WiMAX context table 100 managed by the HO-GW 4 in the memory 83 or the hard disk 81. The WiMAX context table 100 includes an MN ID 101, connection destination information 102, QoS information 103, authentication information 104, data path information 105, and a pointer 106 to a UMB context.

In the MN ID 101, an ID of an MN in the WiMAX access network 2 (i.e., an address such as a MAC (Media Access Control) address of the MN) is set. In the connection destination information 102, an ID of a BS that accommodates the MN and an ID of an ASN-GW are set. In the QoS information 103, filter information (TFT: Traffic Flow Template) for identifying an IP flow, QoS classes of respective IP flows, and the like are set. In the authentication information 104, a parameter AK_GW (see FIG. 14, explained later) notified from the ASN-GW 21, a parameter AK_BS (see FIG. 20, explained later) notified from the HO-GW 4 to the WiMAX BS, and the like are set. In the data path information 105, tunnel information (i.e., an IP address of a tunnel endpoint (an ASN-GW), tunnel header information (a GRE Key), etc.) for transmitting and receiving user data between the WiMAX access network 2 and the HO-GW 4 is set. In the pointer 106 to the UMB context, a pointer to a related entry of a context table 120 (explained later) is set.

FIG. 3B is a diagram of the structure of the UMB context table 120 managed by the HO-GW 4 in the memory 83 or the hard disk 81. The UMB context table 120 includes an MN ID 121, connection destination information 122, QoS information 123, authentication information 124, data path information 125, and a pointer 126 to a WiMAX context.

In the MN ID 121, a unicast ID (UATI) of an MN in the UMB access network 3 is set. In the connection destination information 122, an ID of an eBS that accommodates the MN, an ID of an SRNC, an ID of an AGW, and the like are set. In the QoS information 123, filter information (TFT) for identifying an IP flow, QoS classes of respective IP flows, and the like are set. In the authentication information 124, a parameter MSK_GW (see FIG. 20, explained later) notified from the SRNC 32, a parameter MSK_eBS (see FIG. 14, explained later) notified from the HO-GW 4 to the eBSs, and the like are set. In the data path information 125, tunnel information (i.e., an IP address of a tunnel endpoint (an AGW or an eBS), an encryption key TSK_GW (see FIG. 14, explained later) for protecting communication between the HO-GW 4 and the MN, etc. for transmitting and receiving user data between the UMB access network 3 and the HO-GW 4 is set. In the pointer 126 to the WiMAX context, a pointer to a related entry of the WiMAX context table 100 is set.

2. Handover Processing (WiMAX→UMB)

Figure 4:
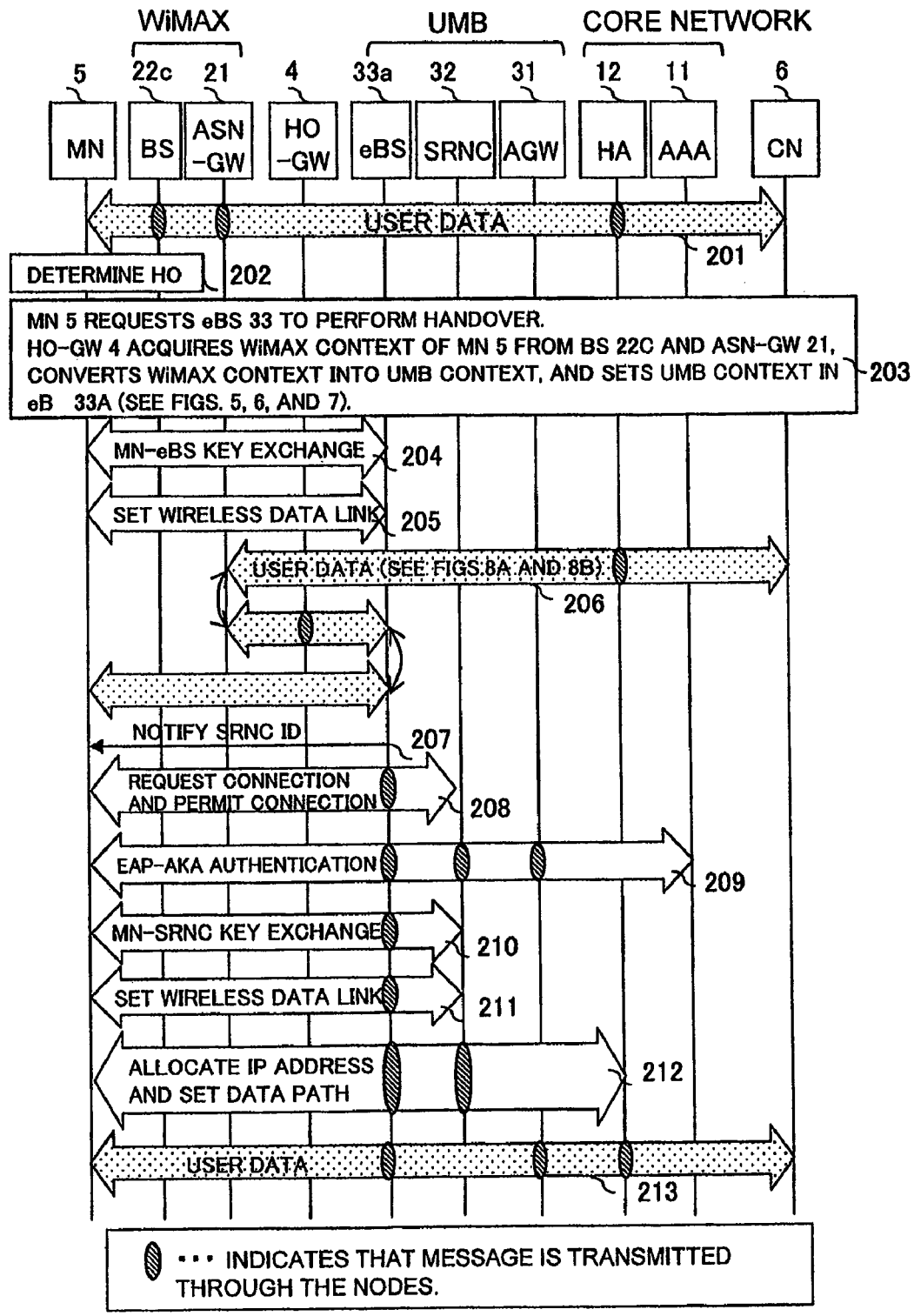
FIG. 4 is a diagram of a call flow of handover from the WiMAX to the UMB.

FIG. 4 is a diagram of a procedure in which the MN 5 performs handover from the WiMAX access network 2 to the UMB access network 3 in the system according to this embodiment. FIG. 1 is a diagram for explaining such handover.

First, the MN 5 is connected to only the WiMAX access network 2 and performs data communication with the CN 6 through the BS 22*c*, the ASN-GW 21, and the HA 12 (201). At this point, the HO-GW 4 stores no information concerning the MN 5 at all. On the other hand, the MN 5 stores WiMAX communication context information and information on the HO-GW 4. The WiMAX communication context information stored by the MN 5 includes an ID of a connected BS (BS 22*c*), QoS information for each IP flow, and an encryption key for protecting wireless communication between the MN 5 and the BS 22*c* (a method of acquiring these kinds of information is the same as that explained concerning the related art). The information on the HO-GW 4 includes an ID of a virtual ASN-GW, an ID of a virtual BS, an ID-of a virtual SRNC, and ID of a virtual eBS of the HO-GW 4, and other parameters and algorithm information necessary for communication with the HO-GW 4. The MN 5 may dynamically acquire the information on the HO-GW 4 from the AAA 11 or the like when the MN 5 makes connection to the WiMAX access network. Alternatively, the information on the HO-GW 4 maybe statically set on hardware of the MN 5. Alternatively, the information on the HO-GW 4 may be acquired from a message or the like advertised from a near WiMAX BS.

Figure 18:
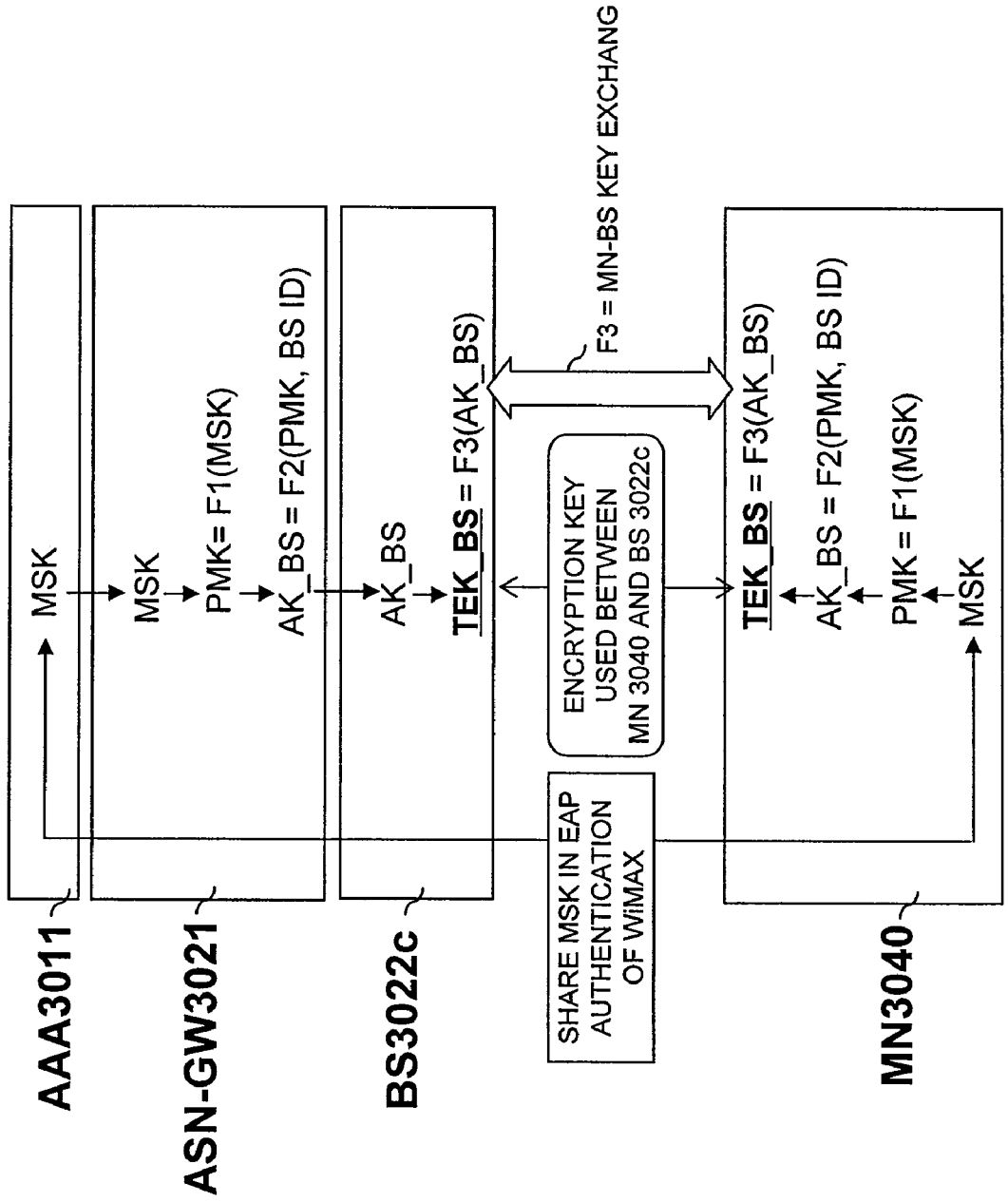
FIG. 18 is a diagram for explaining a method of generating a WiMAX encryption key based on the related art.

As in the related art (see the method of generating a WiMAX encryption key based on the related art shown in FIG. 18), the MN 5 and the BS 22*c* generate an encryption key in a wireless section. First, when the MN 5 makes connection to the WiMAX access network 2, user authentication by an EAP (Extensible Authentication Protocol) is performed. The AAA 11 and the MN 5 share an MSK (Master Session Key). The MSK is notified from the AAA 11 to the ASN-GW 21 in the EAP authentication process. The ASN-GW 21 generates a PMK (Pairwise Master Key) from the MSK and stores the PMK on a memory. Thereafter, when the MN 5 makes connection to the BS 22*c*, the ASN-GW 21 generates an AK (Authorization Key)_BS from the PMK and the ID of the BS 22*c* and notifies the BS 22*c* of the AK_BS. Since the AK_BS is a function of a BS ID, the AK_BS has a different value for each of the BSs. On the other hand, the MN 5 generates the AK_BS for the BS 22*c* using an algorithm set beforehand same as that used by the ASN-GW 21. At this point, the MN 5 and the BS 22*c* share the same AK_BS. The MN 5 and the BS 22*c* perform key exchange processing using the AK_BS and exchange an encryption key TEK (Transport Encryption Key)_BS in the wireless section. The generation of the encryption key (TEK_BS) in the wireless section is completed.

Thereafter, the MN 5 determines handover to the UMB access network 3 because, for example, a wireless wave state of the WiMAX is deteriorated (202). The MN 5 measures a wireless wave state of the UMB access network 3 and requests, for example, an eBS having a best wireless wave state (e.g., the eBS 33*a*) to make connection (203). The connection request of the MN 5 can include, for example, the ID of the MN, the virtual BS ID or the virtual SRNC ID of the HO-GW 4, and a route counter.

In step 203, in general, processing explained below is executed.

The ASN-GW 21 generates, using an algorithm set beforehand and on the basis of the MSK received from the core network 1, an encryption key AK_GW for protecting communication between the core network 1 and the ASN-GW 21 and passes the encryption key AK_GW to the HO-GW 4. A data path between the ASN-GW 21 and the HO-GW 4 is set by the encryption key (see steps S266 and S267 shown in FIG. 5 explained later). The HO-GW 4 generates, using an algorithm set beforehand and on the basis of the AK_GW received from the ASN-GW 21, an encryption key TSK_GW for protecting communication between the HO-GW 4 and the MN 5 and an encryption key MSK_eBS for protecting communication between the HO-GW 4 and the eBS 33a and sets the encryption key MSK_eBS in the UMB context table 120. At this point, the HO-GW 4 acquires a WiMAX communication context of the MN 5 from the BS 22c and the ASN-GW 21, converts the WiMAX communication context into a UMB communication context, and notifies the eBS 33a of the UMB communication context. A data path between the HO-GW 4 and the eBS 33a is set by the encryption key MSK_eBS (see steps 269 and 270 shown in FIG. 5 explained later).

Details of step 203 are explained with reference to FIGS. 5 to 7 and FIG. 14 later.

The eBS 33a creates an encryption key PMK_eBS using an algorithm set beforehand and on the basis of authentication information (including the MSK_eBS) included in the UMB communication context notified from the HO-GW 4 in step 203. The eBS 33a performs key exchange with the MN 5 using parameters such as the PMK_eBS (204). The parameters used in the key exchange between the MN 5 and the eBS 33a are explained later with reference to FIG. 14. As a result of the MN-eBS key exchange, the MN 5 and the eBS 33a generate, using a shared algorithm set beforehand and on the basis of the PMK_eBS, an encryption key (TSK_eBS) for protecting communication between the MN 5 and the eBS 33a. Thereafter, a message between the MN 5 and the eBS 33a is protected by a code.

The MN 5 and the eBS 33a perform setting of a wireless data link on a protected communication path (205). When the setting of the wireless data link is completed, user data from the CN 6 reaches the MN 5 through the HA 12, the ASN-GW 21, the HO-GW 4, and the eBS 33a (206).

Figure 8A:
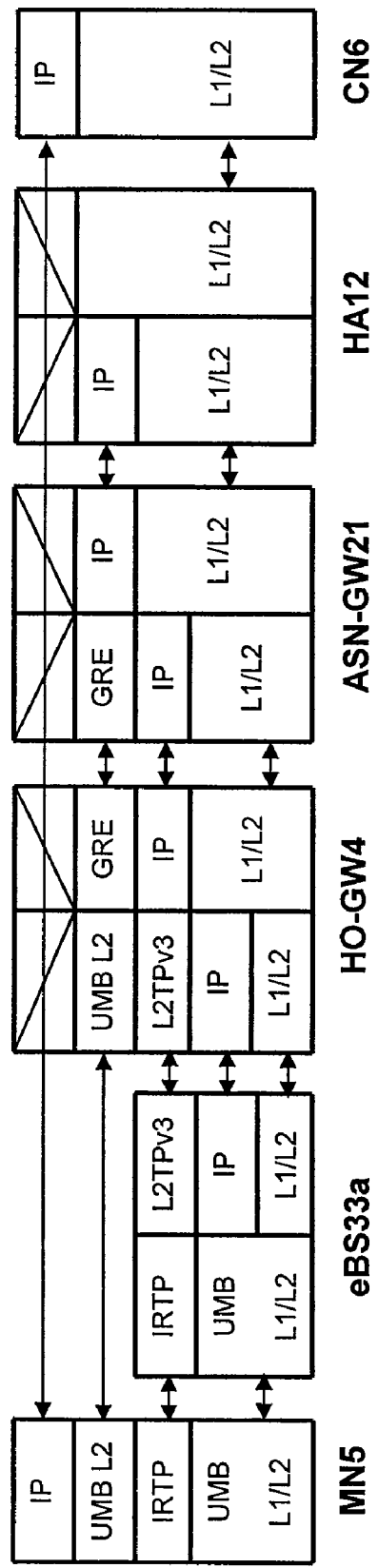
FIG. 8A is a diagram of a first example of a protocol stack of data transfer from the WiMAX to the UMB.
Figure 8B:
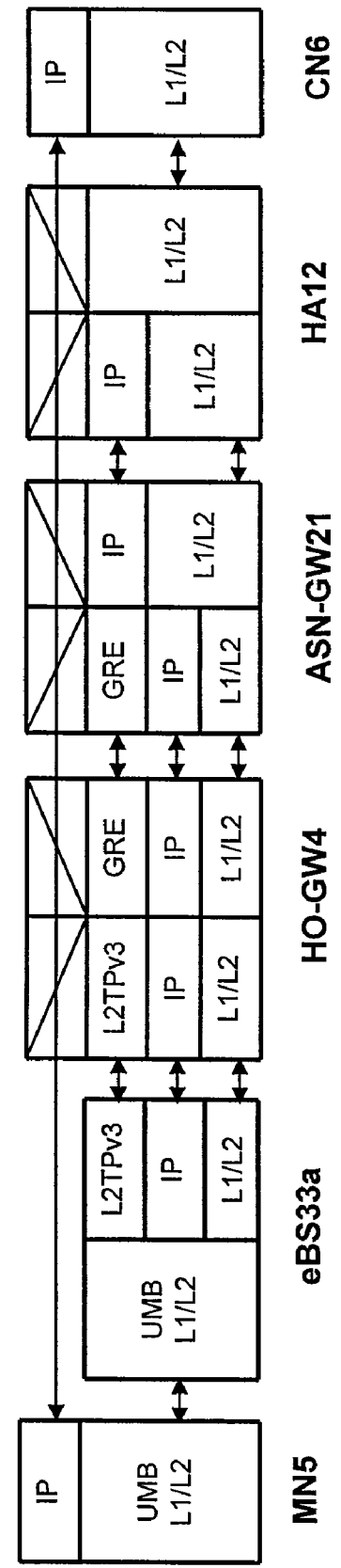
FIG. 8B is a diagram of a second example of the protocol stack of data transfer from the WiMAX to the UMB.

Examples of a protocol stack in step 206 are shown in FIGS. 8A and 8B. In the example shown in FIG. 8A, the HO-GW 4 extracts an IP packet in a GRE packet received from the ASN-GW 21, encapsulates the IP packet with a UMB L2 (Layer 2) header and an L2TPv3 (Layer 2 Tunneling Protocol version 3) header, and transfers the IP packet to the eBS 33. The UMB L2 header is terminated in the MN 5. The L2TPv3 is terminated in the eBS 33a. The eBS 33a extracts a UMB L2 packet from an L2TPv3 packet, adds an IRTP (Inter Route Tunneling Protocol) header and a UMB L2 header to the UMB L2 packet, and transfers the UMB L2 packet to the MN 5.

On the other hand, in the example shown in FIG. 8B, the HO-GW 4 extracts the IP packet in the GRE packet received from the ASN-GW 21, encapsulates the IP packet with the L2TPv3 header, and transfers the IP packet to the eBS 33a. The eBS 33a extracts the IP packet from the L2TPv3 packet, adds the UMB L2 header to the IP packet, and transfers the IP packet to the MN 5.

Referring back to FIG. 4, the explanation of the handover procedure is continued. After step 205, the eBS 33a notifies the MN 5 of an ID of the SRNC 32 (207) (the eBS 33a grasps the ID of the SRNC 32 in advance). The MN 5 requests the SRNC 32, the ID of which is notified, to make connection (208). In a connection request transmitted from the MN 5 to the SRNC 32 in step 208, a unicast ID (UATI: as explained later with reference to FIGS. 5 and 6, UATI is equal to a WiMAX MN ID in this embodiment) of the MN 5 and an ID of a connected SRNC (the virtual SRNC ID of the HO-GW 4). After acquiring a UMB context from the HO-GW 4 using the unicast ID (UATI) and the SRNC ID notified to the SRNC 32, the SRNC 32 returns a connection permission response to the MN 5. A unicast ID (UATI) allocated to the MN 5 anew by the SRNC 32 is included in the connection permission response.

Figure 19:
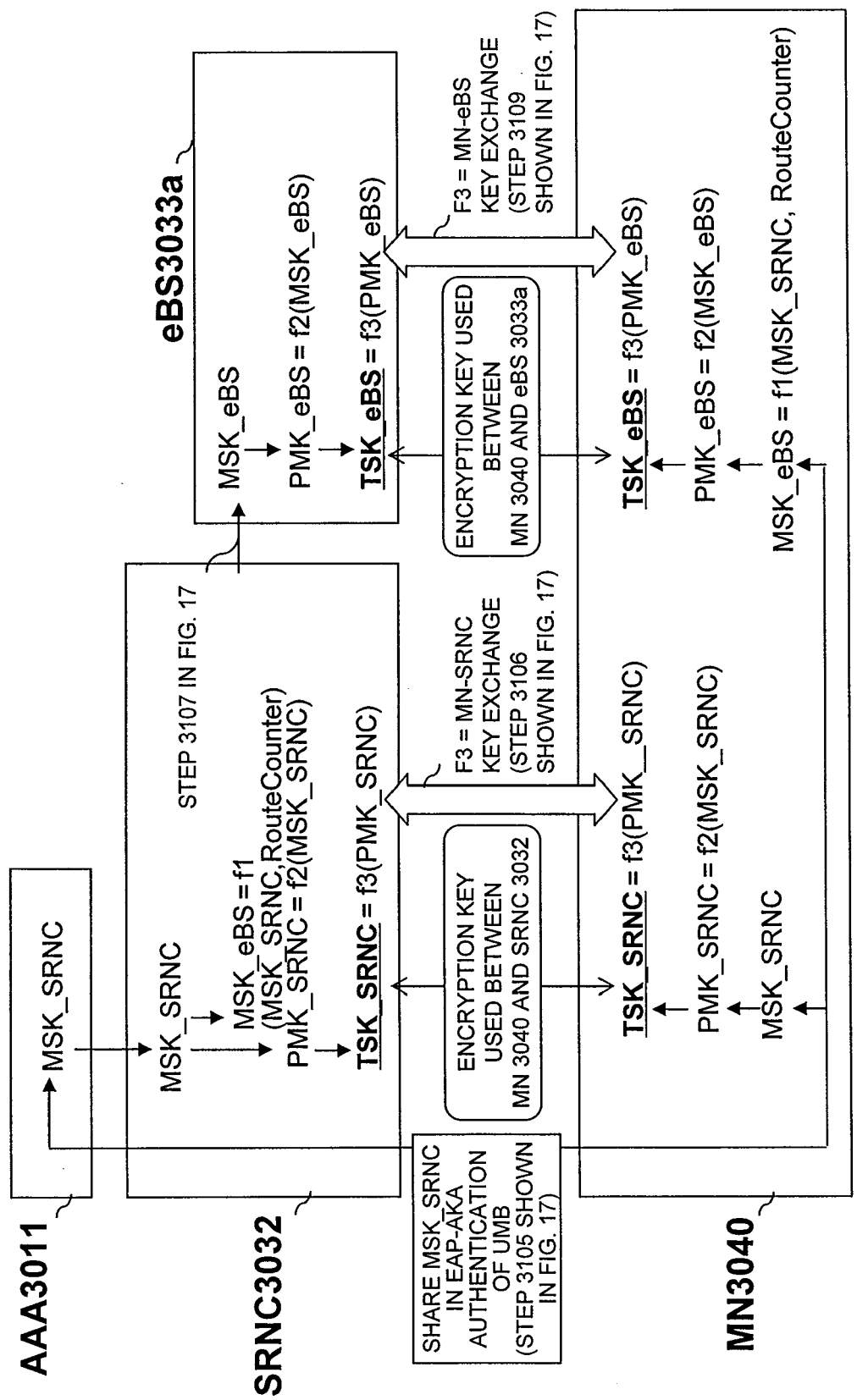
FIG. 19 is a diagram for explaining a method of generating a UMB encryption key based on the related art.

Subsequently, EAP-AKA authentication is applied to the UMB access network (209). When the EAP-AKA authentication is successful, a MSK_SRNC (see FIG. 19) is shared between the MN 5 and the AAA 11. The MSK_SRNC is notified from the AAA 11 to the SRNC 32.

Exchange of an encryption key TSK_SRNC (see FIG. 19) for protecting communication between the MN 5 and the SRNC 32 is performed by using the MSK_SRNC (210). A method of generating the encryption key TSK_SRNC from the MSK_SRNC is as explained with reference to FIG. 19. After the MN-SRNC key exchange processing, the communication between the MN 5 and the SRNC 32 is protected by using the TSK_SRNC.

The MN 5 and the SRNC 32 perform setting of a wireless data link layer on the protected communication path (211). Finally, data path setting (GRE tunnel setting between the eBS 33a and the AGW 31 and IPinIP tunnel setting between the AGW 31 and the HA 12) and IP address allocation from the AGW 31 to the MN 5 are performed (212). The connection of the MN 5 to the UMB access network 3 is completed. After this, the MN 5 performs data communication with the CN 6 through the eBS 33a, the AGW 31, and the HA 12 (213). The procedure in which the MN 5 performs handover from the WiMAX access network 2 to the UMB access network 3 is completed.

Details of Step 203

Details of step 203 shown in FIG. 4 are explained with reference to FIGS. 5 to 7 and FIG. 14.

Figure 5:
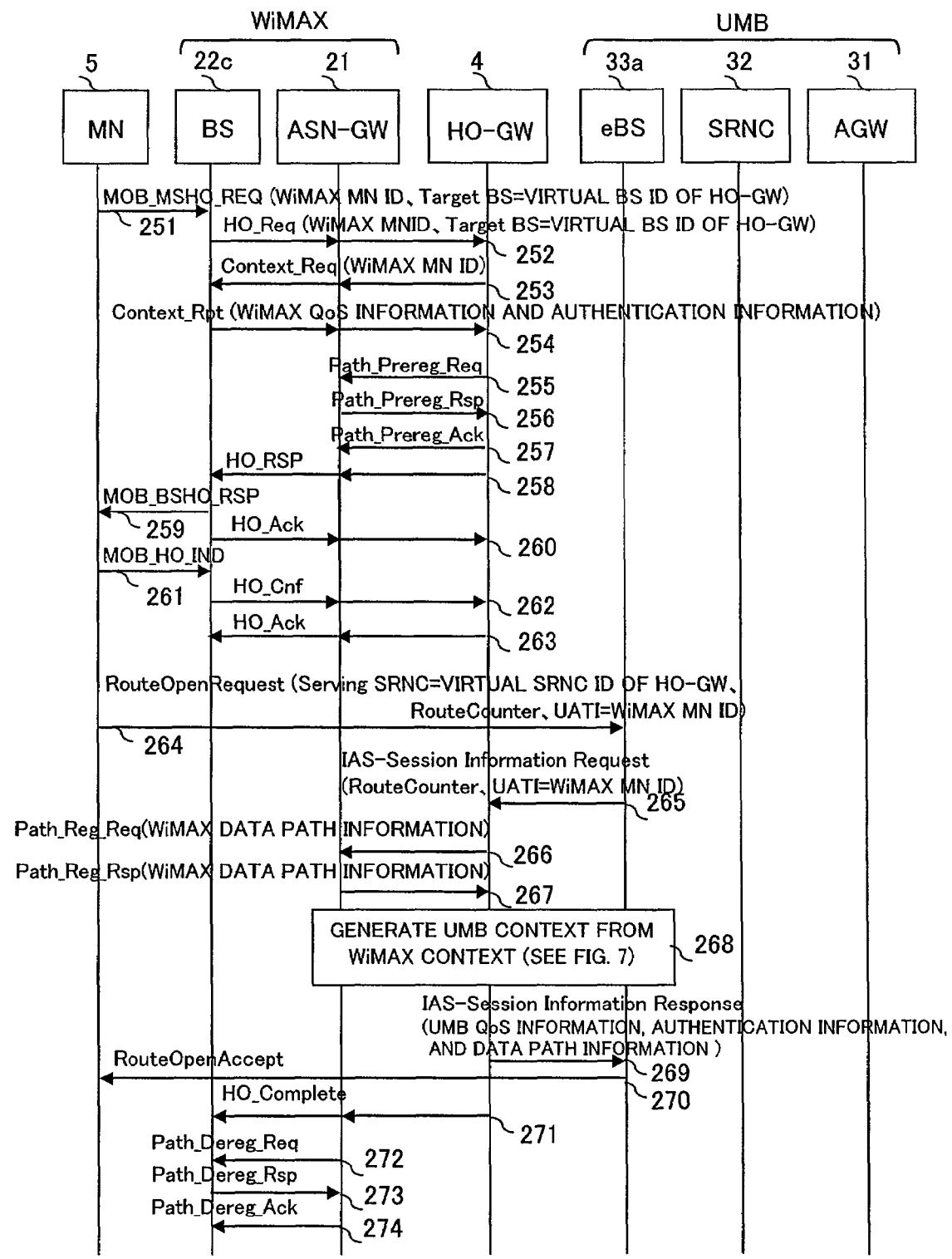
FIG. 5 is a diagram of a first example of a call flow of context transfer from the WiMAX to the UMB.

FIGS. 5 is a diagram of an example of a call flow for performing controlled handover in the WiMAX access network 2. The controlled handover is divided into a preparation phase in which a moving source access network performs preparation for handover and an action phase in which a terminal makes connection to a moving destination access network. Steps 251 to 260 shown in FIG. 5 are equivalent to the preparation phase and step 261 and subsequent steps are equivalent to the action phase.

First, the MN 5 transmits MOB_MSHO_REQ (251) to the BS 22c and requests the BS 22c to prepare for handover. The ID of the MN 5 in the WiMAX access network 2 and an ID of a moving destination BS (the virtual BS ID of the HO-GW 4) are included in the MOB_MSHO_REQ (251). When the BS 22c receives the MOB_MSHO_REQ (251), the BS 22c transmits HO_REQ (252) including the same information to the ASN-GW 21. The ASN-GW 21 transfers the HO_REQ (252) to the HO-GW 4.

The HO-GW 4 extracts the ID of the MN 5, the ID of the BS 22c, and the ID of the ASN-GW 21 from the HO_REQ (252) and sets the IDs in the MN ID (101) and connection destination information (102) of the WiMAX context table 100 (FIG. 3A). The HO-GW 4 transmits Context_Req (253) including the ID of the MN 5 to the ASN-GW 21 and the BS 22c and requests the communication context of the WiMAX. The BS 22c and the ASN-GW 21 return Context_Rpt (254) in response to the request and return QoS information (TFT and QoS classes) of the WiMAX and authentication information (AK_GW: see FIG. 14, explained later). The HO-GW 4 sets the QoS information and the authentication information included in the Context_Rpt (254) in the QoS information (103) and the authentication information (104) of the WiMAX context table 100 (FIG. 3A).

The HO-GW 4 transmits Path_Prereg_Req (255) to the ASN-GW 21 and schedules setting of a data path. The ASN-GW 21 responds to the request with Path_Prereg_Rsp (256). The HO-GW 4 returns an acknowledgment response Path_Prereg_Ack (257).

The HO-GW 4 transmits HO_RSP (258) to the ASN-GW 21 and notifies the ASN-GW 21 of the completion of the preparation for handover. The ASN-GW 21 transfers the HO_RSP (258) to the BS 22c. The BS 22c transmits MON_BSHO_RSP (259) to the MN 5 and returns HO_Cnf (260) to the ASN-GW 21. The ASN-GW 21 transfers the HO_Cnf (260) to the HO-GW 4. The handover preparation phase is completed.

The MN 5 transmits MOB_HO_IND (261) to the BS 22c and starts the handover action phase. When the BS 22c receives the MOB_HO_IND (261), the BS 22c transmits HO_Cnf (262) to the HO-GW 4. The HO_Cnf (262) reaches the HO-GW 4 through the ASN-GW 21. The HO-GW 4 returns HO_Ack (263) in response to the HO_Cnf (262). The HO_Ack (263) reaches the BS 22c through the ASN-GW 21.

The MN 5 transmits Route Open Request (264) to the eBS 33a of the UMB and requests the eBS 33a to make connection. An ID of an SRNC that currently accommodates the MN (the virtual SRNC ID of the HO-GW 4), a route counter with which the MN 5 identifies a route to the eBS 33a, and the MN ID of the WiMAX are included in the Route Open Request (264). In a preferred example, the MN ID of the WiMAX may be set in a UATI field of the Route Open Request. When the MN ID is set in the UATI field, there is an effect that it is possible to carry out this embodiment without changing the existing UMB standard.

The eBS 33a transmits IAS-Session Information Request (265) to an SRNC included in the Route Open Request (264) (the virtual SRNC of the HO-GW 4) and requests the UMB communication context. Information same as that in the Route Open Request (264) is included in the IAS-Session Information Request (265).

The HO-GW 4 extracts UATI (in this embodiment, equal to the WiMAX MN ID) from the IAS-Session Information Request (265) and the ID of the eBS 33a and sets the UATI and the ID in the MN ID (121) and the connection destination information (122) of the UMB context table 120 (FIG. 3B). The HO-GW 4 searches for, with the WiMAX MN ID as a key, a related entry of the WiMAX context table 100 and creates a mutual link between the WiMAX context and the UMB context. In other words, the HO-GW 4 sets the pointer 106 to the UMB context shown in FIG. 3A and the pointer 126 to the WiMAX context shown in FIG. 3B to be related to each other.

The HO-GW 4 transmits Path_Reg_Req (266) to the ASN-GW 21 and formally sets a data path between the ASN-GW 21 and the HO-GW 4. Tunnel information (a tunnel termination IP address, a GRE Key, and the like of the HO-GW 4) proposed by the HO-GW 4 is included in the Path_Reg_Req (266). The ASN-GW 21 responds to the request with Path_Reg_Rsp (267). Tunnel information (a tunnel termination IP address, a GRE Key, and the like of the ASN-GW 21) proposed by the ASN-GW 21 is included in the Path_Reg_Rsp (267). The HO-GW 4 sets data path information negotiated in the Path_Reg_Req (266) and the Path_Reg_Rsp (267) in the data path information (105) of the WiMAX context table 100 (FIG. 3A).

The HO-GW 4 generates a communication context (FIG. 3B) of the UMB on the basis of the communication context (FIG. 3A) of the WiMAX (268).

UMB context generation processing in the HO-GW 4 is explained below with reference to FIGS. 7 and 14.

Figure 6:
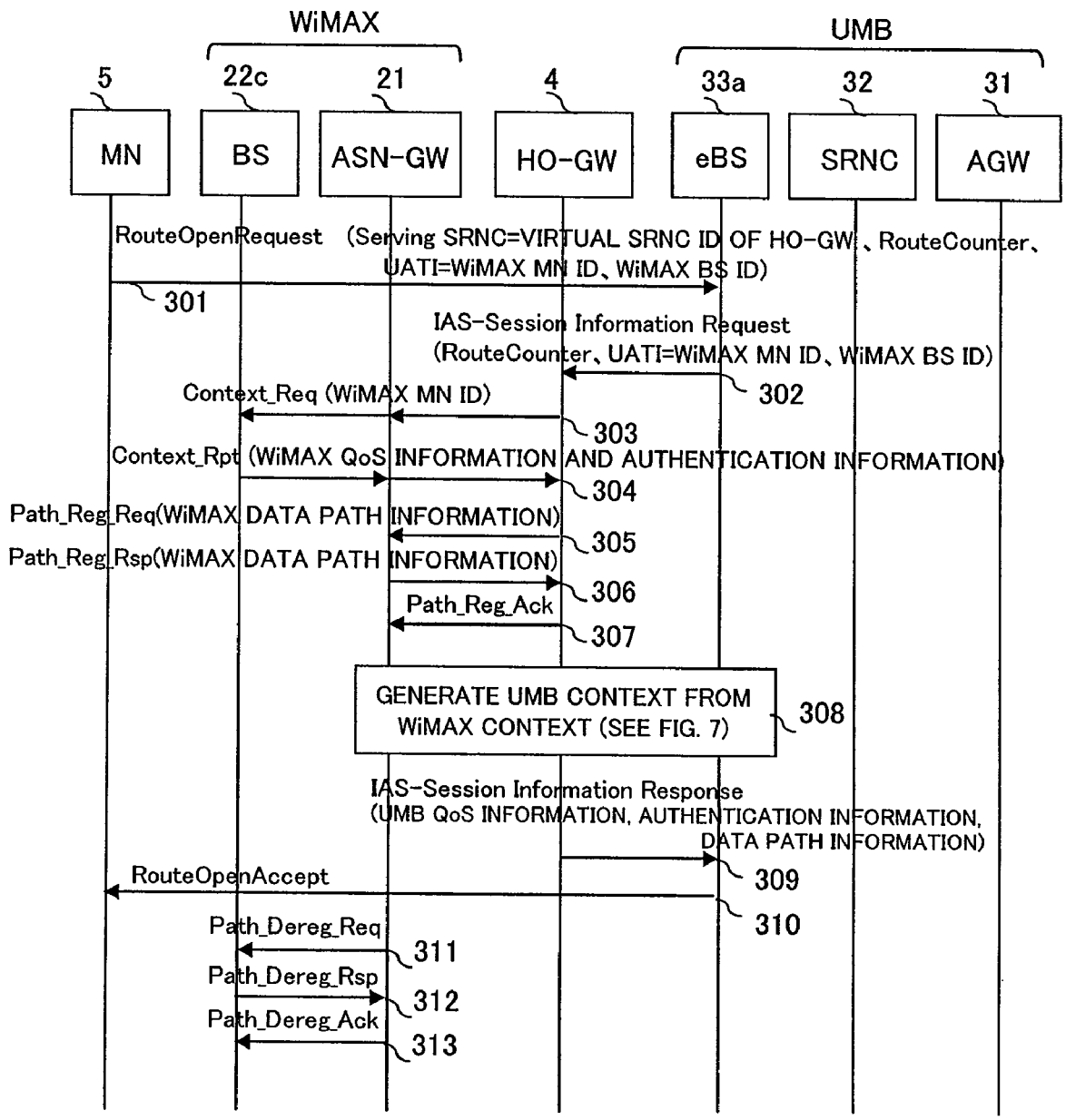
FIG. 6 is a diagram of a second example of the call flow of the context transfer from the WiMAX to the UMB.
Figure 7:
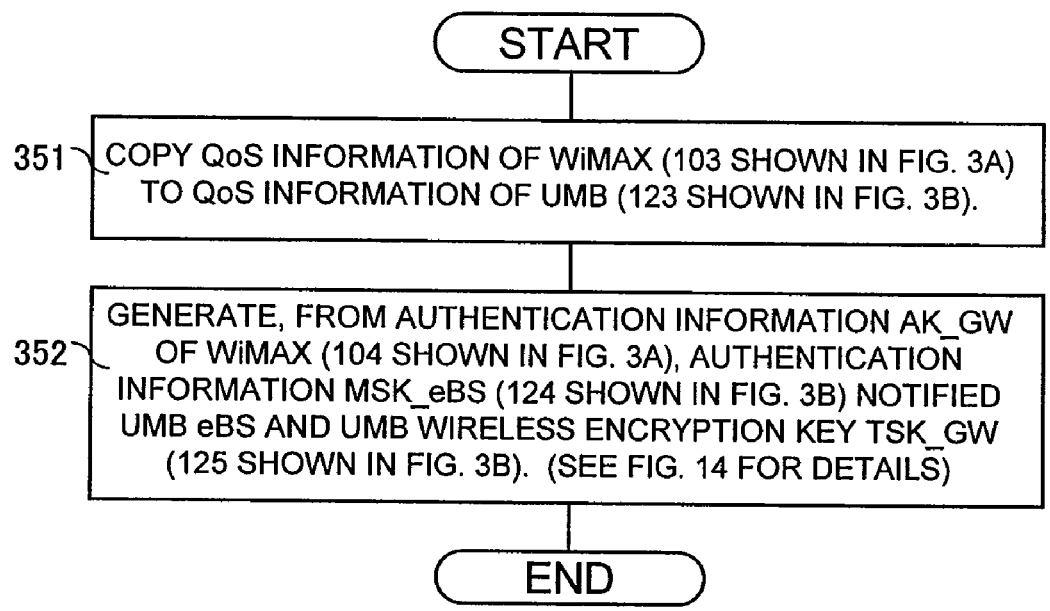
FIG. 7 is a diagram of a UMB context generation routine in the HO-GW 4.

FIG. 7 is a diagram of a UMB context generation routine 350 in the HO-GW 4 (step 268 shown in FIG. 5 and step 308 shown in FIG. 6).

First, the HO-GW 4 copies the QoS information (103) of the WiMAX context table 100 (FIG. 3A) to the QoS information (123) of the UMB context table 120 (FIG. 3B) (351). The HO-GW 4 generates the authentication information MSK_eBS (124) of the UMB context table 120 (FIG. 3B) and the encryption key (TSK_GW) of the data path information (125) from the authentication information (104) of the WiMAX context table 100 (FIG. 3A) (352). Details of step 352 are explained later with reference to FIG. 14. The UMB context generation routine 350 is completed.

Figure 14:
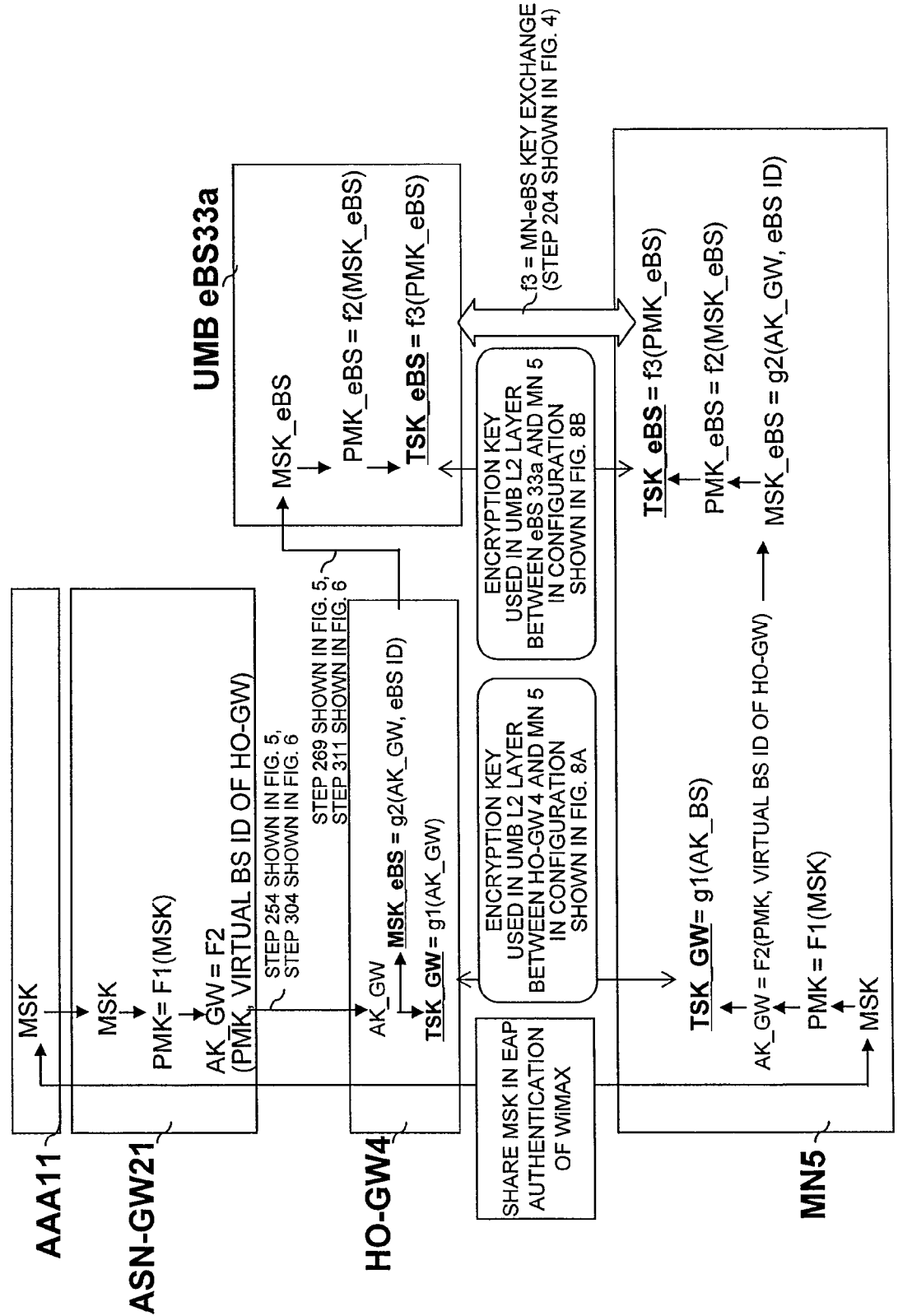
FIG. 14 is a diagram for explaining a method of generating an encryption key of the UMB from authentication information of the WiMAX.
Figure 15:
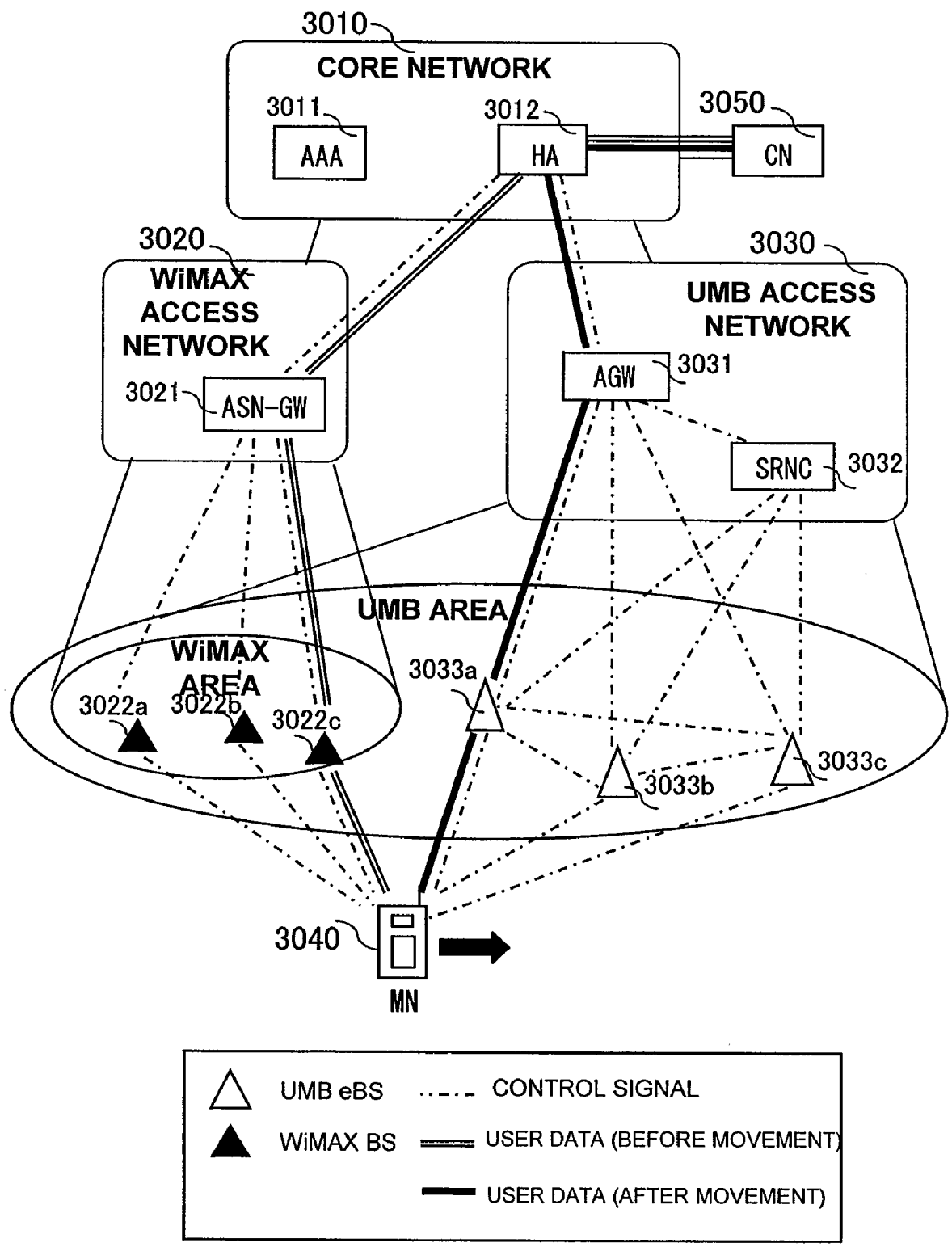
FIG. 15 a diagram of a configuration example of a communication network based on the related art.
Figure 17:
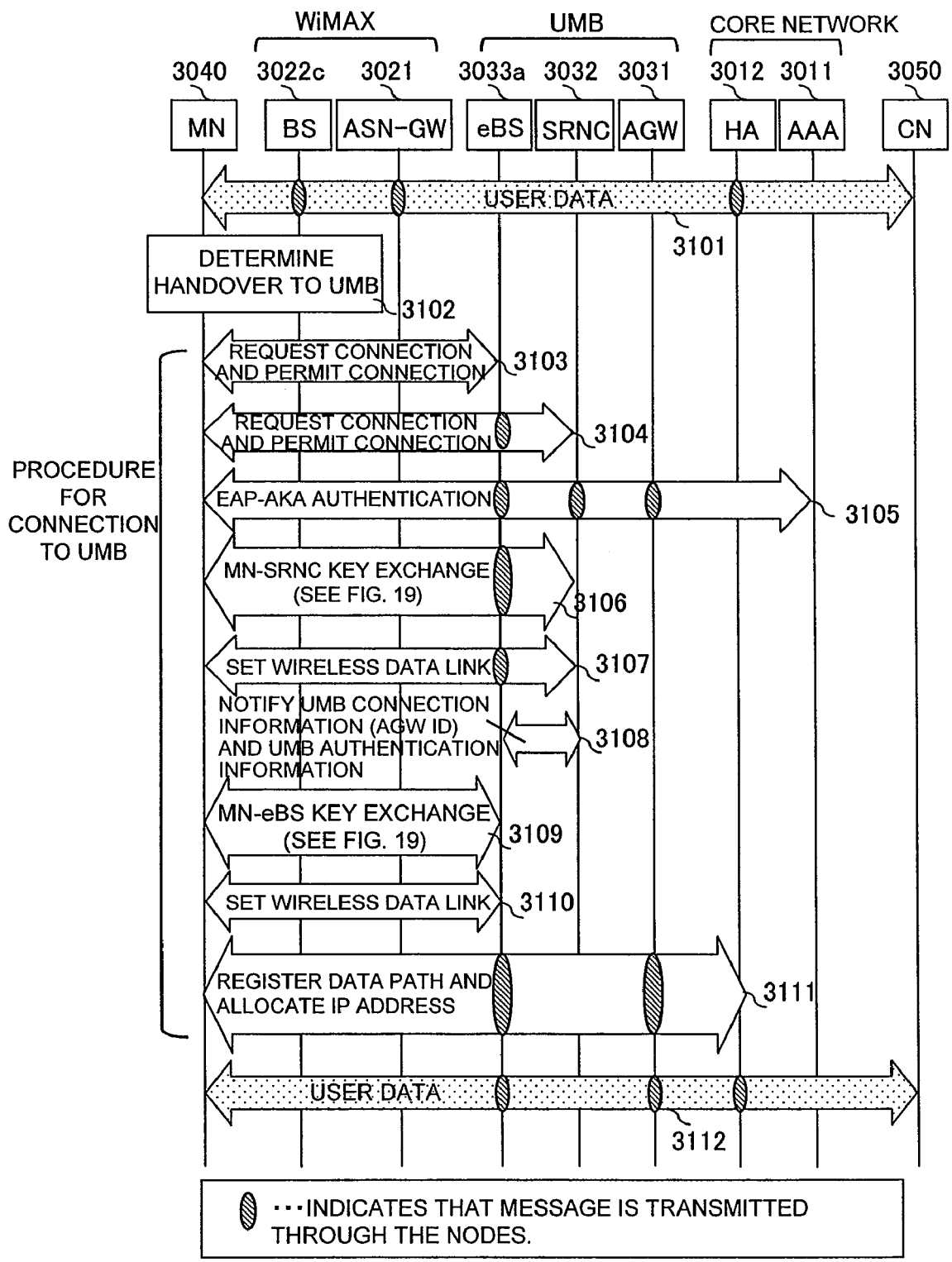
FIG. 17 is a diagram of a call flow of handover from the WiMAX to the UMB based on the related art.

A method of generating an encryption key of the UMB from authentication information of the WiMAX is shown in FIG. 14.

A method of generating UMB authentication information (step 352 shown in FIG. 7) is explained with reference to FIG. 14. First, when the MN 5 makes connection to the WiMAX access network 2, user authentication by the EAP is performed and the MN 5 and the AAA 11 share the MSK. The MSK is notified from the AAA 11 to the ASN-GW 21 in an EAP authentication process. The ASN-GW 21 generates a PMK from the MSK using an algorithm set beforehand and stores the PMK on a memory.

Thereafter, when the ASN-GW 21 receives Context_Req (step 253 shown in FIG. 5) from the HO-GW 4, the ASN-GW 21 generates AK_GW from the PMK and the virtual BS ID of the HO-GW 4 using an algorithm set beforehand and notifies the HO-GW 4 of Context_Rpt (step 254 shown in FIG. 5) including the AK_GW. The HO-GW 4 sets the AK_GW in the authentication information (104) of the WiMAX context table 100 (FIG. 3A). The HO-GW 4 generates, using an algorithm (g1) set beforehand and the AK_GW, an encryption key (TSK_GW) for protecting communication between the HO-GW 4 and the MN 5 and sets the encryption key (TSK_GW) in the data path information (125) of the UMB context table 120 (FIG. 3B).

When the HO-GW 4 receives IAS-Session Information (step 265 shown in FIG. 5) from the eBS 33a, the HO-GW 4 generates MSK_eBS from an algorithm (g2) set beforehand, an eBS ID included in the IAS-Session Information, and the AK_GW and stores the MSK_eBS in the authentication information (124) of the UMB context table 120 (FIG. 3B). The MSK_eBS is notified to the eBS 33a with IAS-Session Information Response (step 271 shown in FIG. 5, explained later). The eBS 33a generates an encryption key PMK_eBS on the basis of the MSK_eBS using an algorithm (f2) set beforehand. For example, the PMK_eBS is used for the key exchange (step 204 shown in FIG. 4) between the MN 5 and the eBS 33a. As a result of the key exchange, the eBS 33a generates the TSK_eBS on the basis of the PMK_eBS using an algorithm (f3) set beforehand.

The MN5, as the same as the ASN-GW 21, the HO-GW 4 and the eBS 33a, by using an algorithm set beforehand shared based on the MSK etc., generates the TSK_GW, and as a result of key exchange with the eBS 33a, generates the TSK_eBS by using an algorithm set beforehand based on the PMK_eBS (or the MSK).

In this way, the HO-GW 4 generates the authentication information (the TSK_GW and the MSK_eBS) of the UMB access network using the authentication information (the AK_GW) notified from the WiMAX access network. This makes it possible to protect data communication through the UMB without performing EAP-AKA authentication in the UMB.

Referring back to FIG. 5, the explanation of the call flow is continued. After generating the UMB context in step 268, the HO-GW 4 notifies the eBS 33a of IAS-Session Information Response (269) including QoS information (a TFT and a QoS class), authentication information (MSK_eBS generated by the method shown in FIG. 14), and data path information (the tunnel termination IP address of the HO-GW 4). The eBS 33a stores the notified information on a memory thereof. The eBS 33a transmits Route Open Accept (270) to the MN 5 and permits connection.

After the transmission of the IAS-Session Information Response (269), the HO-GW 4 transmits HO-Complete (271) to the ASN-GW 21 and notifies the ASN-GW 21 of the completion of the handover. The HO-Complete (271) reaches the BS 22c through the ASN-GW 21.

After the transmission of the HO-Complete (271), the ASN-GW 21 transmits Path_Dereg_Req (272) to the BS 22c and deletes a data path between the ASN-GW 21 and the BS 22. The BS 22c returns Path_Dereg_Rsp (273) in response to the request. The ASN-GW 21 transmits an acknowledgment response Path_Dereg_Ack (274) to the BS 22c. This data path may not be deleted.

The call flow for performing the controlled handover in the WiMAX access network 3 is completed.

FIG. 6 is a diagram of an example of a call flow for performing uncontrolled handover in the WiMAX access network 2. In the uncontrolled handover, a terminal directly sends a connection request to a base station at a moving destination without performing the handover preparation phase.

First, the MN 5 transmits Route Open Request (301) to the eBS 33a. An ID of an SRNC that currently accommodates the MN (the virtual SRNC ID of the HO-GW 4), a route counter allocated to a path to the eBS 33a by the MN 5, the MN ID of the WiMAX, and the BS ID of the WiMAX are included in the Route Open Request (301). In a preferred example, the MN ID of the WiMAX may be set in a UATI field of the Route Open Request.

Subsequently, the eBS 33a transmits IAS-Session Information Request (302) to the SRNC (the virtual SRNC ID of the HO-GW 4) included in the Route Open Request (301) and requests the UMB communication context. Information same as that in the Route Open Request (301) is included in the IAS-Session Information Request (302).

The HO-GW 4 extracts UATI (in this embodiment, equivalent to the WiMAX MN ID) and the ID of the eBS 33a from the IAS-Session-Information Request (302) and sets the UATI and the ID in the MN ID (121) and the connection destination information (122) of the UMB context table 120 (FIG. 3B). The HO-GW 4 searches for, with the WiMAX MN ID as a search key, a related entry of the WiMAX context table 100. In a sequence shown in FIG. 6, since a related WiMAX context is not present, the HO-GW 4 judges that it is necessary to acquire the WiMAX context from the WiMAX access network 3.

The HO-GW 4 transmits Context_Req (303) to a WiMAX BS (the BS 22c) included in the IAS-Session-Information Request (302) and requests the WiMAX context. The Context_Req (303) reaches the BS 22c through the ASN-GW 21.

When the BS 22c and the ASN-GW 21 receive the Context_Req (303), the BS 22c and the ASN-GW 21 return Context_Rpt (304) and return QoS information (a TFT and a QoS class) of the WiMAX and authentication information (the AK_GW: see FIG. 14). When the HO-GW 4 receives the Context_Rpt (304), the HO-GW 4 sets the WiMAX MN ID, the ASN-GW ID, and the BS ID in the MN ID (101) and the connection destination information (102) of the WiMAX context table 100 (FIG. 3A). The HO-GW 4 sets the QoS information and the authentication information included in the Context_Rpt (304) in the QoS information (103) and the authentication information (104) of the WiMAX context table 100 (FIG. 3A). The HO-GW 4 creates a mutual link with the related UMB context. In other words, the HO-GW 4 sets 106 shown in FIG. 3A and 126 shown in FIG. 3B to be related to each other.

The HO-GW 4 transmits Path_Reg_Req (305) to the ASN-GW 21 and sets a data path between the HO-GW 4 and the ASN-GW 21. The tunnel information (the tunnel termination IP address, the GRE key, and the like of the HO-GW 4) proposed by the HO-GW 4 is included in the Path_Reg_Req (305). The ASN-GW 21 responds to the request with Path_Reg_Rsp (306). The tunnel information (the tunnel termination IP address, the GRE Key, and the like of the HO-GW 4) proposed by the ASN-GW 21 is included in the Path_Reg_Rsp (306). The HO-GW 4 returns an acknowledgment response Path_Reg_Ack (307) and sets data path information negotiated in the Path_Reg_Req (305) and the Path_Reg_Rsp (306) in the data path information (105) of the WiMAX context table 100 (FIG. 3A).

The HO-GW 4 generates a UMB context from the WiMAX context (308). A method of generating a UMB context follows the procedure explained with reference to FIG. 7.

The HO-GW 4 transmits IAS-Session Information Response (309) to the eBS 33a and notifies the eBS 33a of the QoS information (the TFT and the QoS class), the authentication information (the MSK_eBS), and the data path information (the tunnel termination IP address of the HO-GW 4) generated in step 308. The eBS 33a stores the notified information on the memory thereof. The eBS 33a transmits Route Open Accept (310) to the MN 5 and permits connection.

After receiving the Path_Reg_Ack (307), the ASN-GW 21 transmits Path_Dereg_Req (311) to the BS 22c and deletes a data path between the ASN-GW 21 and the BS 22c. The BS 22c returns Path_Dereg_Rsp (312) in response to the request. The ASN-GW 21 transmits an acknowledgment response Path_Dereg_Ack (313) to the BS 22c. This data path may not be deleted.

The call flow for performing the uncontrolled handover in the WiMAX access network 3 is completed.

3. Handover Processing (UMB→WiMAX)

Figure 9:
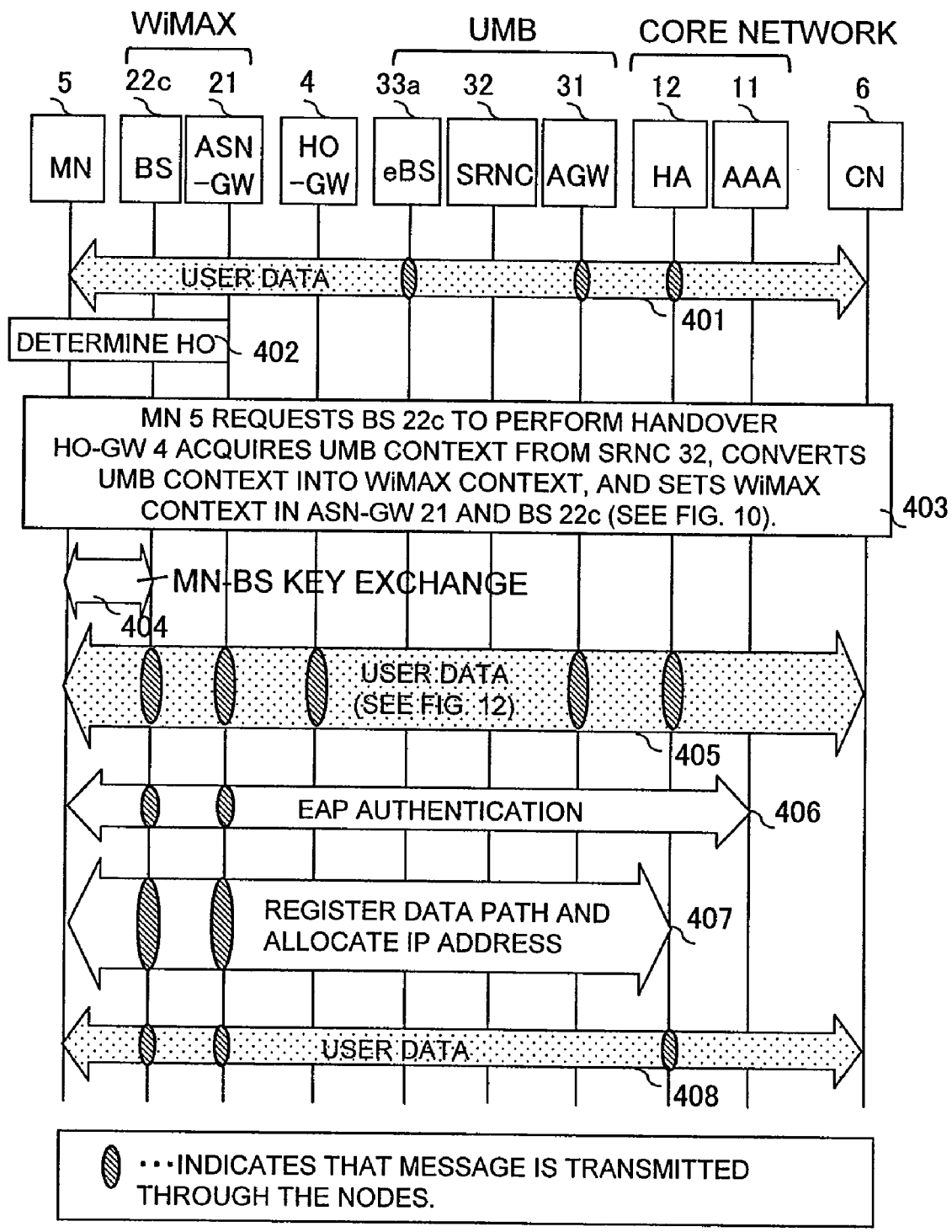
FIG. 9 is a diagram of a call flow of handover from the UMB to the WiMAX.
Figure 21:
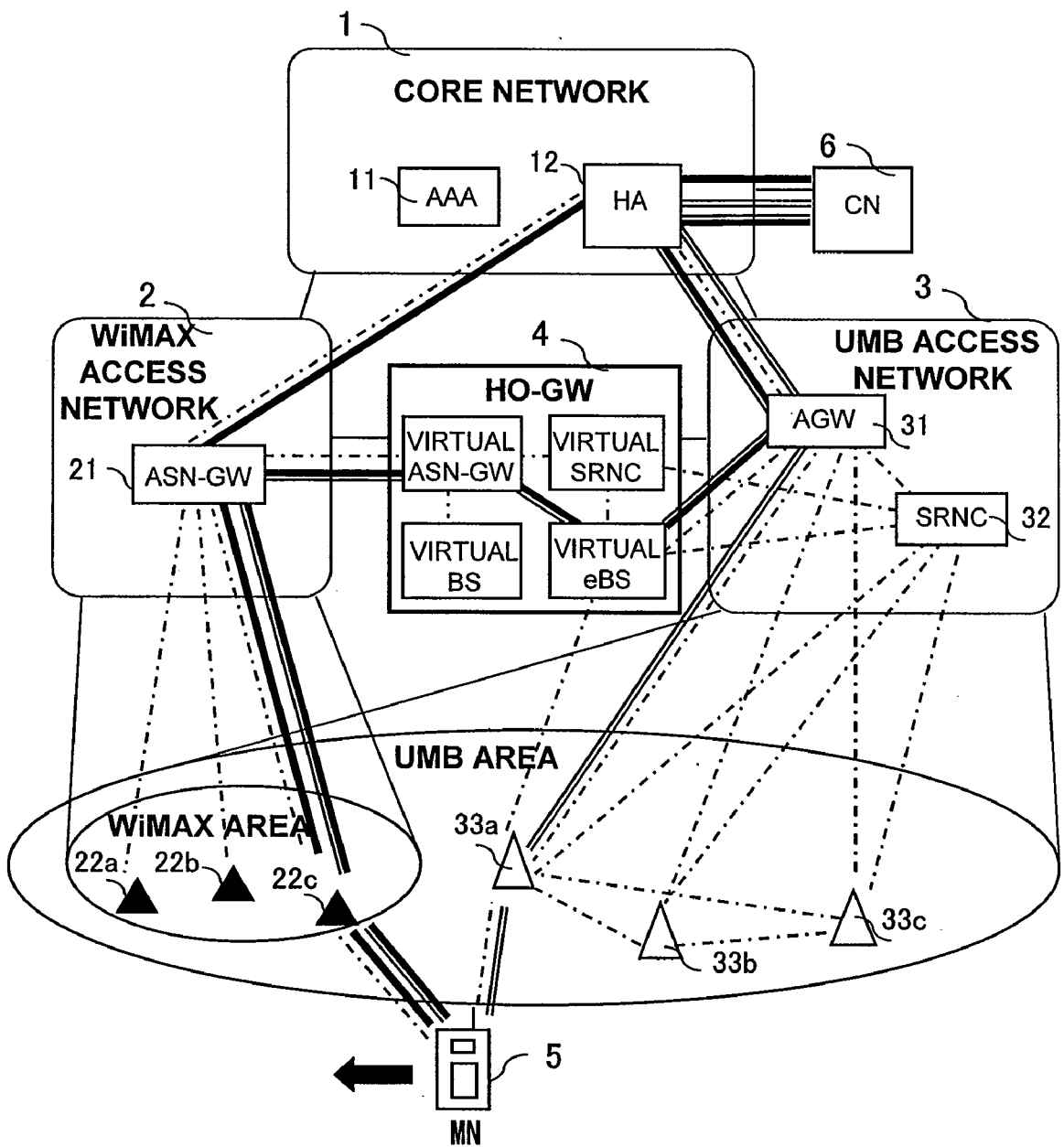
FIG. 21 is a diagram for explaining handover from the UMB to the WiMAX.

FIG. 9 is a diagram of a procedure in which the MN 5 performs handover from the UMB access network 3 to the WiMAX access network 2 in the system according to this embodiment. FIG. 21 is a diagram for explaining such handover.

First, the MN 5 makes connection to the UMB access network 3 and performs data communication with the CN 6 through the eBS 33a, the AGW 31, and the HA 12 (401). At this point, the HO-GW 4 stores no information concerning the MN 5 at all. On the other hand, the MN 5 stores communication context information of the UMB and information on the HO-GW 4. The communication context information of the UMB stored by the MN 5 includes an ID of a connected BS (the eBS 33a), QoS information for each IP flow, an encryption key for protecting wireless communication between the MN 5 and the eBS 33a, and an encryption key for protecting communication between the MN 5 and the SRNC 32 (a method of acquiring the respective kinds of information is the same as that explained concerning the related art). The information on the HO-GW 4 includes the ID of the virtual ASN-GW, the ID of the virtual BS, the ID of the virtual SRNC, and the ID of the virtual eBS of the HO-GW 4, and other parameters and algorithms necessary for communication with the HO-GW 4. The MN 5 may dynamically acquire the information on the HO-GW 4 from the AAA 11 or the like when the MN 5 makes connection to the WiMAX access network. Alternatively, the information on the HO-GW 4 may be statically set on the hardware of the MN 5. Alternatively, the information on the HO-GW 4 may be acquired from a message or the like advertised from a near WiMAX BS.

Thereafter, the MN 5 determines handover to the WiMAX access network 2 because, for example, signal intensity of the WiMAX BS 22c increases (402). The MN 5 transmits a handover request to the BS 22c (403). For example, the virtual BS ID of the HO-GW 4, an ID of an MN, a SUNC ID, and the like can be included in the request. Concerning authentication information, the HO-GW 4 generates authentication information (including AK_BS) subjected to key exchange between the MN 5 and the BS 22c, using an algorithm set beforehand, in order to protect communication between the MN 5 and the BS 22c. A data path between the HO-GW 4 and the BS 22 (steps 457 and 458 shown in FIG. 10 explained later) and a data path between the HO-GW 4 and the AGW 31C is set (steps 457 and 458 shown in FIG. 10 explained later). The HO-GW 4 acquires a communication context of the UMB from the SRNC 32, converts the communication context into a communication context of the WiMAX, and sets the communication context in the ASN-GW 21 and the BS 22c. Details of step 403 are explained with reference to FIGS. 10 and 11 and FIG. 20.

The BS 22c performs key exchange with the MN 5 using the authentication information (including the AK_BS) of the WiMAX communication context notified from the HO-GW 4 in step 403 (404). Parameters used in the key exchange between the MN 5 and the BS 22c are explained later with reference to FIG. 20. As a result of the MN-BS key exchange, an encryption key (TEK_BS) for protecting communication between the MN 5 and the BS 22c is generated. After this, user data from the CN 6 is transmitted and received through the HA 12, the AGW 31, the HO-GW 4, the ASN-GW 21, and the BS 22c (405).

Figure 12:
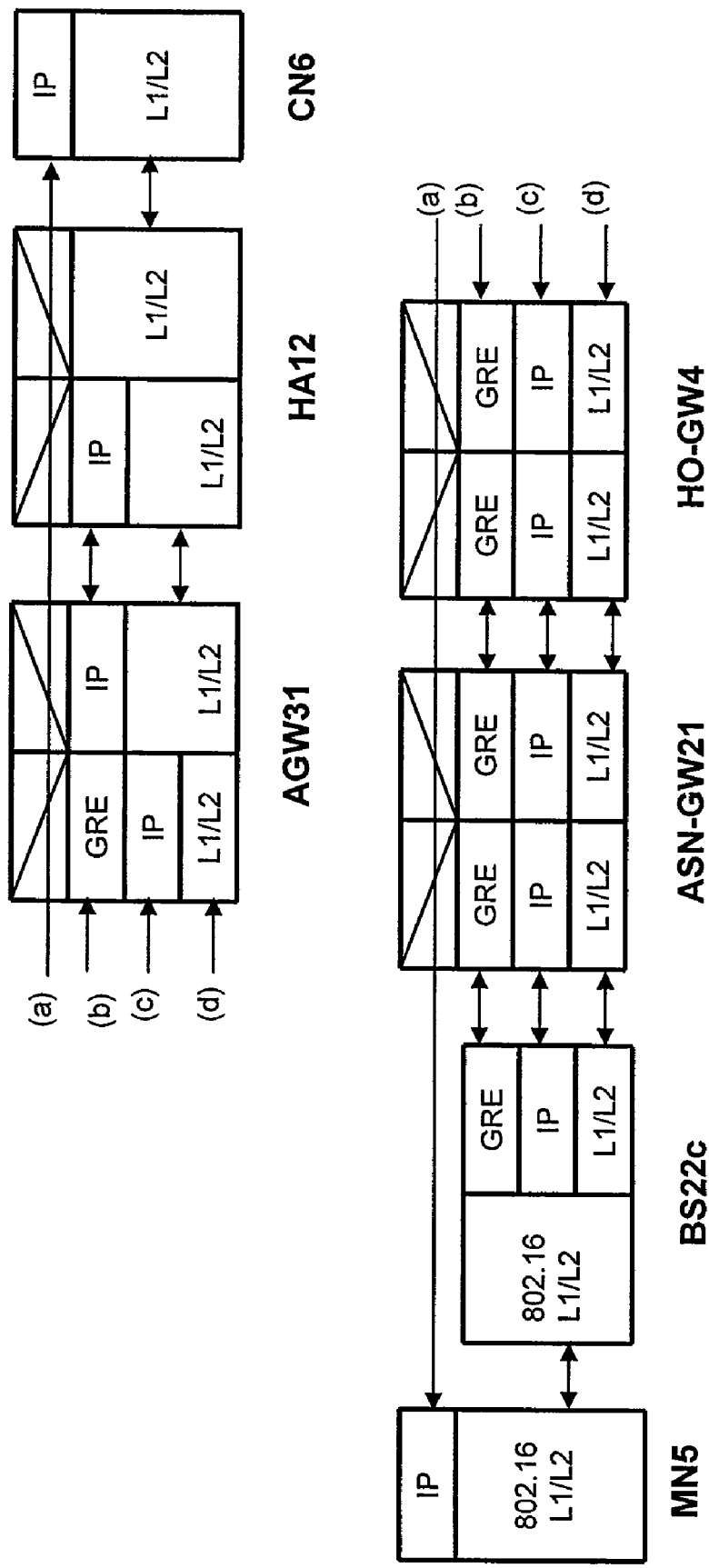
FIG. 12 is a diagram of a protocol stack of data transfer from the UMB to the WiMAX.

FIG. 12 is a diagram of an example of a protocol stack in step 405. In the example shown in FIG. 12, the HO-GW 4 extracts an IP packet in a GRE packet received from the AGW 31, encapsulates the IP packet with a GRE header again, and transfers the IP packet to the ASN-GW 21. The ASN-GW 21 extracts the IP packet in the GRE packet, encapsulates the IP packets with the GRE header again, and transfers the IP packet to the BS 22c. The BS 22c extracts the IP packet in the GRE packet, converts the IP packet into a WiMAX wireless signal, and transfers the WiMAX wireless signal to the MN 5.

Referring back to FIG. 9, the explanation of the call flow is continued. After the data path is switched in step 405, user authentication by the EAP is performed in the WiMAX access network 2 (406). As a result of the EAP authentication, a MSK is shared between the MN 5 and the AAA 11. The MSK is notified from the AAA 11 to the ASN-GW 21.

Subsequently, data path registration (IPinIP tunnel setting between the ASN-GW 21 and the HA 21) and IP address allocation from the ASN-GW 21 to the MN 5 are performed (407) and connection to the WiMAX access network 2 is completed (408). After this, the MN 5 performs data communication with the CN 6 through the BS 22c, the ASN-GW 21, and the HA 12. The procedure in which the MN 5 performs handover from the UMB access network 3 to the WiMAX access network 2 is completed.

Details of Step 403

Figure 20:
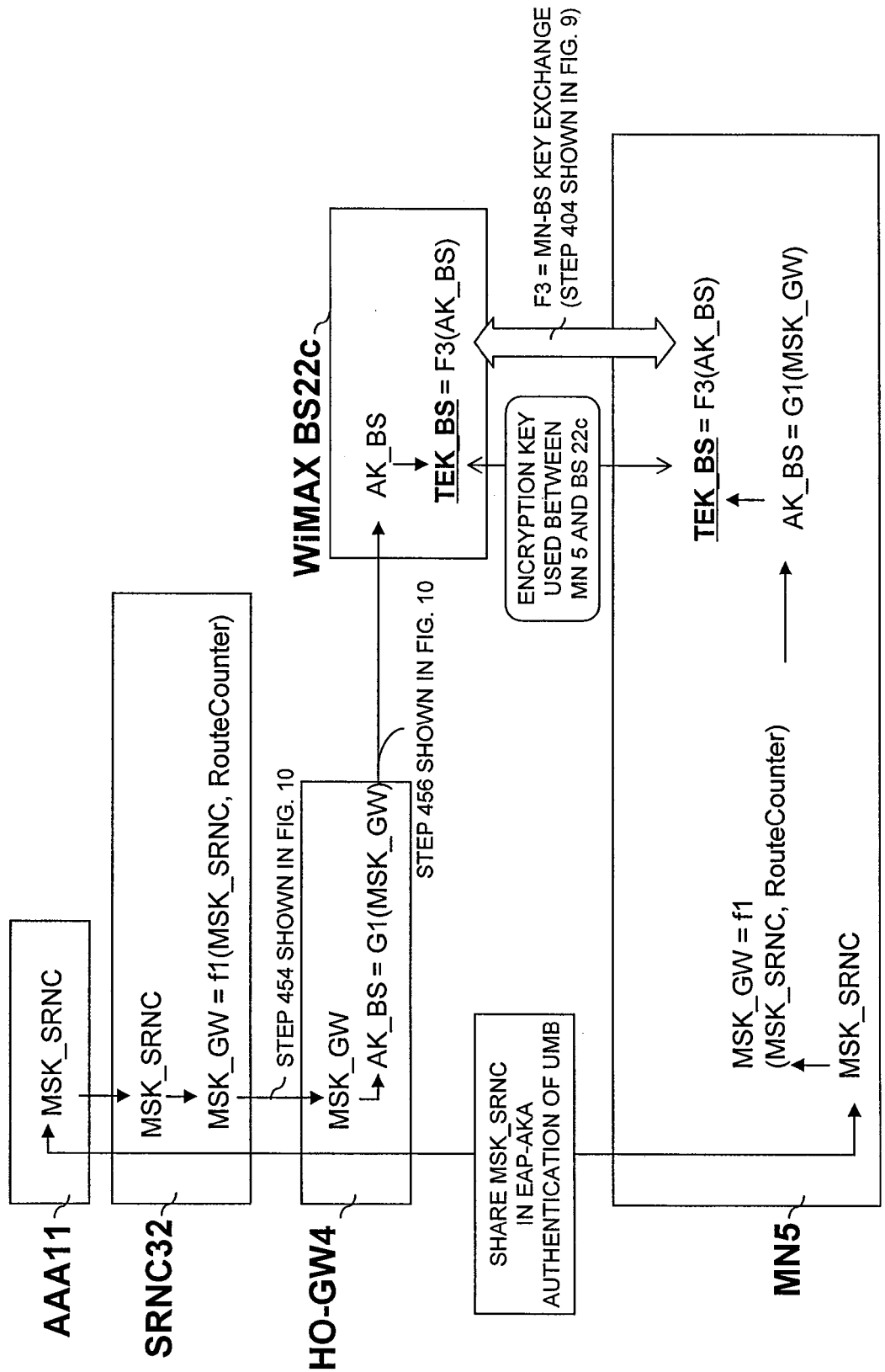
FIG. 20 is a diagram for explaining a method of generating an encryption key of the WiMAX from authentication information of the UMB.

The processing in step 403 shown in FIG. 9 is explained in detail below with reference to FIGS. 10 and 11 and FIG. 20.

Figure 10:
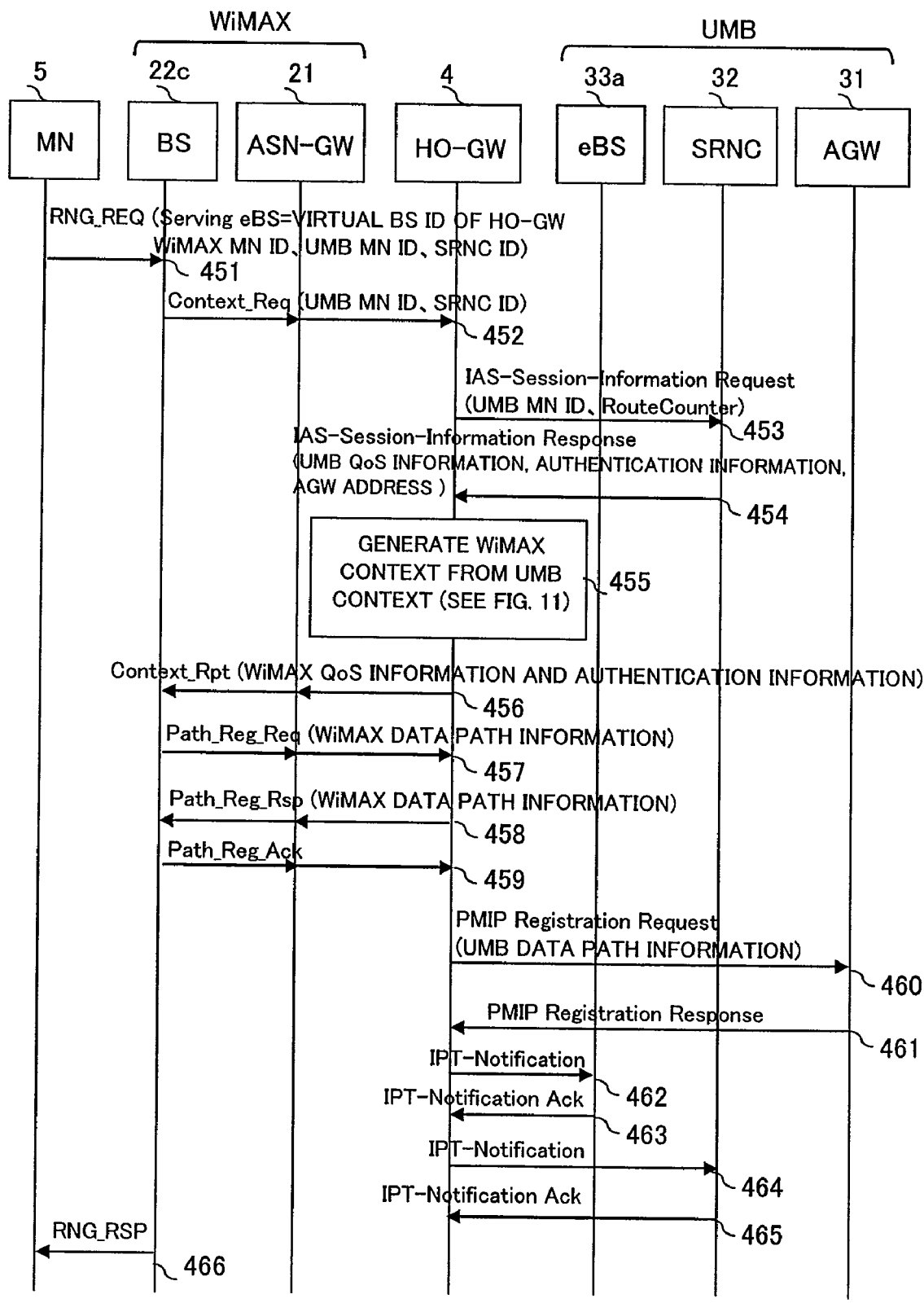
FIG. 10 is a diagram of a call flow of context transfer from the UMB to the WiMAX.

FIG. 10 is a diagram of an example of a detailed call flow in step 403 shown in FIG. 9. First, the MN 5 transmits RNG_REQ (451) to the BS 22c and requests connection to the WiMAX. An MN ID of the WiMAX, an ID of a BS that accommodates the MN 5 (the virtual BS ID of the HO-GW 4), an MN ID of the UMB, and an SRNC ID (the ID of the SRNC 32) are included in the RNG_REQ (451). The ASN-GW 21 transmits Context_Req (452) to the BS ID (the virtual BS ID of the HO-GW 4) extracted from the RNG_REQ (451) and requests a WiMAX communication context. Information same as that of the RNG_REQ (451) is included in the Context_Req (452). The Context_Req (452) reaches the HO-GW 4 through the ASN-GW 21.

When the HO-GW 4 receives the Context_Req (452), the HO-GW 4 extracts the WiMAX MN ID, a WiMAX BS ID (the ID of the BS 22c), and an ASN-GW ID (the ID of the ASN-GW 21) and sets the IDs in the MN ID (101) and the connection destination information (102) of the WiMAX context table 100 (FIG. 3A). The HO-GW 4 extracts the UMB MN ID and the SRNC ID and sets the IDs in the MN ID (121) and the connection destination information (122) of the UMB context table 120 (FIG. 3B). The HO-GW 4 creates a mutual link between the WiMAX context and the UMB context. In other words, the HO-GW 4 sets 106 shown in FIG. 3A and 126 shown in FIG. 3B to be related to each other.

Subsequently, the HO-GW 4 transmits IAS-Session Information Request (453) to the SRNC 32 and requests a UMB communication context. The UMB MN ID and the route counter allocated to the virtual eBS of the HO-GW 4 by the MN 5 are included in the IAS-Session Information Request (453). Since a value of the route counter is used for generation of authentication information of the WiMAX access network later, the value is shared with the MN 5 beforehand as a part of the HO-GW 4 information. The SRNC 32 returns IAS-Session-Information Response (454) including QoS information (a TFT and a QoS class), UMB authentication information (MSK_GW: see FIG. 20, explained later), and an IP address of the AGW 32. The HO-GW 4 sets the notified information in the QoS information (123), the authentication information (124), and the data path information (125) of the UMB context table 120 (FIG. 3B). The HO-GW 4 generates a WiMAX context on the basis of the UMB context (455).

Details of step 455 shown in FIG. 10 are explained below with reference to FIGS. 11 and 20.

Figure 11:
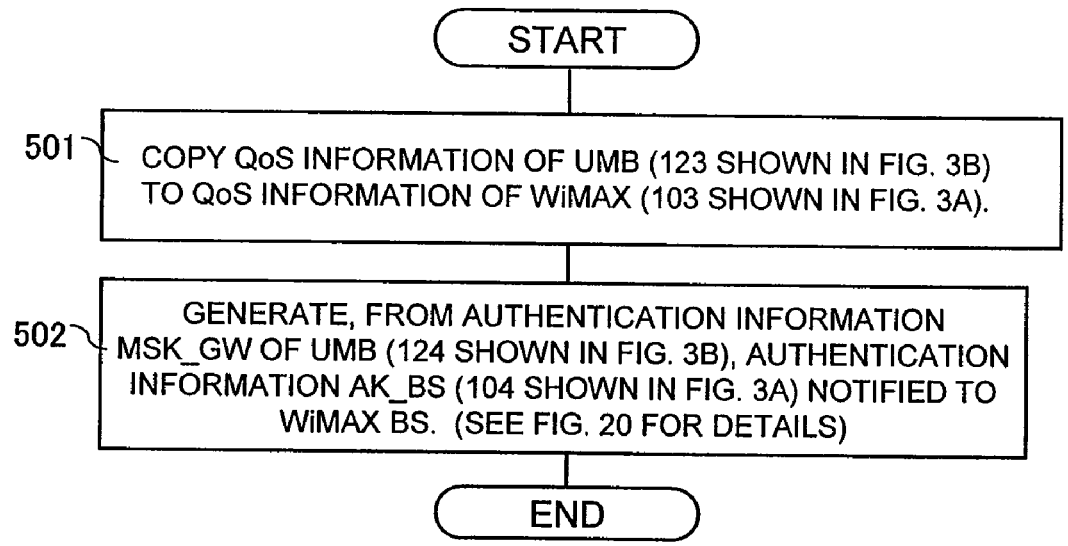
FIG. 11 is a diagram of a WiMAX context generation routine in the HO-GW 4.

FIG. 11 is a diagram of a WiMAX context generation routine 500 in the HO-GW 4 (step 455 shown in FIG. 10). First, the HO-GW 4 copies the QoS information (123) of the UMB context table 120 (FIG. 3B) to the QoS information (103) of the WiMAX context table 100 (FIG. 3A) (501). The HO-GW 4 generates the authentication information AK_BS (104) of the WiMAX context table 100 (FIG. 3B) from the authentication information MSK_GW (124) of the UMB context table 120 (FIG. 3B) (502). Details of step 502 are explained later with reference to FIG. 20. The WiMAX context generation routine 500 is finished.

A method of generating WiMAX authentication information (step 502 shown in FIG. 11) is explained with reference to FIG. 20. First, when the MN 5 makes connection to the UMB access network 3, user authentication by the EAP-AKA is performed and the MN 5 and the AAA 11 share MSK_SRNC. The MSK_SRNC is notified from the AAA 11 to the SRNC 32 in an EAP-AKA authentication process. The SRNC 32 stores the MSK_SRNC on a memory thereof.

Thereafter, when the SRNC 32 receives the IAS-Session Information Request (step 453 shown in FIG. 10) from the HO-GW 4, the SRNC 32 generates MSK_GW from the route counter and the MSK_SRNC included in the IAS-Session Information Request using an algorithm set beforehand. The SRNC 32 notifies the HO-GW 4 of the IAS-Session Information Response (step 454 shown in FIG. 10) including the MSK_GW. The HO-GW 4 sets the MSK_GW in the authentication information (124) of the UMB context table 120 (FIG. 3B). The HO-GW 4 generates a parameter AK_BS using an algorithm (G1) shared with the MN 5 beforehand and the MSK_GW. The AK_BS is set in the authentication information (104) of the WiMAX context table 100 (FIG. 3A). The AK_BS is notified to the BS 22c with Context_Rpt (step 456 shown in FIG. 10, explained later) and used for the key exchange (step 404 shown in FIG. 9) between the MN 5 and the BS 22c.

The MN 5 generates MSK_GW and TEK_BS using a shared algorithm set in advance in the same manner as the SRNC 32, the HO-GW 4, and the BS 22c.

In this way, the HO-GW 4 generates the authentication information (the AK_BS) of the UMB access network using the authentication information (the MSK_GW) notified from the UMB access network. This makes it possible to protect data communication through the WiMAX without performing the EAP authentication in the WiMAX.

Referring back to FIG. 10, the explanation of the call flow is continued. After generating the WiMAX context in step 455, the HO-GW 4 returns the Context_Rpt (456) to the ASN-GW 21 and the BS 22c and notifies the ASN-GW 21 and the BS 22c of QoS information (a TFT and a QoS class) and WiMAX authentication information (AK_BS). The ASN-GW 21 and the BS 22c store the notified information on memories thereof.

The BS 22c transmits Path_Reg_Req (457) to the HO-GW 4 and requests data path setting between the HO-GW 4 and the ASN-GW 21 and between the ASN-GW 12 and the BS 22c. The Path_Reg_Req (457) reaches the HO-GW 4 through the ASN-GW 21. Tunnel information (tunnel termination IP addresses, GRE Keys, and the like of the BS 22c and the ASN-GW 21) proposed by the BS 22c and the ASN-GW 21 is included in the Path_Reg_Req (457). The HO-GW 4 responds to the request with Path_Reg_Rsp (458). The Path_Reg_Req (458) reaches the BS 22c through the ASN-GW 21. Tunnel information (a tunnel termination IP address, a GRE Key, and the like of the HO-GW 4) proposed by the HO-GW 4 is included in the Path_Reg_Rsp (458). The BS 22c and the ASN-GW 21 return an acknowledgment response Path_Reg_Ack (459) to the HO-GW 4. After receiving the Path_Reg_Ack (459), the HO-GW 4 sets data path information negotiated in the Path_Reg_Req (457) and the Path_Reg_Rsp (458) in the data path information (105) of the WiMAX context table 100 (FIG. 3A).

The HO-GW 4 transmits PMIP Registration Request (460) to the AGW 31 and requests data path setting between the AGW 31 and the HO-GW 4. The tunnel termination IP address and the GRE Key of the HO-GW 4 are included in the PMIP Registration Request (460). The AGW 31 returns PMIP Registration Response (461) in response to the request and notifies the HO-GW 4 of reception of the setting of the data path. The HO-GW 4 sets data path information set by the PMIP registration request (460) and the PMIP Registration Response (461) in the data path information (125) of the UMB context table 120 (FIG. 3B).

The HO-GW 4 transmits IPT-Notification (462) to the eBS 33a and notifies the eBS 33a that the data path between the AGW 31 and the HO-GW 4 is set. The eBS 33a responds with IPT-Notification Ack (463). The HO-GW 4 transmits IPT-Notification (464) to the SRNC 32 as well and notifies the SRNC 32 of the completion of the data path setting between the AGW 31 and the HO-GW 4. The SRNC 32 responds with IPT-Notification Ack (465).

After the transmission of the Path_Reg_Ack (459), the BS 22c of the WiMAX transmits RNG_RSP (466) to the MN 5 and permits the MN 5 to make connection. The processing in step 403 shown in FIG. 9 is completed.

In the embodiment explained above, the handover between the WiMAX and the UMB is explained as an example of the handover between heterogeneous access networks. However, the contents of this embodiment in which the HO-GW 4 relays the Inter-AGW handover procedure for the heterogeneous access networks can be applied to other access networks.

4. Codec Conversion

In this embodiment, an example in which codec conversion for user data is performed in the HO-GW 4 is explained.

Figure 13:
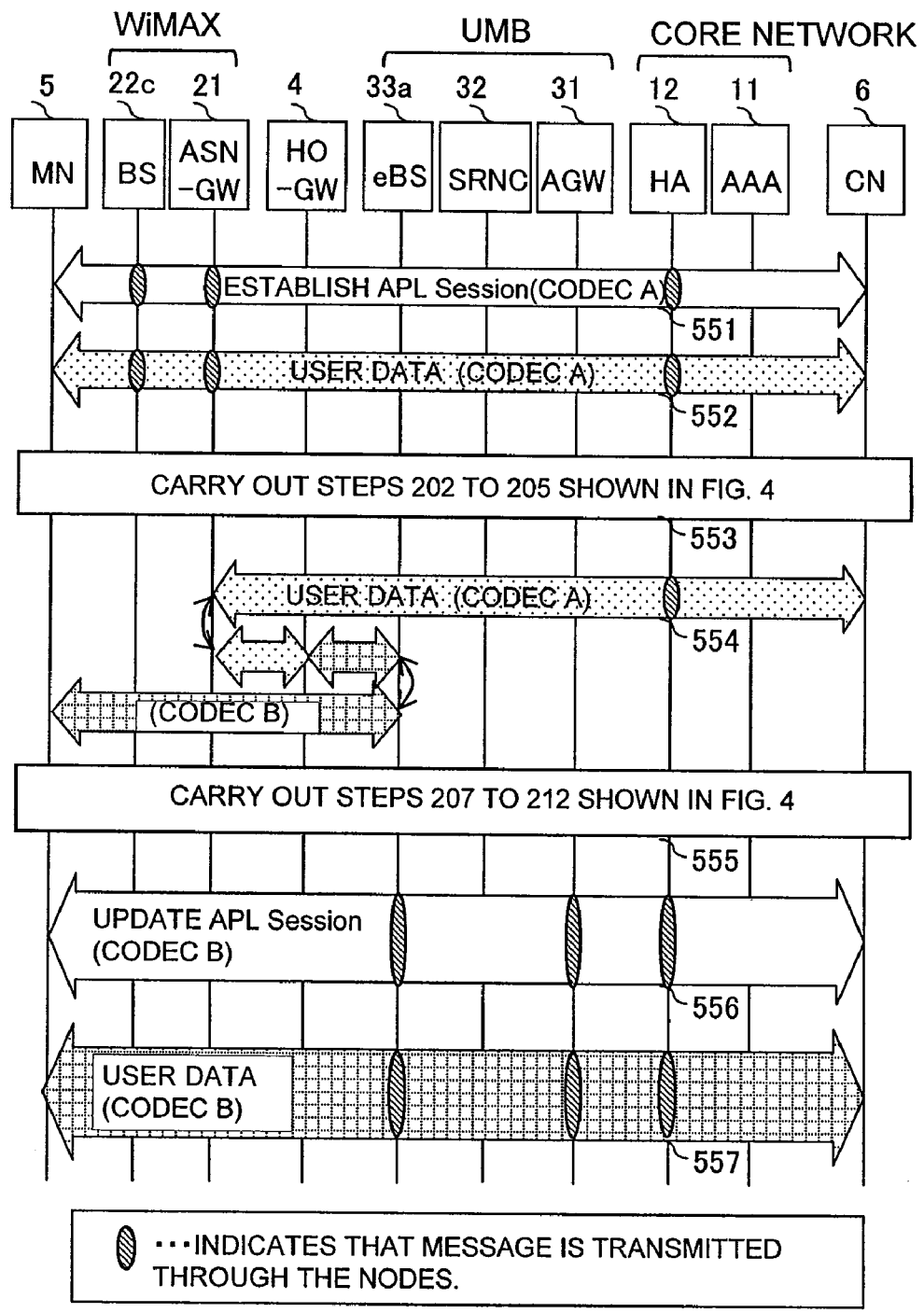
FIG. 13 is a diagram of a call flow in which the HO-GW 4 performs codec conversion.

FIG. 13 is a diagram of an example of a call flow. First, the MN 5 is connected to only the WiMAX access network 2 and establishes an application session of a CODEC A with the CN 6 (551 and 552). It is assumed that the UMB access network 3 establishes an application session of a CODEC B with the CN 6. At this point, information on the CODEC A and the CODEC B is set in the HO-GW 4 in association with access network types.

Thereafter, the MN 5 determines handover to the UMB access network 3 because, for example, a wireless wave state of the WiMAX access network 3 is deteriorated. The MN 5 performs the processing in steps 202 to 205 shown in FIG. 4 (553). After step 553, user data reaches the MN 5 from the ASN-GW 21 through the HO-GW 4 and the eBS 33a (554).

In this embodiment, in step 554, the HO-GW 4 converts a codec type of the user data from the CODEC A into the CODEC B. Consequently, there is an effect that, even when codecs used in the WiMAX access network 2 and the UMB access network 3 are different, handover can be performed smoothly.

Subsequently, the MN 5 performs the processing in steps 207 to 212 shown in FIG. 4 and completes the connection to the UMB access network 2 (555). The MN 5 transmits and receives application control signals to and from the CN 6 through the UMB access network 2 and changes the codec type to the CODEC B (556). After this, communication between the MN 5 and the CN 6 is completely switched to the UMB access network 3 and the communication is performed by using the CODEC B.

II. Second Embodiment

In a second embodiment of the present invention, an example in which an HO-GW increases the speed of handover between a WiMAX and 3GPP (3$^{rd}$ Generation Partnership Project) LTE (Long Term Evolution) is explained as an example of application to different access networks.

1. System Configuration

Figure 22:
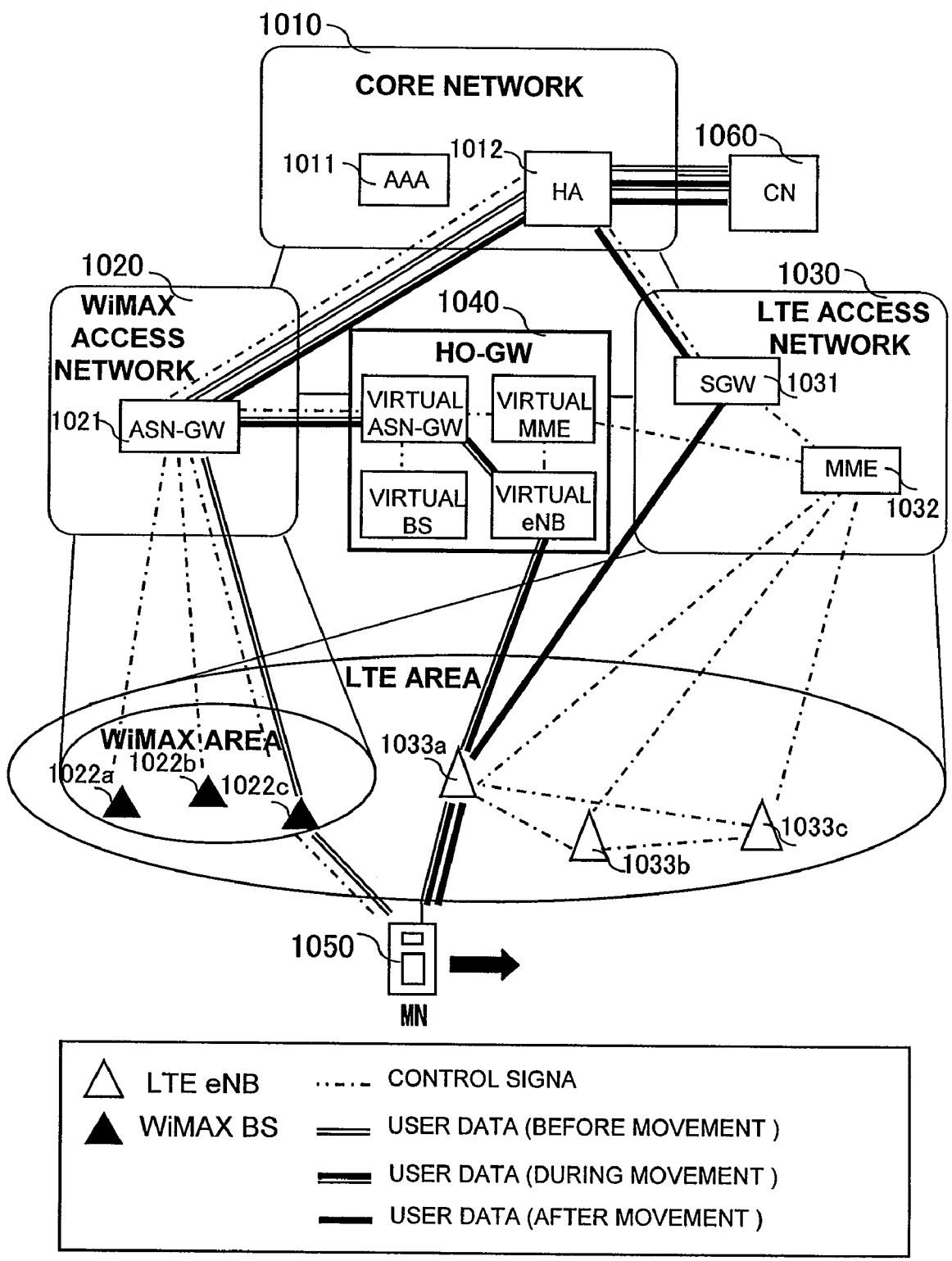
FIG. 22 is a diagram of a configuration example of a communication network and handover from a WiMAX to a LTE according to the second embodiment of the present invention.

FIG. 22 is a diagram of a configuration example of a communication network according to the second embodiment.

A wireless terminal MN 1050 is a terminal that has access means to both a WiMAX access network 1020 and an LTE access network 1030. A communication destination apparatus CN 1060 is a terminal or a server that performs communication with the MN 1050.

A core network 1010 is a communication network that accommodates both the WiMAX access network 1020 and the LTE access network 1030. A server AAA 1011 and a node HA 1012 are connected to the core network 1010. The AAA 1011 is a server that manages association between an identifier and authentication information of a terminal and authenticates the terminal. The AAA 1011 has a function of an HSS (Home Subscriber Server) of the LTE as well and manages subscriber information and terminal position information. The HA 1012 is a node specified by the Mobile IP and manages association between an HoA and a CoA of the MN 1050.

Nodes (base stations) BSs 1022 (a to c) and an access router ASN-GW 1021 are connected to the WiMAX access network 1020. The BSs 1022 (a to c) are nodes that inter-convert a WiMAX wireless signal from the MN 1050 into a wired signal and transfer the wired signal. The BSs 1022 (a to c) transmit and receive control signals and user data to and from the MN 1050 and the ASN-GW 1021.

The ASN-GW 1021 is an access router that accommodates the MN 1050 and has a function of a PMA of the Proxy MIP. In other words, the ASN-GW 1021 registers an IP address thereof in the HA 1012 as the CoA on behalf of the MN 1050. The ASN-GW 1021 transmits and receives control signals and user data to and from the HA 1012 and the BSs 1022 (a to c).

A diagram of a protocol stack of user data in the WiMAX access network 1020 is the same as that explained with reference to FIG. 16A in the first embodiment.

Nodes (base stations) eNBs (evolved Node B) 1033 (a to c), an access router SGW (Serving Gateway) 1031, and a node MME (Mobility Management Entity) 1032 are connected to the LTE access network 1030. The eNBs 1033 (a to c) are nodes that inter-convert an LTE wireless signal into a wired signal and transfer the wired signal. Each of the eNBs 1033 (a to c) transmits and receives control signals to and from the MN 1050, the MME 1032, and the other eNBs 1033 (a to c). Each of the eNBs 1033 (a to c) transmits and receives user data to and from the MN 1050, the SGW 1031, and the other eNBs 1033 (a to c).

The SGW 1031 is an access router that accommodates the eNBs 1033 (a to c) and has a function of a PMA of the Proxy MIP. In other words, the SGW 1031 registers an IP address thereof in the HA 1012 (referred to as PDN-GW (Packet Data Network-Gateway) in the 3GPP standard) as the CoA. The SGW 1031 transmits and receives control signals to and from the HA 1012, the MME 1032, and the eNBs 1033 (a to c). The SGW 1031 transmits and receives user data to and from the HA 1012 and the eNBs 1033 (a to c).

The MME 1032 is a node that manages communication session information (i.e., an ID of an eNB to which a terminal makes connection, an ID of an SGW, data path information, etc.) in the LTE access network 1030. The MME 1032 transmits and receives control signals to and from the eNBs 1033 (a to c) and the SGW 1031.

Figure 23:
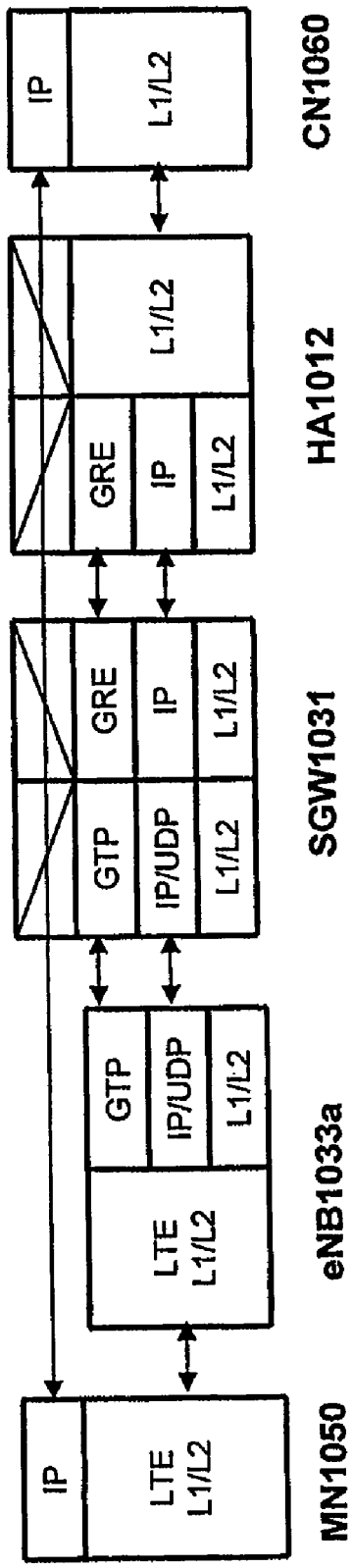
FIG. 23 is a diagram of a protocol stack of data transfer of a LTE access network based on the related art.

FIG. 23 is a diagram of a protocol stack of user data in the LET access network 3. As shown in FIG. 23, a user packet is transferred by GTP (GPRS Tunneling Protocol) tunneling between the eNBs 1033 (a to c) and the SGW 1031 and by GRE tunneling between the SGW 1031 and the HA 1012.

Figure 24:
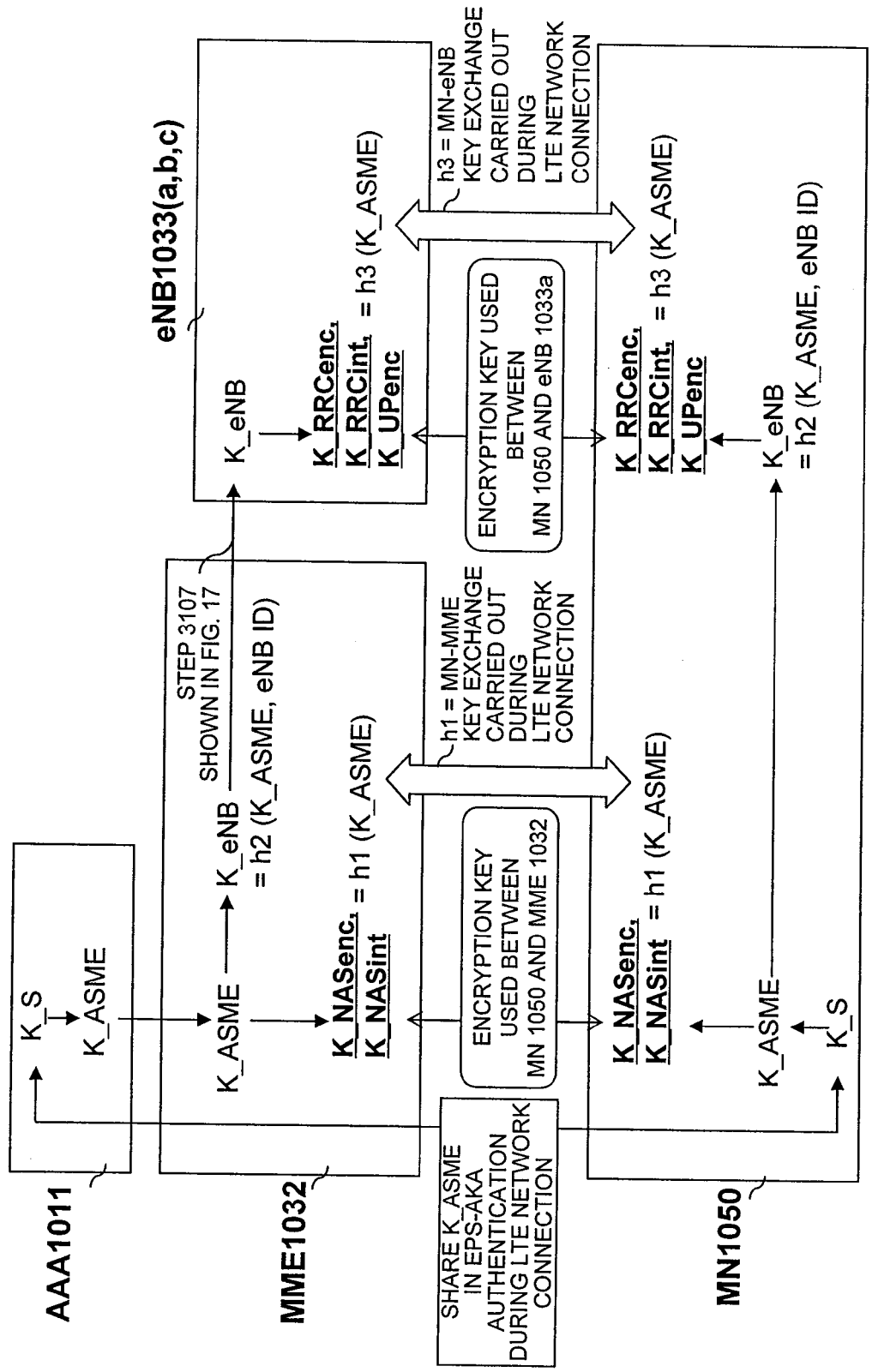
FIG. 24 is a diagram for explaining a method of generating a LTE encryption key based on the related art.

FIG. 24 is a diagram of a dependency relation among encryption keys in the LTE access network 1030 based on the related art (3GPP TS 33.401 v8.0.0). The AAA 1011 and the MN 1050 generate a seed key (K_ASME) using a pre-shared secret key (K_S) during EPS-AKA (Evolved Packet System—Authentication and Key Agreement) authentication between a terminal and a network carried out when the MN 1050 makes connection to the LTE access network 1030. The K_ASME is notified from the AAA 1011 to the MME 1032 in EPS-AKA authentication processing. The MME 1032 and the MN 1050 perform MN-MME key exchange processing using the K_ASME after the EPS-AKA authentication is carried out and generate encryption keys K_NASenc (for encryption) and K_NASint (for message authentication) for protecting control signals between the MN and the MME. The MME 1032 generates an encryption key K_eNB for eNBs from the K_ASME and notifies the eNB 1033a, which accommodates the MN 1050, of the encryption key K_eNB. The eNB 1033a and the MN 1050 carry out MN-eNB key exchange using the K_eNB and generate encryption keys K_RRCenc (for control signal encryption), K_RRCint (for control signal message authentication), and K_UPenc (for user data encryption) for protecting control signals and user data between the MN and the eNB.

HO-GW 1040

The HO-GW 1040 is a gateway apparatus connected to both the WiMAX access network 1020 and the LTE access network 1030. When the MN 1050 moves between the WiMAX access network 1020 and the LTE access network 1030, the HO-GW 1040 inter-converts an Inter-ASN-GW handover procedure in the WiMAX access network 1020 and an Inter-MME/SGW handover procedure in the LTE access network 1030 and relays the handover procedures.

The HO-GW 1040 behaves, for the WiMAX access network 1020, a virtual ASN-GW and a virtual WiMAX BS. In other words, the HO-GW 1040 makes connection to the ASN-GW 1021 through an ASN-GW interface (the R4 interface of the WiMAX) and transmits and receives control signals and user data. The HO-GW 1040 behaves, for the LTE access network 1030, a virtual MME and a virtual eNB. In other words, the HO-GW 1040 makes connection to the MME 1032 through an MME interface (an S10 interface of the LTE) and transmits and receives control signals. The HO-GW 1040 makes connection to an eNB interface (an X2 interface of the LTE) and transmits and receives user data to an eNB 1031. For example, the HO-GW 1040 may make connection to all eNBs in a predetermined LTE area or may make connection to only one or more eNBs (in the example shown in FIG. 22, the eNB 1033a) located in a boundary between the LTE access network 1030 and the WiMAX access network 1020. In the latter case, there is an advantage that resources used for connection to the eNBs by the HO-GW 1040 can be saved.

The apparatus configuration of the HO-GW 1040 is the same as that explained with reference to FIG. 2 in the first embodiment.

Context Table

The HO-GW 1040 includes a WiMAX context table 1100 shown in FIG. 25A and an LTE context table 1120 shown in FIG. 25B.

The WiMAX context table 1100 shown in FIG. 25A is a table with which the HO-GW 1040 manages a communication context of the WiMAX access network 1020. The WiMAX context table 1100 includes an MN ID 1101, connection destination information 1102, flow information 1103, authentication information 1104, data transfer information 1105, and a pointer 1106 to an LTE context.

In the MN ID 1101, an ID of an MN (a MAC address, etc.) in the WiMAX access network 1020 is set. In the connection destination information 1102, IDs of a BS that accommodate the MN, an ASN-GW, and an HA are set. In the flow information 1103, filter information for identifying a flow and a QoS for each flow are set. In the authentication information 1104, a parameter AK_GW (see FIG. 30, explained later) notified from the ASN-GW 1021 to the HO-GW 1040, a parameter AK_BS (see FIG. 36, explained later) notified from the HO-GW 1040 to the WiMAX BS 1022c, and the like are set. In the data transfer information 1105, tunnel information (i.e., an IP address of a tunnel endpoint (an ASN-GW or an HO-GW) and a GRE Key) for transmitting and receiving user data between the ASN-GW 1021 and the HO-GW 1040 during handover is set. In the pointer 1106 to the LTE context, a pointer to a related entry of the LTE context table 1120 (explained later) is set.

The LTE context table 1120 shown in FIG. 25B is a table with which the HO-GW 1040 manages a communication context of the LTE access network 1030. The LTE context table 1120 includes an MN ID 1121, connection destination information 1122, flow information 1123, authentication information 1124, data transfer information 1125, and a pointer 1126 to a WiMAX context.

In the MN ID 1121, an ID of an MN (IMSI, etc.) in the LTE access network 1030 is set. In the connection destination information 1122, IDs of an eNB that accommodates the MN, an MME, an SGW, and an HA are set. In the flow information 1123, filter information for identifying an IP flow and a QoS for each IP flow are set. In the authentication information 1124, a parameter K_eNB+* (see FIG. 36, explained later) notified from the MME 1032 to the HO-GW 1040, a parameter K_eNB* (see FIG. 30, explained later) notified from the HO-GW 1040 to the LTE eNB 1033a, and the like are set. In the data transfer information 1125, tunnel information (i.e., an IP address and a GTP TE ID (Tunnel Endpoint Identifier of a tunnel endpoint (an eNB or an HO-GW))) and the like for transmitting and receiving user data between the eNB 1033a and the HO-GW 1040 during handover are set. In the pointer 1126 to the WiMAX context, a pointer to a related entry of the WiMAX context table 1100 is set.

2. Handover Processing (WiMAX→LTE)

Figure 26:
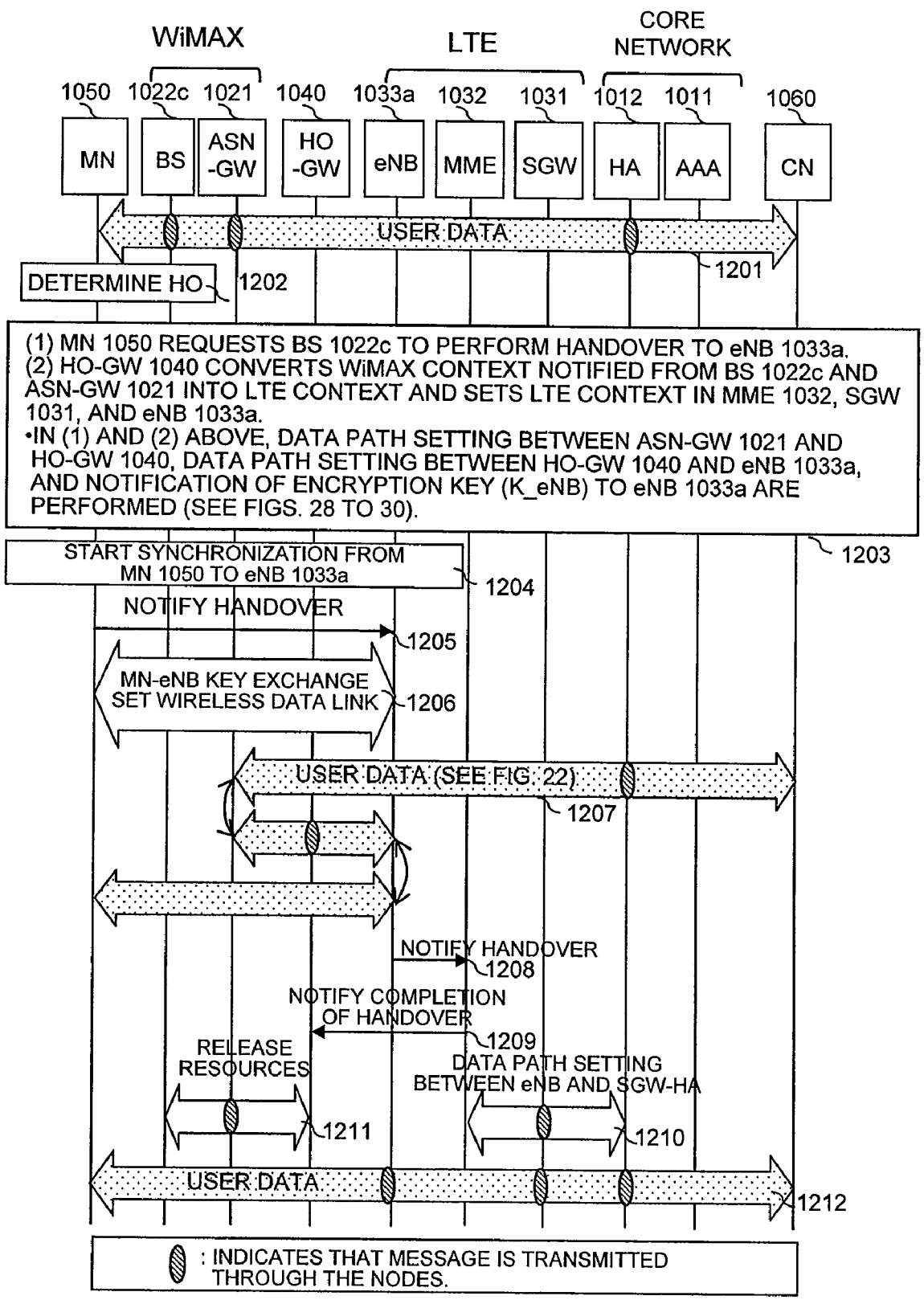
FIG. 26 is a diagram of a call flow of handover from the WiMAX to the LTE.

FIG. 26 is a diagram of a procedure in which the MN 1050 performs handover from the WiMAX access network 1020 to the LTE access network 1030 in the system according to the second embodiment. FIG. 22 is a diagram for explaining such handover.

First, the MN 1050 is connected to only the WiMAX access network 1020 and performs data communication with the CN 1060 through the BS 1022c, the ASN-GW 1021, and the HA 1012 (1201). At this point, the HO-GW 1040 does not store information concerning the MN 1050. On the other hand, the MN 1050, the ASN-GW 1021, the BS 1022c, and the HA 1012 store communication context information of the MN 1050 in the WiMAX access network 1020. The WiMAX communication context information includes connection destination information (IDs of a BS, an ASN-GW, and an HA) of the MN 1050, flow information (a flow filter and a QoS), tunnel information (an IP address and tunnel header information) for transferring user data among the HA, the ASN-GW, the BS, and the MN, and an encryption key for protecting a wireless communication between the MN and the BS. In the second embodiment, unlike the first embodiment, it is assumed that, instead of the MN 1050, the ASN-GW 1021 stores information (an ID of a virtual ASN-GW and an ID of a virtual BS) of the HO-GW 1040. In the LTE access network 1033, similarly, an MME and eNBs store the information (the ID of the virtual ASN-GW and the ID of the virtual BS) of the HO-GW 1040.

Thereafter, the MN 1050 determines handover to the LTE access network 1030 because, for example, a wireless wave state of the WiMAX is deteriorated (1202). The MN 1050 measures a wireless wave state of the LTE access network 1030 and determines, for example, an eNB having a best wireless wave state (in the example shown in FIG. 22, the eNB 1033a). In step 1203, (1) the MN 1050 requests the BS 1022c to perform handover to the eNB 1033a. (2) The BS 1022c and the ASN-GW 1021 notify the HO-GW 1040 of the WiMAX communication context and the HO-GW 1040 converts the WiMAX context into an LTE context and sets the LTE context in the MME 1032, the SGW 1031, and the eNB 1033a. Data path setting between the ASN-GW 1021 and the HO-GW 1040, data path setting between the HO-GW 1040 and the eNB 1033a, and notification of an encryption key (K_eNB*+) (see FIG. 30) to the eNB 1033a are performed during the processing of (1) and (2) in step 1203. Details of step 1203 are explained later with reference to FIGS. 28 to 29.

After step 1203, the MN 1050 starts synchronization with the eNB 1033a at a handover destination (1204) and transmits handover notification (1205) to the eNB 1033a. The eNB 1033a performs MN-eNB key exchange and wireless data link setting for user data (1206) with step 1205 as an opportunity. In the MN-eNB key exchange in step 1206, encryption keys (K_RRCenc, K_RRCint, and K_UPenc) for wireless protection (see FIG. 30, explained later) are generated by using the encryption key (K_eNB*+) notified to the eNB 1033a in step 1203.

Figure 27:
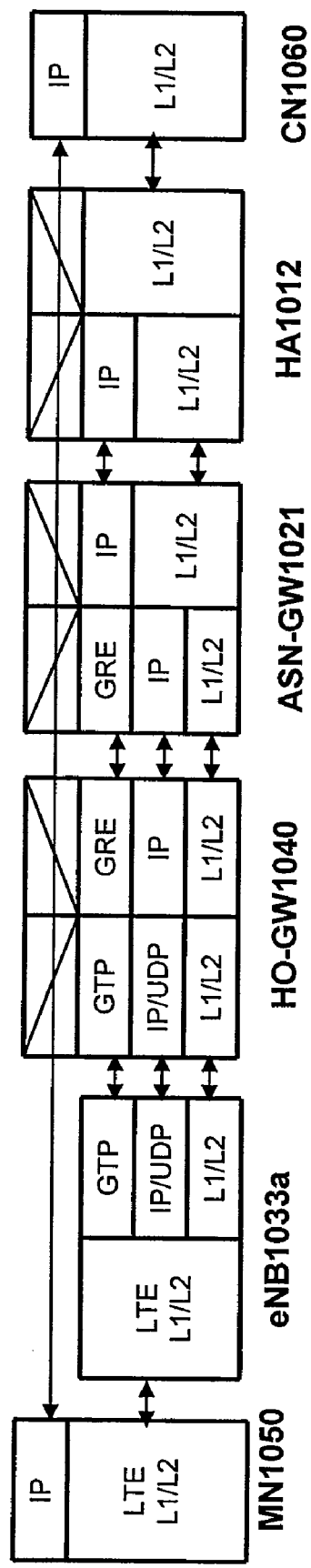
FIG. 27 is a diagram of a protocol stack of data transfer from the WiMAX to the LTE.

At the point of step 1207, user data is transmitted through a route of [CN 1060—HA 1012—ASN-GW 1021—HO-GW 1040—eNB 1033a—MN 1050]. An example of a protocol stack in this case is shown in FIG. 27. In this example, the ASN-GW 1021 and the HO-GW 1040 are connected through the ASN-GW interface (the R4 interface of the WiMAX and the GRE tunneling). The HO-GW 1040 and the eNB 1033a are connected through the eNB interface (the X2 interface of the LTE and the GTP tunneling). These data paths are set in step 1203.

Referring back to FIG. 26, the explanation of the handover procedure is continued. After step 1207, the eNB 1033a transmits handover notification (1208) to the MME 1032. The MME 1032 transfers handover completion notification (1209) to a virtual MME in the HO-GW 1040 and performs data path setting (1210) between the SGW 1031 and the HA 1012 and between the eNB 1033a and the SGW 1031. The HO-GW 1040 releases resources in the WiMAX access network 1020 (1211) with step 1209 as an opportunity. The handover procedure is completed and the user data is transmitted through a route of [CN 1060—HA 1012—SGW 1031—eNB 1033a—MN 1050] (1212).

Details of Step 1203

Details of step 1203 shown in FIG. 26 are explained below with reference to FIGS. 28 and 29.

Figure 28:
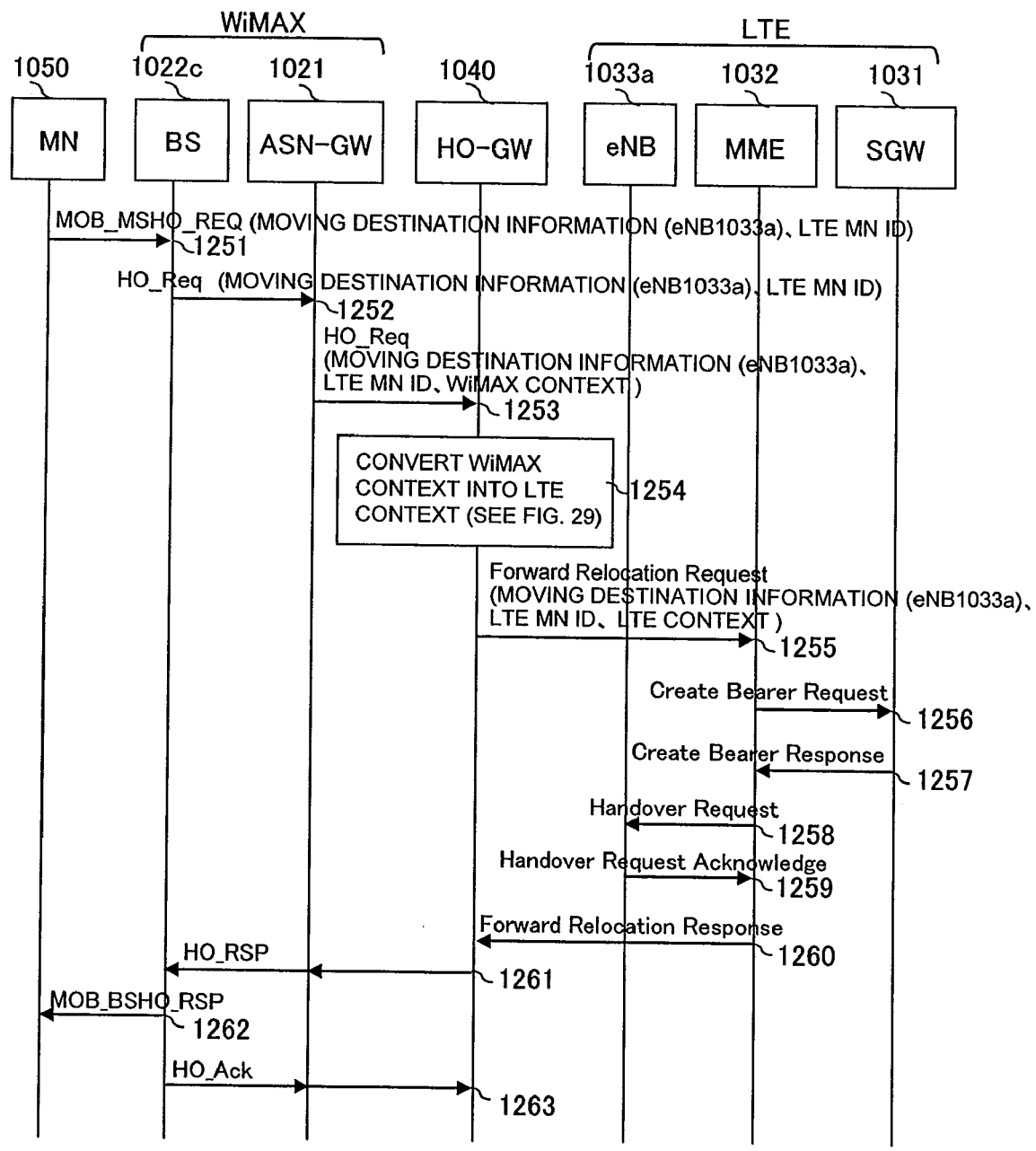
FIG. 28 is a diagram of a call flow of context transfer from the WiMAX to the LTE.

FIG. 28 is a diagram of an example of a detailed call flow of step 1203. First, the MN 1050 transmits MOB_M-SHO_REQ (1251) to the BS 1022c and requests preparation of handover. Moving destination information (an ID of the eNB 1033a) and an MN ID used in the LTE are included in the MOB_MSHO_REQ (1251). When the BS 1022c receives the MOB_MSHO_REQ (1251), the BS 1022c transmits HO-REQ (1252) including the same information to the ASN-GW 1021. Since an eNB of the LTE is designated in the moving destination information (eNB 1033a), the ASN-GW 1021 determines the HO-GW 1040 as a moving destination of the HO-REQ (1253). The ASN-GW 1021 adds WiMAX context information to the HO-REQ (1253) and transfers the WiMAX context information to the HO-GW 1040. The WiMAX context information notified to the HO-GW 1040 includes WiMAX connection destination information (IDs of the BS 1022c, the ASN-GW 1021, and the HA 1012), flow information (the flow filter information and the QoS) stored by the MN 1050, encryption information (AK_GW) (see FIG. 30, explained later), and data transfer information (an IP address and a GRE Key) on the ASN-GW 1021 side used for user data transfer between the ASN-GW 1021 and the HO-GW 1040.

The HO-GW 1040 stores these kinds of WiMAX context information in the WiMAX context table 1100 shown in FIG. 25A.

The HO-GW 1040 generates LTE context information on the basis of the WiMAX context notified in step 1253 (1254). LTE context generation processing in step 1254 is explained in detail below with reference to FIG. 29.

Figure 29:
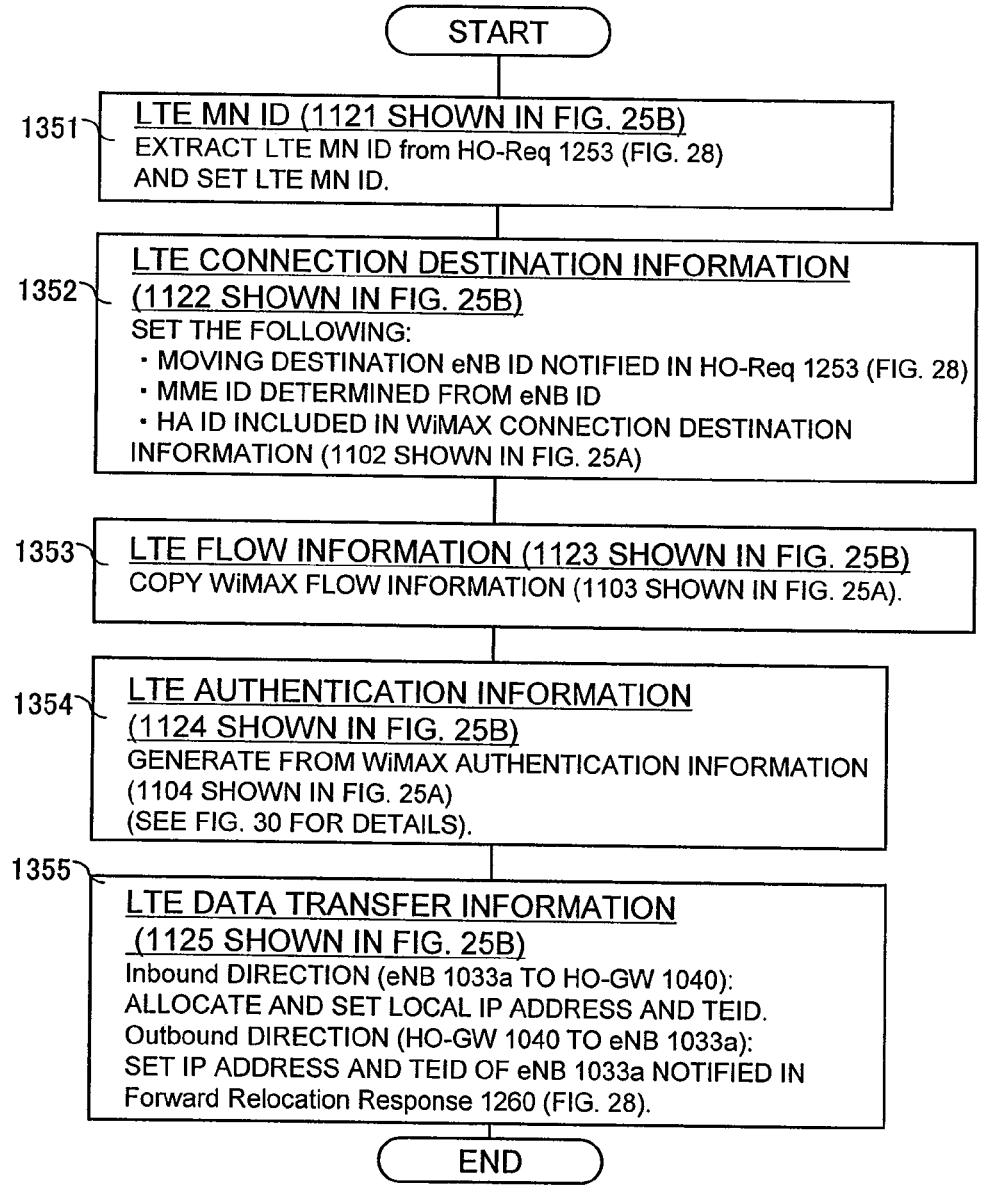
FIG. 29 is a diagram of a LTE context generation routine based on the WiMAX context.

FIG. 29 is a diagram of an LTE context generation routine 1350 in the HO-GW 1040. First, the HO-GW 1040 extracts an LTE MN ID from the HO-Req (1253) shown in FIG. 28 and sets the LTE MN ID in the LTE MN ID 1121 shown in FIG. 25B (1351). The HO-GW 1040 sets, as the LTE connection destination information (1122 shown in FIG. 25B), a moving destination eNB ID extracted from the HO-Req (1253) shown in FIG. 28, an MME ID determined from the eNB ID, and an HA ID included in the WiMAX connection destination information 1102 shown in FIG. 25A (1352). The HO-GW 1040 may manage an internal table for determining an MME ID from the moving destination eNB ID. Subsequently, the HO-GW 1040 directly sets contents of the WiMAX flow information 1103 shown in FIG. 25A as the flow information (1123 shown in FIG. 25B) of the LTE (1353). However, when QoS settings of the WiMAX access network 1020 and the LTE access network 1030 are different, the HO-GW 1040 may convert and set a QoS value. The HO-GW 1040 generates K_eNB* from the WiMAX authentication information AK_GW (1104 shown in FIG. 25A) and sets the K_eNB* as the LTE authentication information (1124 shown in FIG. 25B) (1354). A method of generating K_eNB* from the AK_GW is explained later with reference to FIG. 30. The HO-GW 1040 sets, as tunnel information in an Inbound direction of the LTE data transfer information (1125 shown in FIG. 25B), an IP address and a GRE Key locally determined by the HO-GW 1040 (1125). Tunnel information in an Outbound direction of the LTE data transfer information (1125 shown in FIG. 25B) is notified from the MME 1032 in Forward Relocation Response (1260) shown in FIG. 28. The LTE context generation routine 1350 is completed.

Referring back to FIG. 28, the explanation of the call flow is continued. After generating the LTE context information in step 1254, the HO-GW 1040 transmits Forward Relocation Request (1255) to the MME 1032 determined from the moving destination information (the eNB 1033*a*). The moving destination information (the eNB 1033*a*), the LTE MN ID, the LTE context (e.g., connection destination information (an ID of an HA), flow information (a flow filter and a QoS), authentication information (K_eNB*), and data transfer information (an IP address and a GTP TEID) on the HO-GW 1040 side used for user data transfer between the eNB 1033*a* and the HO-GW 1040) generated in step 1254 are included in the Forward Relocation Request (1255).

The MME 1032 transmits Create Bearer Request (1256) to the SGW 1031 associated with the MME 1032 itself. For example, connection destination information (an ID of an HA) of the MN 1050 and flow information (a flow filter and a QoS) are included in the Create Bearer Request (1256). The SGW 1031 transmits Create Bearer Response (1257) to the MME 1032. For example, tunnel information (an IP address and a GTP TEID) on the SGW 1031 side used for user data transfer between the SGW 1031 and the eNB 1033*a* is included in the Create Bearer Response (1257).

The MME 1032 transmits Handover Request (1258) to the eNB 1033*a*. For example, the flow information (the flow filter and the QoS) of the MN 1050, the tunnel information (the IP address and the GTP TEID) of the SGW 1030 notified in step 1257, the data transfer information (the IP address and the GTP TEID) on the HO-GW 1040 side used for user data transfer between the eNB 1033*a* and the HO-GW 1040, a parameter (K_eNB*+) generated from the authentication information (K_eNB*) by the MME 1032 are included in the Handover Request (1258). The eNB 1033*a* stores these kinds of information and returns Handover Request Acknowledge (1259) to the MME 1032. For example, data transfer information (an IP address and a GTP TEID) on the eNB 1033*a* side used for user data transfer between the eNB 1033*a* and the HO-GW 1040 and tunnel information (an IP address and a TEID) on the eNB 1033*a* side used for user data transfer between the eNB 1033*a* and the SGW 1031 are included in the Handover Request Acknowledge (1259).

The MME 1032 transmits Forward Relocation Response (1260) to the HO-GW 1040. For example, the data transfer information (the IP address and the GTP TEID) on the eNB 1033*a* side used for user data transfer between the eNB 1033*a* and the HO-GW 1040 is included in the Forward Relocation Response (1260). A user data transfer path between the eNB 1033*a* and the HO-GW 1040 is established by combining the data transfer information (the IP address and the GTP TEID of the HO-GW 1040) of the HO-GW 1040 included in step 1255 and the data transfer information (the IP address and the GTP TEID) of the eNB 1033*a* included in step 1260.

The HO-GW 1040 transmits HO_RSP (1261) to the ASN-GW 1021 and the BS 1022*c* and notifies the ASN-GW 1021 and the BS 1022*c* of the completion of the handover preparation phase. For example, data transfer information (an IP address and a GRE Key) on the HO-GW 1040 side used for data transfer between the ASN-GW 1021 and the HO-GW 1040 is included in the HO_RSP (1261). A user data transfer path between the ASN-GW 1021 and the HO-GW 1040 is established by combining the data transfer information (the IP address and the GRE Key) of the ASN-GW 1021 included in step 1253 and the data transfer information (the IP address and the GRE Key) of the HO-GW 1040 included in step 1261.

The BS 1022 transmits MOB_BSHO_RSP (1262) to the MN 1050 and notifies the MN 1050 of the completion of the handover preparation phase. The BS 1022*c* transmits HO_Ack (1263) to the ASN-GW 1021 and the HO-GW 1040 and the call flow shown in FIG. 28 is completed.

Figure 30:
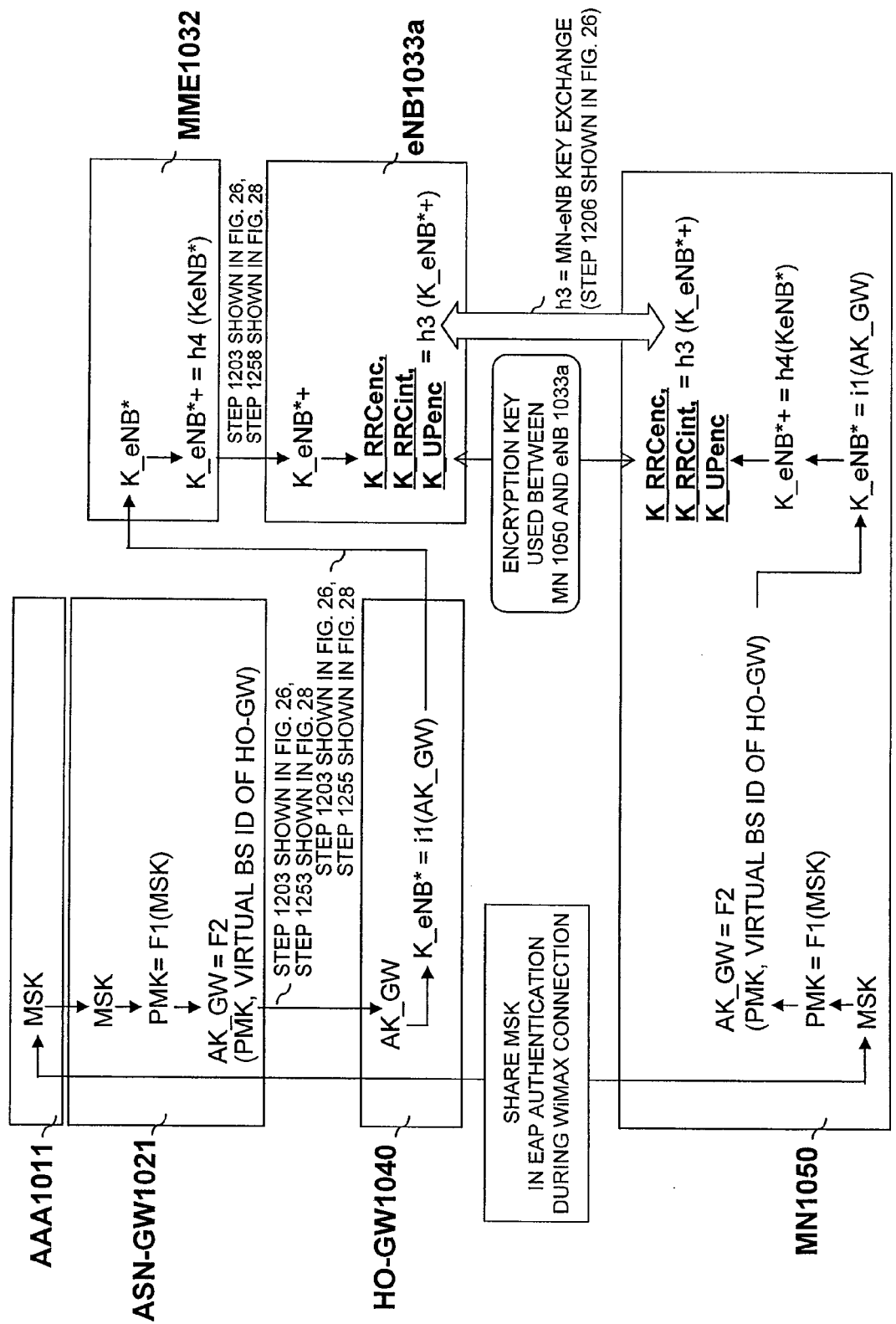
FIG. 30 is a diagram for explaining a method of generating an encryption key of the LTE from authentication information of the WiMAX.

Dependency Relation Among Encryption Keys in Handover Processing Between the WiMAX and the LET A method of generating an encryption key in handover between the WiMAX and the LTE is explained below with reference to FIG. 30. First, when the MN 1050 makes connection to the WiMAX access network 1020, EAP authentication is performed and the MN 1050 and the AAA 1011 share an MSK. The MSK is notified from the AAA 1011 to the ASN-GW 1021 in an EAP authentication process. The ASN-GW 1021 generates a PMK from the MSK using an algorithm (F1) set beforehand and stores the PMK on a memory thereof.

Thereafter, during handover from the WiMAX access network 1020 to the LTE access network 1030, the ASN-GW 1021 generates AK_GW from the PMK and the virtual BS ID of the HO-GW 1040 using an algorithm (F2) set beforehand. The AK_GW is notified from the ASN-GW 1021 to the HO-GW 1040 in HO_Req (1253 shown in FIG. 28). The HO-GW 1040 generates K_eNB* from the AK_GW using an algorithm (i1) set beforehand. The K_eNB* is notified from the HO-GW 1040 to the MME 1032 in Forward Relocation Request (1255 shown in FIG. 28). The MME 1032 generates K_eNB*+ from the K_eNB* using an algorithm (h4) set beforehand. The K_eNB+ is notified from the MME 1032 to the eNB 1033*a* in Handover Request (1258 shown in FIG. 28). The eNB 1033*a* carries out MN-eNB key exchange processing (step 1206 shown in FIG. 26) with the MN 1050 using K_eNB*+ and generates encryption keys K_RRCenc (for control signal encryption), K_RRCint (for control signal message authentication), and K_UPenc (for user data encryption) for protecting control signals and user data between an MN and eNBs.

In this way, the HO-GW 1040 generates authentication information (K_eNB*) of the LTE access network 1030 using the authentication information (AK_GW) notified from the WiMAX access network 1020. This makes it possible to protect user data communication through the LTE access network 1030 without performing the authentication processing in the LTE access network 1030.

Contents of the key exchange processing are different depending on a wireless access type. In the case of the LTE, for example, the key exchange processing includes processing for generating the K_RRCenc, the K_RRCint, and K_UPenc from the K_eNB*+ in FIG. 30. More specifically, the key exchange processing is executed as explained below.

(1) The eNB 1033a generates encryption keys (K_RRCenc, K_RRCint, and K_UPenc), which are actually used, from an encryption algorithm type in use and the shared key (K_eNB*+) between the eNB 1033a and the MN 1050.
(2) The eNB 1033a transmits a message called Security Mode Command to the MN 1050. The encryption algorithm type in use is included in the Security Mode Command. The Security Mode Command includes a MAC (Message Authentication Code) calculated by using the encryption key (K_RRCint) in (1).
(3) The MN 1050 acquires an encryption algorithm from the message in (2) and generates encryption keys (K_RRCenc, K_RRCint, and K_UPenc), which are actually used, in the same manner as the eNB 1033a.
(4) The MN 1050 verifies the MAC included in the Security Mode Command using the encryption key (K_RRCint) in (3) and checks whether correct keys are generated.

In the case of the LTE, since an encryption key itself is not always transmitted and received between nodes, such processing may be referred to "Security Mode Command Procedure". However, in this specification, the processing is uniformly referred to as "key exchange processing".

3. Handover Processing (LTE→WiMAX)

Figure 31:
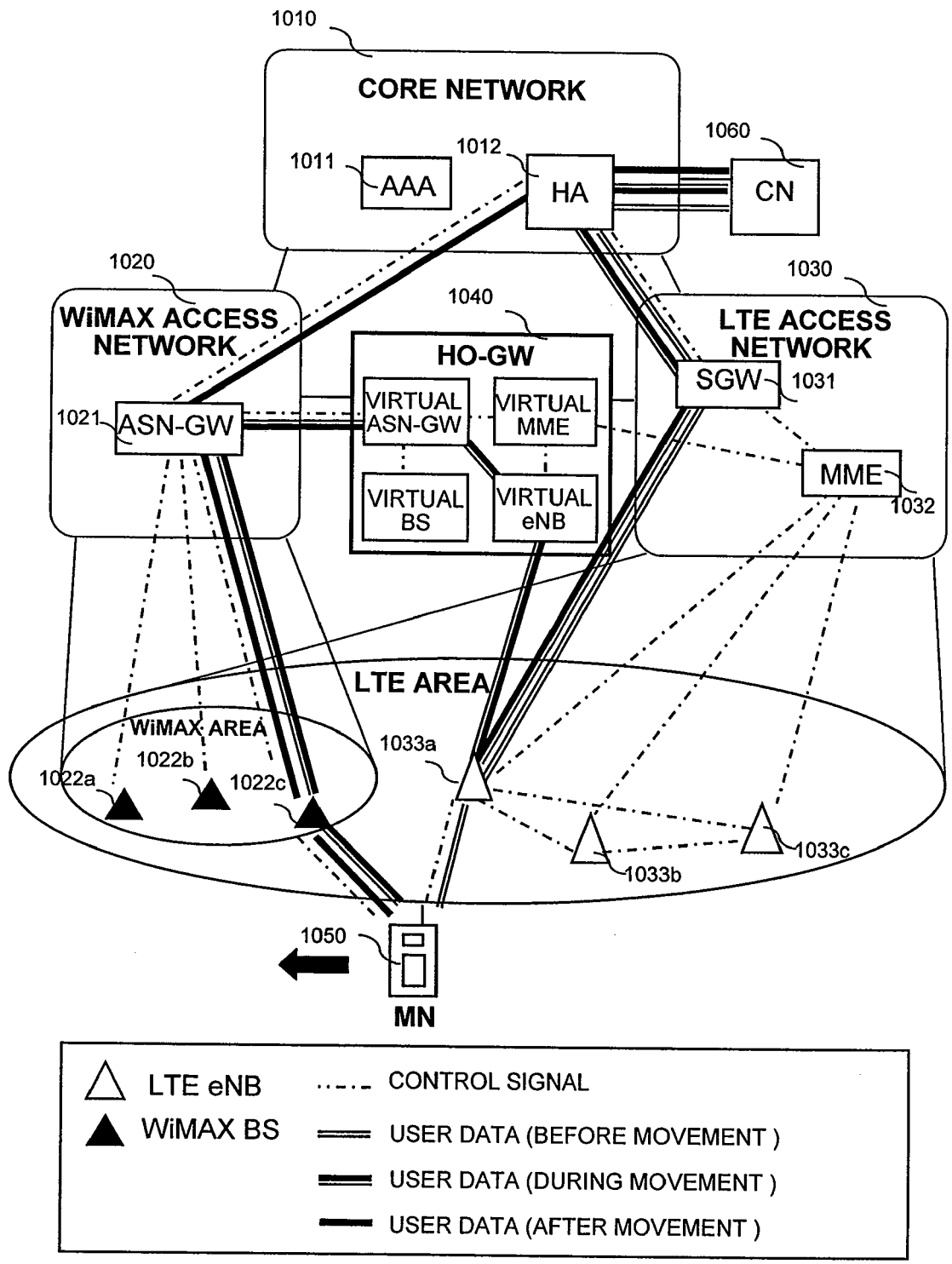
FIG. 31 is a diagram for explaining handover from the LTE to the WiMAX.
Figure 32:
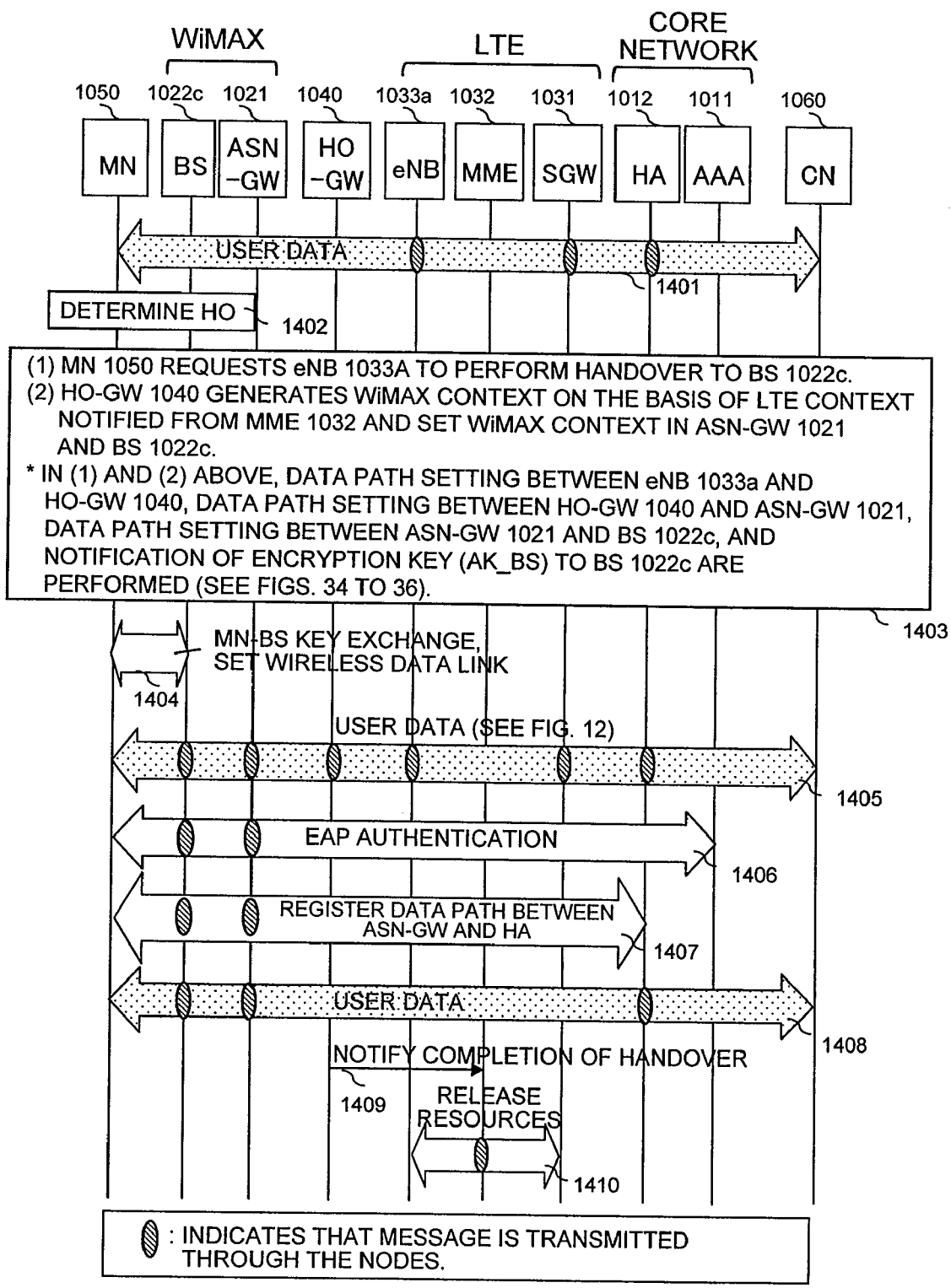
FIG. 32 is a diagram of a call flow of handover from the LTE to the WiMAX.

FIG. 32 is a diagram of a procedure in which the MN 1050 performs handover from the LTE access network 1030 to the WiMAX access network 1020 in the system according to the second embodiment. A transfer route of user data in the handover is shown in FIG. 31.

First, the MN 1050 is connected to only the LTE access network 1030 and performs data communication with the CN 1060 through the eNB 1033a, the SGW 1031, and the HA 1012 (1401). At this point, the HO-GW 1040 does not store information concerning the MN 1050. On the other hand, the MN 1050, the eNB 1033a, the MME 1032, the SGW 1031, and the HA 1012 store communication context information of the MN 1050 in the LTE access network 1030. The LTE communication context information includes connection destination information (IDs of eNBs, an MME, an SGW, and an HA) of the MN 1050, flow information (a flow filter and a QoS), tunnel information (an IP address and tunnel header information) for transferring user data among the HA, the SGW, the eNBs, and the MN, an encryption key for protecting wireless communication between the MN and the eNBs, and an encryption key for protecting control signals between the MN and the MME.

Thereafter, the MN 1050 determines handover to the WiMAX access network 1020 because, for example, signal intensity of the WiMAX BS 1022c increases (1402). In step 1403, (1) the MN 1050 requests the eNB 1033a to perform handover to the BS 1022c. (2) The MME 1032 notifies the HO-GW 1040 of an LTE communication context. The HO-GW 1040 converts the LTE context into a WiMAX context and sets the WiMAX context in the ASN-GW 1021 and the BS 1022c. Data path setting between the eNB 1033a and the HO-GW 1040, data path setting between the HO-GW 1040 and the ASN-GW 1021, data path setting between the ASN-GW 1021 and the BS 1022c, and notification of an encryption key (AK_BS) (see FIG. 36, explained later) to the BS 1022c are performed in the processing of (1) and (2) in step 1403. Details of step 1403 are explained later with reference to FIGS. 34 to 36.

After step 1403, the MN 1050 starts synchronization with the BS 1022c at a handover destination and performs MN-BS key exchange and wireless data link setting for user data (1404). In the MN-eNB key exchange in step 1404, an encryption key (TSK_BS) for wireless protection (see FIG. 36, explained later) is generated by using the encryption key (AK_BS) notified to the BS 1022c in step 1403.

Figure 33:
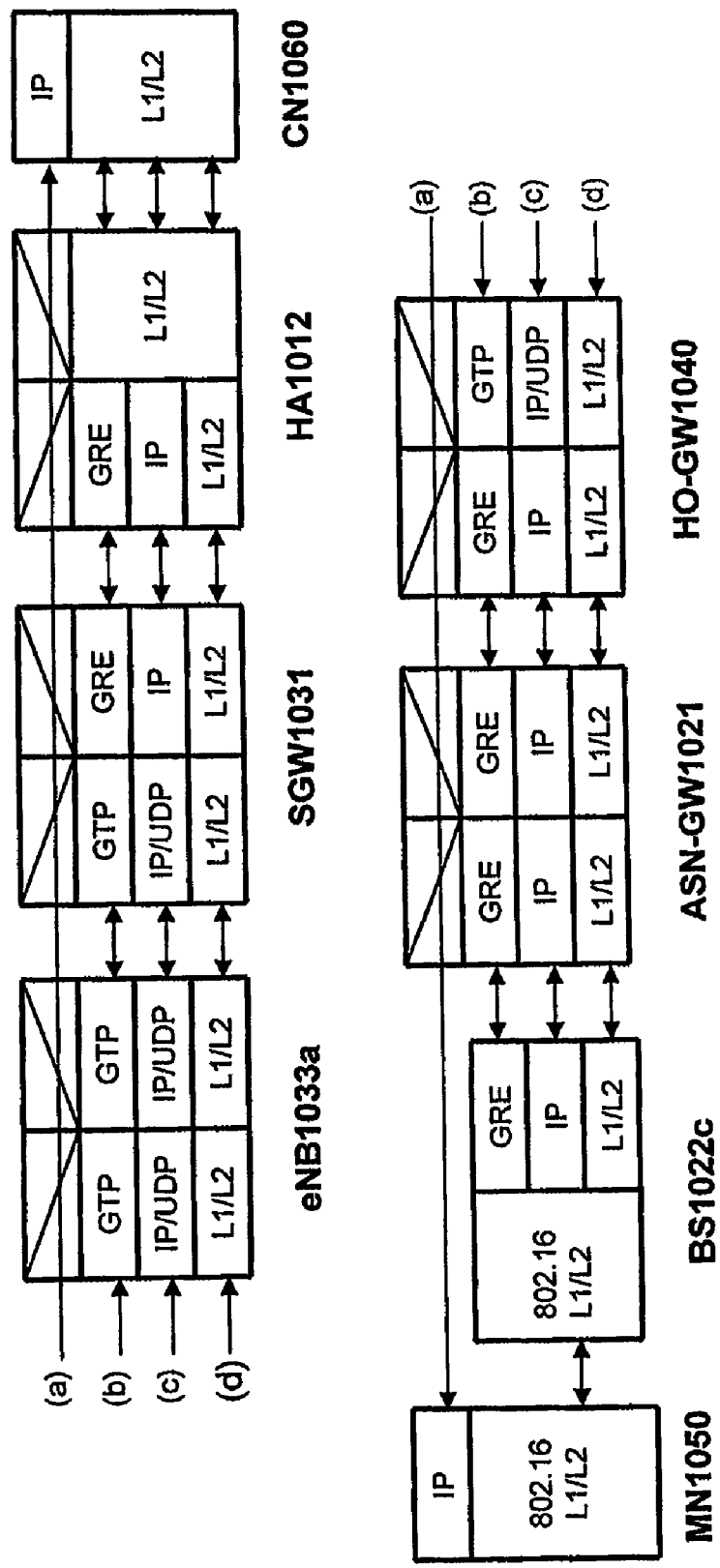
FIG. 33 is a diagram of a protocol stack of data transfer from the LTE to the WiMAX.

At the point of step 1405, user data is transmitted through a route of [CN 1060—HA 1012—SGW 1031—eNB 1033a—HO-GW 1040—ASN-GW 1021—BS 1022c—MN 1050]. An example of a protocol stack in this case is shown in FIG. 33. In this example, the eNB 1033a and the HO-GW 1040 are connected through the eNB interface (the X2 interface of the LTE and the GTP tunneling). The HO-GW 1040 and the ASN-GW 1021 are connected through the ASN-GW interface (the R4 interface of the WiMAX and the GRE tunneling). These data paths are set in step 1403.

Referring back to FIG. 32, the explanation of the handover procedure is continued. After step 1405, EAP authentication is performed in the WiMAX access network 1020 (1406). Data path registration between the ASN-GW 1021 and the HA 1012 is performed (1407). The user data is transmitted through a route of [CN 1060—HA 1012—ASN-GW 1021—BS 1022c—MN 1050] (1408). Thereafter, when handover completion notification (1409) is transmitted from the HO-GW 1040 to the MME 1032, the resources in the LTE access network 1030 are released (1409) and the handover processing is completed.

Details of Step 1403

Details of step 1403 shown in FIG. 32 are explained with reference to FIGS. 34 and 35.

Figure 34:
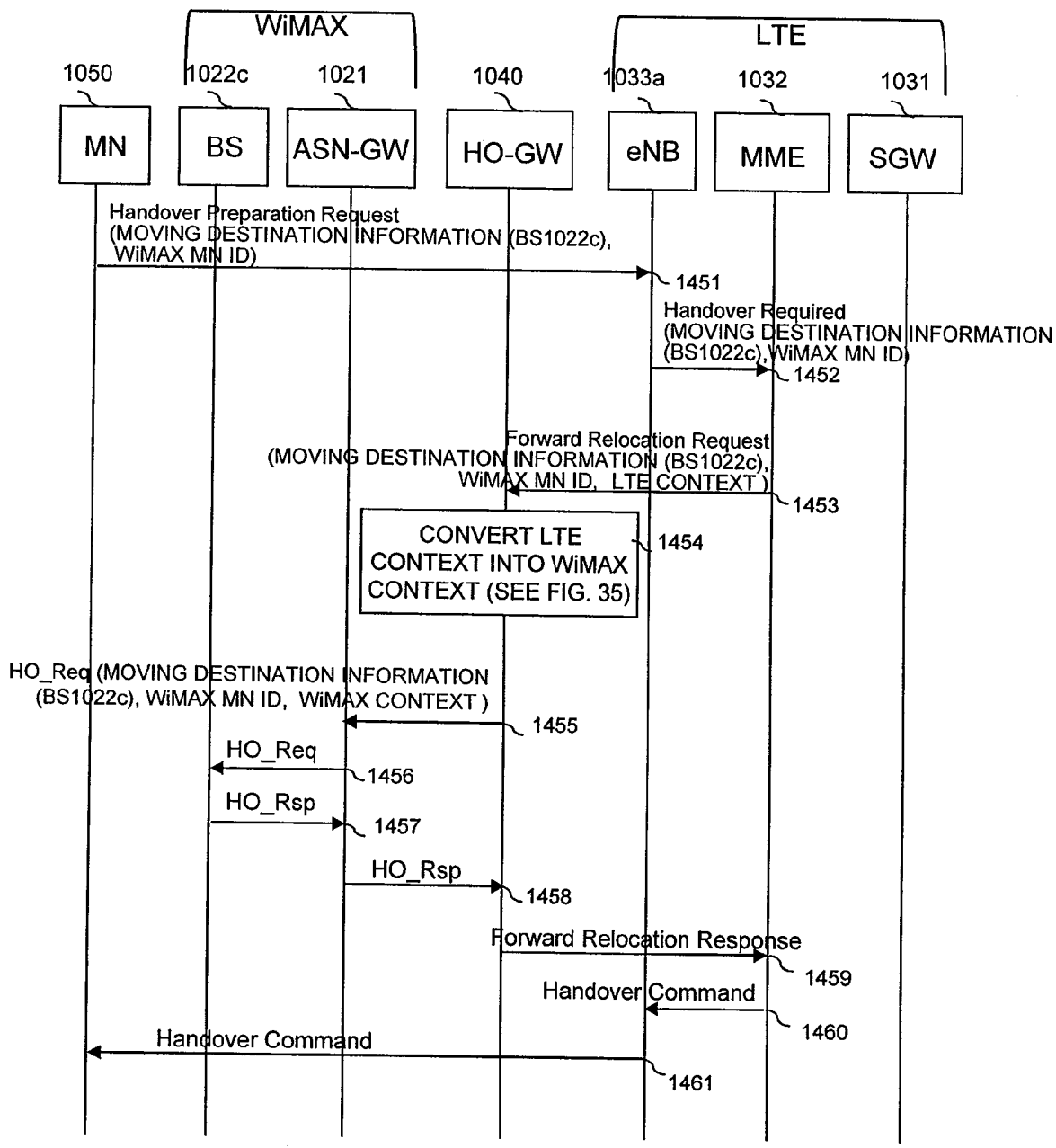
FIG. 34 is a diagram of a call flow of context transfer from the LTE to the WiMAX.

FIG. 34 is a diagram of an example of a detailed call flow in step 1403. First, the MN 1050 transmits Handover Preparation Request (1451) to the eNB 1033a and requests preparation for handover. Moving destination information (an ID of the BS 1022c) and an MN ID used in the WiMAX are included in the Handover Preparation Request (1451). When the eNB 1033a receives the Handover Preparation Request (1451), the eNB 1033a transmits Handover Required (1452) to the MME 1032. The moving destination information (the ID of the BS 1022c), the WiMAX MN ID, and the data transfer information (the IP address and the GTP TEID) on the eNB 1033a side used for user data transfer between the eNB 1033a and the HO-GW 1040 are included in the Handover Required (1452).

Since a BS of the WiMAX is designated in the moving destination information (the BS 1022c), the MME 1032 transmits Forward Relocation Request (1453) to the HO-GW 1040. The WiMAX MN ID, the moving destination information (the BS 1022c), and an LTE context are included in the Forward Relocation Request (1453). The LTE context includes, for example, LTE connection destination information (IDs of the eNB 1033a, the MME 1032, the SGW 1031, and the HA 1012), the flow information (the flow filter and the QoS) stored by the MN 1050, the encryption key information (K_eNB*) (see FIG. 36, explained later), and the data transfer information (the IP address and the GTP TEID) on the eNB 1033a side used for user data transfer between the eNB 1033a and the HO-GW 1040. The HO-GW 1040 stores these kinds of LTE context information in the LTE context table 1120 shown in FIG. 25B.

The HO-GW 1040 generates WiMAX context information on the basis of the LTE context notified in step 1453 (1454). WiMAX context generation processing in step 1454 is explained in detail with referenced to FIG. 35.

Figure 35:
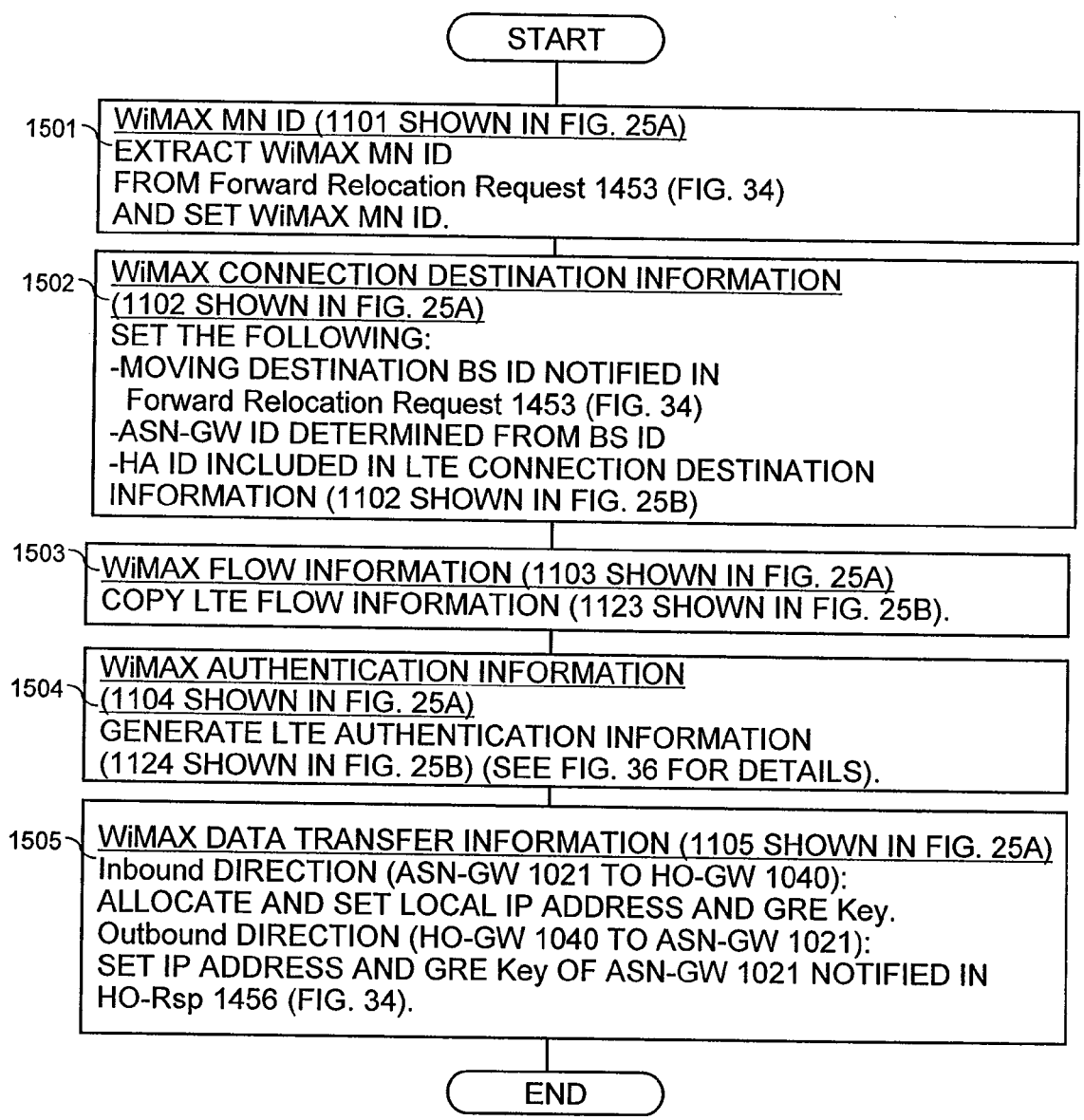
FIG. 35 is a diagram of a WiMAX context generation routine based on the LTE context.

FIG. 35 is a diagram of a WiMAX context generation routine 1500 in the HO-GW 1040. First, the HO-GW 1040 extracts the WiMAX MN ID from the Forward Relocation Request (1453) shown in FIG. 34 and sets the WiMAX MN ID in the WiMAX MN ID 1101 shown in FIG. 25A (1501). The HO-GW 1040 sets, as the WiMAX connection destination information (1102 shown in FIG. 25A), a moving destination BS ID extracted from the Forward Relocation Request (1453) shown in FIG. 34, an ASN-GW ID determined from the BS ID, and an HA ID included in the LTE connection destination information 1122 shown in FIG. 25B (1502). The HO-GW 1040 may manage an internal table for determining an ASN-GW ID from the moving destination BS ID. The HO-GW 1040 directly sets contents of the LTE flow information 1123 shown in FIG. 25B as the flow information of the WiMAX (1103 shown in FIG. 25A) (1503). However, when QoS settings of the LTE access network 1030 and the WiMAX access network 1020 are different, the HO-GW 1040 may convert and set a QoS value. The HO-GW 1040 generates AK_BS from the LTE authentication information K_eNB* (1124 shown in FIG. 25B) and sets the AK_BS as the WiMAX authentication information (1104 shown in FIG. 25A) (1504). A method of generating AK_BS from the K_eNB* is explained later with reference to FIG. 36. The HO-GW 1040 sets, as tunnel information in an Inbound direction of the WiMAX data transfer information (1105 shown in FIG. 25A), an IP address and a GRE Key locally determined by the HO-GW 1040 (1505). Tunnel information in an Outbound direction of the WiMAX data transfer information (1125 shown in FIG. 25B) is notified from the ASN-GW 1021 in HO_Rsp (1456) shown in FIG. 34. The WiMAX context generation routine 1500 is completed.

Referring back to FIG. 34, the explanation of the call flow is continued. After generating the WiMAX context information in step 1454, the HO-GW 1040 transmits HO_Req (1455) to the ASN-GW 1021 determined from the moving destination information (the BS 1022c). For example, the moving destination information (the BS 1022c), the WiMAX MN ID, the WiMAX context (connection destination information (an ID of an HA), flow information (a flow filter and a QoS), authentication information (AK_BS), and data transfer information (an IP address and a GRE Key) on the HO-GW 1040 side used for user data transfer between the HO-GW 1040 and the ASN-GW 1021) generated in step 1454 are included in the HO-Req (1455). The ASN-GW 1021 transfers the HO_Req (1456) to the BS 1022c at the moving destination. For example, the WiMAX MN ID, the flow information (the flow filter and the QoS), the authentication information (AK_BS), tunnel information (an IP address and a GRE Key) on the ASN-GW 1021 side used for user data transfer between the ASN-GW 1021 and the BS 1022c are included in the HO_Req (1456).

The BS 1022c transmits HO_Rsp (1457) to the ASN-GW 1021. For example, tunnel information (an IP address and a GRE Key) on the BS 1022c side used for user data transfer between the ASN-GW 1021 and the BS 1022c is included in the HO-Rsp (1457). A user data transfer path between the ASN-GW 1021 and the BS 1022c is established by combining the tunnel information (the IP address and the GRE Key) of the ASN-GW 1021 included in step 1456 and the tunnel information (the IP address and the GRE Key) of the BS 1022c included in step 1457.

The ASN-GW 1021 transmits HO_Rsp (1458) to the HO-GW 1040. For example, the data transfer information (the IP address and the GRE Key) on the ASN-GW 1021 side used for user data transfer between the HO-GW 1040 and the ASN-GW 1021 is included in the HO_Rsp (1458). A user data transfer path between the HO-GW 1040 and the ASN-GW 1021 is established by combining the tunnel information (the IP address and the GRE Key) of the HO-GW 1040 included in step 1455 and the tunnel information (the IP address and the GRE Key) of the ASN-GW 1021 included in step 1458.

The HO-GW 1040 transmits Forward Relocation Response (1459) to the MME 1032 and notifies the MME 1032 of the completion of the handover preparation phase. For example, the data transfer information (the IP address and the GTP TEID) of the HO-GW 1040 used for user data transfer between the eNB 1033a and the HO-GW 1040 is included in the Forward Relocation Response (1459).

The MME 1032 transmits Handover Command (1460) to the eNB 1033a and notifies the eNB 1033a of the completion of the handover preparation phase. The data transfer information (the IP address and the GTP TEID) on the HO-GW 1040 side used for data transfer between the eNB 1033a and the HO-GW 1040 is included in the Handover Command (1460). A user data transfer path between the eNB 1033a and the HO-GW 1040 is established by combining the data transfer information (the IP address and the GTP TEID) of the eNB 1033a included in step 1453 and the data transfer information (the IP address and the GTP TEID) of the HO-GW 1040 included in step 1460.

Finally, Handover Command (1461) is transmitted from the eNB 1033a to the MN 1050 and the call flow shown in FIG. 34 is completed.

Figure 36:
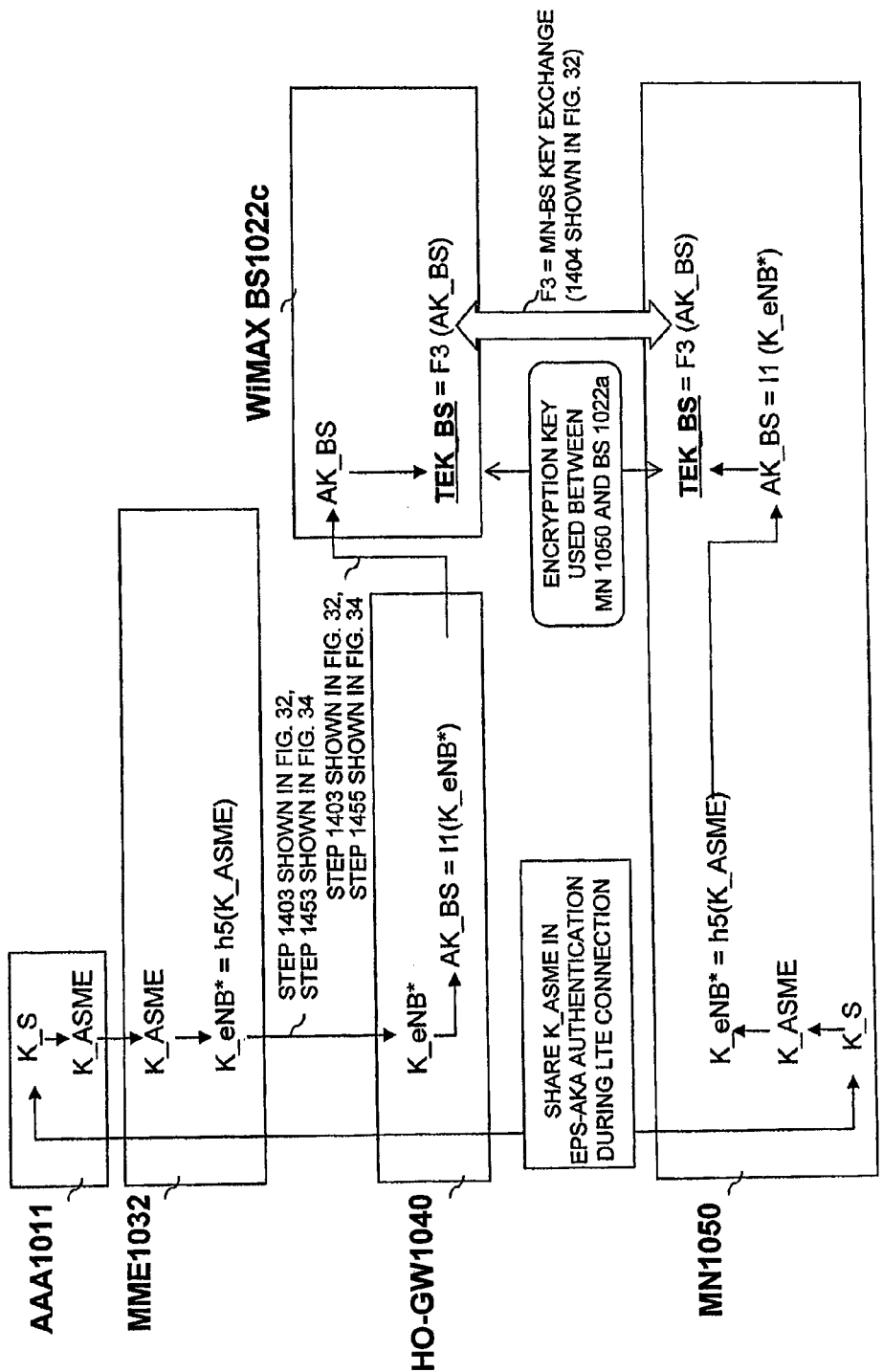
FIG. 36 is a diagram for explaining a method of generating an encryption key of the WiMAX from authentication information of the LTE.

Dependency Relation Among Encryption Keys in Handover Processing Between the LTE and the WiMAX A method of generating an encryption key in handover between the LTE and the WiMAX is explained with reference to FIG. 36. First, when the MN 1050 makes connection to the LTE access network 1030, EPS-AKA authentication is performed. At this point, the MN 1050 and the AAA 1011 generate a seed key (K_ASME) from a pre-shared secret key (K_S). The K_ASME is notified from the AAA 1011 to the MME 1032 in the EPS-AKA authentication processing.

Thereafter, during handover from the LTE access network 1030 to the WiMAX access network 1020, the MME 1032 generates K_eNB* from the K_ASME using an algorithm (h5) set beforehand. The K_eNB* is notified from the MME 1032 to the HO-GW 1040 in the Forward Relocation Request (1453 shown in FIG. 34). The HO-GW 1040 generates AK_BS from the K_eNB* using an algorithm (I1) set beforehand. The AK_BS is notified from the HO-GW 1040 to the BS 1022c in the HO_Req (1455 and 1456 shown in FIG. 34). The BS 1022c carries out the MN-BS key exchange processing (step 1404 shown in FIG. 32) with the MN 1050 using the AK_BS and generates an encryption key TEK_BS for protecting wireless communication between the MN and the BSs.

In this way, the HO-GW 1040 generates authentication information (AK_BS) of the WiMAX access network 1020 using the authentication information (K_eNB*) notified from the LTE access network 1030. This makes it possible to protect user data communication through the WiMAX access network 1020 without performing the authentication processing in the WiMAX access network 1020.

Contents of the key exchange processing are different depending on a wireless access type. In the case of the WiMAX, for example, the key exchange processing includes processing for generating TEK_BS from AK_BS shown on the right side of FIG. 36. More specifically, the key exchange processing is executed as explained below.
(1) The BS 1022C generates a key for encrypting an encryption key (KEK: Key Encryption Key) from the shared key (AK_BS) between the BS 1022C and the MN 1050.
(2) The BS 1022C generates an encryption key TEK_BS that is actually used.
(3) The BS 1022C encrypts the TEK_BS generated in (2) with the KEK generated in (1) and transmits the TEK_BS to the MN 1050.
(4) The MN 1050 generates KEK in the same manner as the BS 1022C, decrypts information acquired in (3), and extracts the KEK.

III. Third Embodiment

Figure 37:
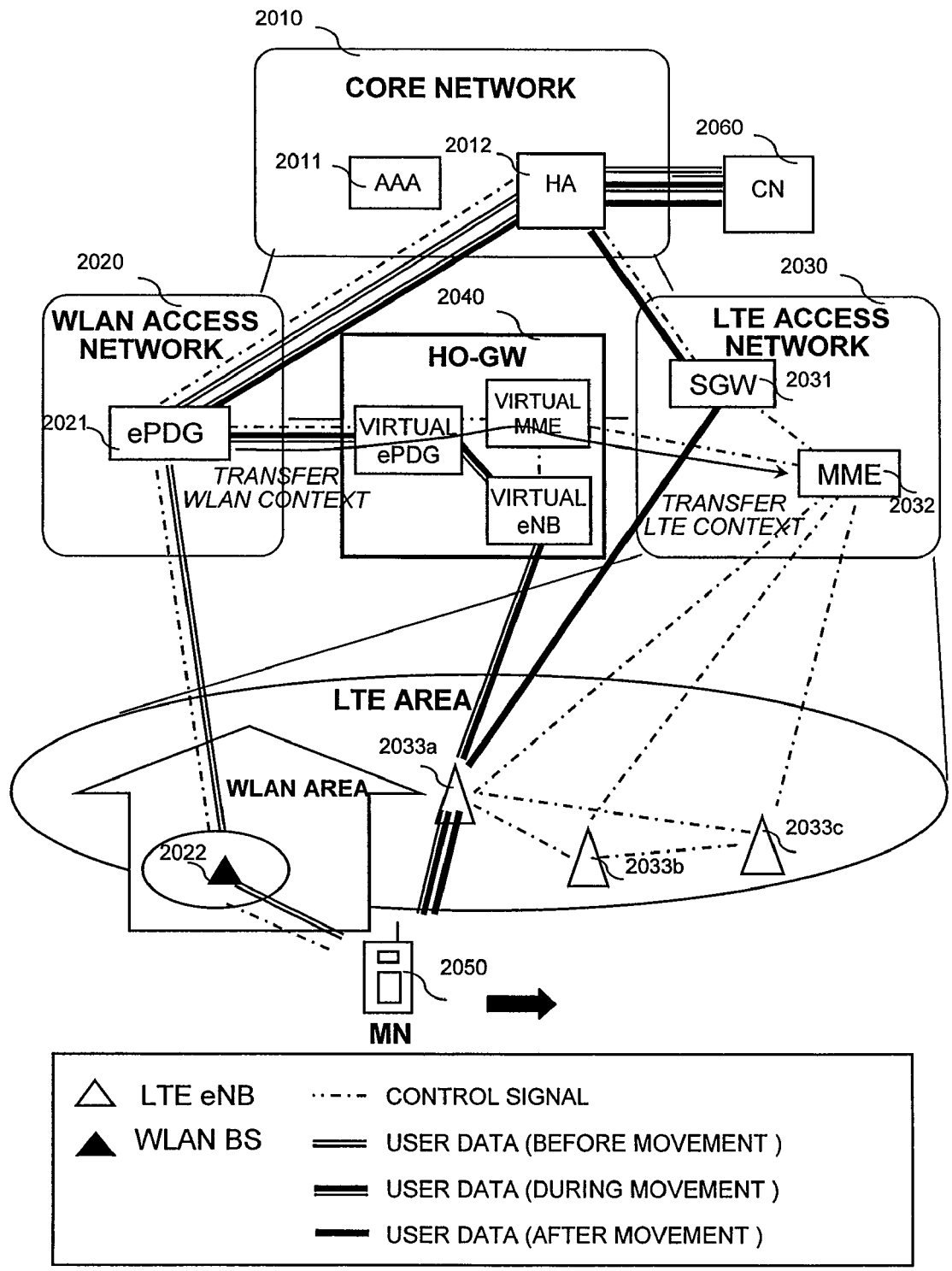
FIG. 37 is a diagram of a configuration example of a communication network in which an HO-GW is applied to an FMC environment.

FIG. 37 is a diagram of a configuration example of a communication network in which an HO-GW is applied to an FMC (Fixed Mobile Convergence) environment.

A wireless terminal MN 2050 is a terminal that has access means to both a WLAN (Wireless Local Access Network) access network 2020 and an LTE access network 2030. A communication destination apparatus CN 2060 is a terminal or a server that performs communication with the MN 2050.

A core network 2010 is a communication network that accommodates both the WLAN access network 2020 and the LTE access network 2030. A server AAA 2011 and a node HA 2012 are connected to the core network 2010. The AAA 2011 is a server that manages association between an identifier and authentication information of a terminal and authenticates the terminal. The AAA 2011 has a function of an HSS of the LTE as well and manages subscriber information and terminal position information. The HA 2012 is a node specified by the Mobile IP and manages association between an HoA and a CoA of the MN 2050.

A node (a base station) BS 2022 and an access router ePDG (evolved Packet Data Gateway) 2021 are connected to the WLAN access network 2020. The BS 2022 converts a WiMAX wireless signal from the MN 1050 into a wired signal and makes connection to the ePDG 2021 through a fixed access network such as an FTTH (Fiber To The Home).

The ePDG 2021 is an access router that accommodates the MN 2050 and is connected to the MN 2050 through an Ipsec tunnel. The ePDG 2021 has a function of a PMA of the Proxy MIP and registers an IP address thereof in the HA 2012 as the CoA on behalf of the MN 2050.

Nodes (base stations) eNBs 2033 (a to c), an access router SGW 2031, and a node MME 2032 are connected to the LTE access network 2030. The eNBs 2033 (a to c) are nodes that inter-convert an LTE wireless signal into a wired signal and transfer the wired signal. The SGW 2031 is an access router that accommodates the eNBs 2033 (a to c) and has a function of a PMA of the Proxy MIP. The SGW 2031 registers an IP address thereof in the HA 2012 (referred to as PDN-GW in the 3GPP standard) on behalf of the MN 2050. The MME 2032 is a node that manages communication session information (i.e., IDs of an eNB to which a terminal is connected and an SGW, data path information, etc.) in the LTE access network 2030.

In the third embodiment, the HO-GW 2040 is connected to both the WLAN access network 2020 and the LTE access network 2030. When the MN 2050 performs handover between access networks, the HO-GW 2040 converts a communication context of the WLAN access network 2020 and a communication context of the LTE access network 2030 each other and transfers the communication contexts. As explained in the first and second embodiments, the communication contexts include, for example, connection information (an ID of an HA) and data transfer information (tunnel information for transferring user data between the WLAN access network 2020 and the LTE access network 2030). It is possible to increase the speed of handover between access networks by transferring such context information between the access networks.

Details of operations of the handover are the same as the details explained in the second embodiment.

In the above explanation, as an example, the WiMAX access network, the UMB access network, the LTE access network, and the WLAN access network are explained. However, the present invention is not limited to handover among these networks and can be applied to handover among various heterogeneous access networks.

What is claimed is:

1. A communication system comprising:
    a first access network including plural first base stations that inter-convert a first wireless signal from a wireless terminal into a wired signal and transfer the wired signal, and a first access router that accommodates the first base stations;
    a second access network including plural second base stations that inter-convert a second wireless signal of a wireless telecommunication format different from that of the first wireless signal from the wireless terminal into a wired signal and transfer the wired signal, and a second access router that accommodates the second base stations, the second access network adopting a communication format different from that of the first access network;
    a wireless terminal that can access both the first access network and the second access network, which are heterogeneous access networks; and
    a gateway apparatus that accommodates both the first access router of the first access network and the second access router of the second access network, accommodates at least one of the first base stations and at least one of the second base stations, and inter-converts, when the wireless terminal moves between the first access network and the second access network, a handover procedure in the first access network and a handover procedure in the second access network and relays the handover procedures,
    wherein
        when the wireless terminal is connected to only the first access network and performs communication with a communication destination apparatus through the first base stations, the first access router, and a core network, the core network and the wireless terminal share an encryption key MSK according to user authentication and the wireless terminal stores first communication context information and an ID of the gateway apparatus,
        when the wireless terminal moves to the second access network side and determines handover to the second access network, the wireless terminal transmits a connection request for the handover including an ID of the wireless terminal,
        a data path between the first access router and the gateway apparatus is set by an encryption key AK_GW for protecting communication between the core network and the first access router, the encryption key AK_GW being generated by the first access router on the basis of the MSK received from the core network, data paths between the gateway apparatus and the second base stations are set by an encryption key MSK_eBS or K_eNB*+ for protecting communication between the gateway apparatus and the second base stations, the encryption key MSK_eBS or K_eNB*+ being generated by the gateway apparatus on the basis of the AK_GW transmitted from the first access router, the wireless terminal and the second base stations perform wireless data link setting on a protected communication path using an encryption key TSK_eBS or an encryption key for wireless protection for protecting communication between the wireless terminal and the second base stations, the encryption key TSK_eBS or the encryption key for wireless protection being generated by the second base stations on the basis of the MSK_eBS or the K_eNB* + received from the gateway apparatus, and the TSK_eBS or the encryption key for wireless protection generated by the wireless terminal on the basis of the MSK or authentication information subjected to key exchange with the second base stations, the wireless terminal performs communication with the communication destination apparatus through the core network, the first access router, the gateway apparatus, and the second base stations, and thereafter, the wireless terminal performs user authentication with the second access network and executes the handover to the second access network.

2. The communication system according to claim 1, wherein when the wireless terminal makes connection to the first access network, user authentication is performed and the core network and the wireless terminal share the encryption key MSK, when the wireless terminal is connected to only the first access network and performs communication with the communication destination apparatus through the first base stations, the first access router, and the core network, the wireless terminal stores first communication context information and the ID of the gateway apparatus, when the wireless terminal moves to the second access network side and determines handover to the second access network, the wireless terminal transmits a connection request for the handover including the ID of the wireless terminal and the ID of the gateway apparatus to any one of the second base stations, the first access router receives the MSK from the core network, generates, using a first algorithm set beforehand and on the basis of the MSK, the encryption key AK_GW for protecting communication between the core network and the first access router, and transmits the encryption key AK_GW to the gateway apparatus, and a data path between the first access router and the gateway apparatus is set, the gateway apparatus generates, using second and third algorithms set beforehand and on the basis of the AK_GW, an encryption key TSK_GW for protecting communication between the gateway apparatus and the wireless terminal and the encryption key MSK_eBS for protecting communication between the gateway apparatus and the second base stations, respectively, the gateway apparatus acquires first communication context information of the wireless terminal through the first base stations and the first access router, converts the first communication context information into second communication context information, and notifies the second base stations of the second communication context information including the TSK_GW and the MSK_eBS, and data paths between the gateway apparatus and the second base stations are set, the second base stations generate, using a fourth algorithm set beforehand and on the basis of the MSK_eBS included in the second communication context information, the encryption key TSK_eBS for protecting communication between the wireless terminal and the second base stations, the wireless terminal generates, using the first and second algorithms set beforehand same as those for the first access router and the gateway apparatus and on the basis of the MSK, the TSK_GW for protecting communication between the gateway apparatus and the wireless terminal, the wireless terminal generates the TSK_eBS using the first, third, and fourth algorithms set beforehand and on the basis of the MSK or the authentication information subjected to key exchange with the second base stations, and the wireless terminal and the second base stations perform wireless data link setting on the protected communication path, the wireless terminal performs communication with the communication destination apparatus through the core network, the first access router, the gateway apparatus, and the second base stations, and thereafter, the wireless terminal performs user authentication with the second access network and executes the handover to the second access network.

3. The communication system according to claim 1, wherein the second base stations notify the wireless terminal of an ID of the second access router, the wireless terminal requests the second access router, the ID of which is notified, to make connection, user authentication is performed for the second access network and an encryption key MSK_SRNC is shared between the wireless terminal and the core network, the core network notifies the second access router of the MSK_SRNC, the second access router generates, on the basis of the MSK_SRNC, an encryption key TSK_SRNC for protecting communication between the wireless terminal and the second access router, the wireless terminal generates the TSK_SRNC on the basis of the MSK_SRNC and using an algorithm same as that used by the second access router, the wireless terminal and the second access router perform setting of a wireless data link layer on the protected communication path, and the wireless terminal executes the handover to the second access network by performing communication with the communication destination apparatus through the second base stations, the second access router, and the core network.

4. The communication system according to claim 1, wherein the gateway apparatus includes:
    a first context table for storing the first communication context information, the first context table including a wireless terminal ID, connection destination information, QoS information, an encryption key, data path information, and a pointer to second communication context information, and a second context table for storing the second communication context information, the second context table including a wireless terminal ID, connection destination information, QoS information, an encryption key, data path information, and a pointer to the first communication context information, and the gateway apparatus reads out the first and second context tables and performs conversion of the first communication context information and the second context information.

5. The communication system according to claim 1, wherein the first access network establishes an application session of a first codec between the wireless terminal and the communication destination apparatus, the second access network establishes an application session of a second codec, which is different from the first codec, between the wireless terminal and the communication destination apparatus, and the gateway apparatus sets information on the first codec and the second codec in association with an access network type.

6. The communication system according to claim 1, wherein when the wireless terminal makes connection to the first access network, user authentication is performed and the core network and the wireless terminal share the encryption key MSK, when the wireless terminal is connected to only the first access network and performs communication with the communication destination apparatus through the first base stations, the first access router, and the core network, where the wireless terminal moves to the second access network side and determines handover to the second access network, the wireless terminal transmits a connection request for the handover including a moving destination information and the ID of the wireless terminal to the first base stations, the first access router receives the MSK from the core network, generates, using a first algorithm set beforehand and on the basis of the MSK, the encryption key AK_GW for protecting communication between the core network and the first access router, and transmits the encryption key AK_GW to the gateway apparatus, and a data path between the first access router and the gateway apparatus is set, the gateway apparatus generates, using a second algorithm set beforehand and on the basis of the AK_GW, an encryption key K_eNB* for protecting communication between the gateway apparatus and the second access router, the gateway apparatus acquires first communication context information of the wireless terminal through the first base stations and the first access router, converts the first communication context information into second communication context information, and notifies the second access router of the second communication context information including the K_eNB*, and data paths between the gateway apparatus and the second access router are set, the second access router generates, using a third algorithm set beforehand and on the basis of the K_eNB*, an encryption key K_eNB* + for protecting communication between the gateway apparatus and the second access router, and sends the K_eNB*+ to the second base station, the second base station generates, using a fourth algorithm set beforehand on the basis of the K_eNB* +, an encryption key for wireless protection for protecting communication between the wireless terminal and the second base station, the wireless terminal generates the encryption key for wireless protection using the first to fourth algorithms set beforehand and on the basis of the MSK or the authentication information subjected to key exchange with the second base stations, and the wireless terminal and the second base stations perform wireless data link setting on the protected communication path, the wireless terminal performs communication with the communication destination apparatus through the core network, the first access router, the gateway apparatus, and the second base stations, and thereafter, the wireless terminal performs user authentication with the second access network and executes the handover to the second access network.

7. The communication system according to claim 1, wherein the first access network is a WiMAX access network,
the second access network is a UMB access network, and
the MSK, the AK_GW, the MSK_eBS, and the TSK_eBS are used as encryption keys.

8. The communication system according to claim 1, wherein the first access network is a WiMAX access network,
the second access network is a LTE access network, and
the MSK, the AK_GW, the K_eBS *+, and the encryption key for wireless protection are used as encryption keys.

9. The communication system according to claim 1, wherein the first access network is a WLAN access network, and
the second access network is a LTE access network.

10. A communication system comprising:

a first access network including plural first base stations that inter-convert a first wireless signal from a wireless terminal into a wired signal and transfer the wired signal, and a first access router that accommodates the first base stations;

a second access network including plural second base stations that inter-convert a second wireless signal of a wireless telecommunication format different from that of the first wireless signal from the wireless terminal into a wired signal and transfer the wired signal, and a second access router that accommodates the second base stations, the second access network adopting a communication format different from that of the first access network;

a wireless terminal that can access both the first access network and the second access network, which are heterogeneous access networks; and a gateway apparatus that accommodates both the first access router of the first access network and the second access router of the second access network, accommodates at least one of the first base stations and at least one of the second base stations, and inter-converts, when the wireless terminal moves between the first access network and the second access network, a handover procedure in the first access network and a handover procedure in the second access network and relays the handover procedures, wherein when the wireless terminal is connected to the second access network and performs data communication with a communication destination apparatus through the second base stations, the second access network, and a core network, the wireless terminal and the core network share an encryption key MSK_SRNC or K_ASME according to user authentication and, when the wireless terminal moves to the first access network side and determines handover to the first access network, the wireless terminal transmits a connection request for the handover including an ID of the wireless terminal, a data path between the second access router and the gateway apparatus is set by an encryption key MSK_GW or K_eNB* for protecting communication between the second access router and the gateway apparatus, the encryption key MSK_GW or K_eNB* being generated by the second access router on the basis of the MSK_SRNC or the K_ASME received from the core network, data paths between the gateway apparatus and the first base stations are set by an encryption key AK_BS for protecting communication between the gateway apparatus and the first base stations, the encryption key AK_BS being generated by the gateway apparatus on the basis of the MSK_GW or the K_eNB* received from the second access router, the wireless terminal and the first base stations perform wireless data link setting on a protected communication path using an encryption key TEK_BS for protecting communication between the wireless terminal and the first base stations, the encryption key TEK_BS being generated by the first base stations on the basis of the AK_BS received from the gateway apparatus, and the TEK_BS generated by the wireless terminal on the basis of the MSK_SRNC or the K_ASME or authentication information subjected to key exchange with the first base stations, the wireless terminal performs communication with the communication destination apparatus through the first base stations, the gateway apparatus, the second access router, and the core network, and thereafter, the wireless terminal performs user authentication with the first access network and executes the handover to the first access network.

11. The communication system according to claim 10, wherein when the wireless terminal makes connection to the second access network, user authentication is performed and the wireless terminal and the core network share the encryption key MSK_SRNC, when the wireless terminal is connected to the second access network and performs data communication with the communication destination apparatus through the second base stations, the second access network, and the core network, the wireless terminal determines handover to the first access network and transmits a connection request for the handover including an ID of the gateway apparatus and the ID of the wireless terminal to the first base station, the second access router generates, using a fifth algorithm set beforehand and on the basis of the MSK_SRNC, the encryption key MSK_GW for protecting communication between the second access router and the gateway apparatus and notifies the gateway apparatus of the encryption key MSK_GW, and a data path between the second access router and the gateway apparatus is set, the gateway apparatus generates, using a sixth algorithm shared with the wireless terminal beforehand and on the basis of the MSK_GW, the encryption key AK_BS for protecting communication between the gateway apparatus and the first base stations and notifies the first base stations of the encryption key AK_BS, and data paths between the gateway apparatus and the first base stations are set, the first base stations generate, using a seventh algorithm set beforehand and on the basis of the AK_BS, the encryption key TEK_BS for protecting communication between the wireless terminal and the first base stations, the wireless terminal generates the TEK_BS using the fifth, sixth, and seventh algorithms set beforehand same as those used by the second access router, the gateway apparatus, and the first base stations and on the basis of the MSK_SRNC or authentication information subjected to key exchange with the first base stations, and the wireless terminal and the first base stations perform wireless data link setting on the protected communication path, the wireless terminal performs communication with the communication destination apparatus through the first base stations, the gateway apparatus, the second access router, and the core network, and thereafter, the wireless terminal performs user authentication with the first access network and executes the handover to the first access network.

12. The communication system according to claim 10, wherein when the wireless terminal makes connection to the second access network, user authentication is performed and the wireless terminal and the core network share the encryption key K_ASME, when the wireless terminal is connected to the second access network and performs data communication with the communication destination apparatus through the second base stations, the second access network, and the core network, the wireless terminal determines handover to the first access network and transmits a connection request for the handover including a moving destination information and the ID of the wireless terminal to the second base station, the second access router generates, using a fifth algorithm set beforehand and on the basis of the K_ASME, the encryption key K_eNB* for protecting communication between the second access router and the gateway apparatus and notifies the gateway apparatus of the encryption key K_eNB*, and a data path between the second access router and the gateway apparatus is set, the gateway apparatus generates, using a sixth algorithm shared with the wireless terminal beforehand and on the basis of the K_eNB*, the encryption key AK_BS for protecting communication between the gateway apparatus and the first base stations and notifies the first base stations of the encryption key AK_BS, and data paths between the gateway apparatus and the first base stations are set, the first base stations generate, using a seventh algorithm set beforehand and on the basis of the AK_BS, the encryption key TEK_BS for protecting communication between the wireless terminal and the first base stations, the wireless terminal generates the TEK_BS using the fifth, sixth, and seventh algorithms set beforehand same as those used by the second access router, the gateway apparatus, and the first base stations and on the basis of the K_ASME or authentication information subjected to key exchange with the first base stations, and the wireless terminal and the first base stations perform wireless data link setting on the protected communication path, the wireless terminal performs communication with the communication destination apparatus through the first base stations, the gateway apparatus, the second access router, and the core network, and thereafter, the wireless terminal performs user authentication with the first access network and executes the handover to the first access network.

13. The communication system according to claim 10, wherein the first access network is a WiMAX access network,
the second access network is a UMB access network, and
the MSK_SRNC, the MSK_GW, the AK_BS, and the TEK_BS are used as encryption keys.

14. The communication system according to claim 10, wherein the first access network is a WiMAX access network,
the second access network is a LTE access network, and
the K_ASME, the K_eNB *, the AK_BS, and the TEK_BS are used as encryption keys.

15. The communication system according to claim 10, wherein the wireless terminal performs user authentication in the first access network and, as a result of the user authentication, the MSK_SRNC is shared between the wireless terminal and the core network,
the core network notifies the first access router of the MSK_SRNC, and
the wireless terminal executes the handover to the first access network by performing data communication with the communication destination apparatus through the first base stations, the first access router, and the core network.

16. A gateway apparatus which:

is connected to a first access network including plural first base stations that inter-convert a first wireless signal from a wireless terminal into a wired signal and transfer the wired signal, and a first access router that accommodates the first base stations;

is connected to a second access network including plural second base stations that inter-convert a second wireless signal of a wireless telecommunication format different from that of the first wireless signal from the wireless terminal into a wired signal and transfer the wired signal, and a second access router that accommodates the second base stations, the second access network adopting a communication format different from that of the first access network;

accommodates both the first access router of the first access network and the second access router of the second access network, accommodates at least one of the first base stations and at least one of the second base stations;

inter-converts, when a wireless terminal, the wireless terminal that can access both the first access network and the second access network, which are heterogeneous access networks, moves between the first access network and the second access network, a handover procedure in the first access network and a handover procedure in the second access network and relays the handover procedures, wherein when the wireless terminal moves from the first access network to the second access network side and determines handover to the second access network, the gateway apparatus receives an encryption key AK_GW for protecting communication between a core network and the first access router, the encryption key AK_GW being generated on the basis of an encryption key MSK shared by the core network and the wireless terminal according to user authentication, the MSK received from the core network, and sets a data path between the first access router and the gate way apparatus by the AK_GW, the gateway apparatus sends an encryption key MSK_eBS or K_eNB* + for protecting communication between the gateway apparatus and the second base stations, the encryption key MSK_eBS or K_eNB* + being generated by the gateway apparatus on the basis of the AK_GW transmitted from the first access router to the second base station, and sets data paths between the gateway apparatus and the second base stations by the MSK_eBS or the K_eNB +, the wireless terminal and the second base stations perform wireless data link setting on a protected communication path using an encryption key TSK_eBS or an encryption key for wireless protection for protecting communication between the wireless terminal and the second base stations, the encryption key TSK_eBS or the encryption key for wireless protection being generated by the second base stations on the basis of the MSK_eBS or the K_eNB* + received from the gateway apparatus, and the TSK_eBS or the encryption key for wireless protection generated by the wireless terminal on the basis of the MSK or authentication information subjected to key exchange with the second base stations, the wireless terminal performs communication with a communication destination apparatus through the core network, the first access router, the gateway apparatus, and the second base stations, and thereafter, the wireless terminal performs user authentication with the second access network and executes the handover to the second access network.

17. A gateway apparatus which:

is connected to a first access network including plural first base stations that inter-convert a first wireless signal from a wireless terminal into a wired signal and transfer the wired signal, and a first access router that accommodates the first base stations;

is connected to a second access network including plural second base stations that inter-convert a second wireless signal of a wireless telecommunication format different from that of the first wireless signal from the wireless terminal into a wired signal and transfer the wired signal, and a second access router that accommodates the second base stations, the second access network adopting a communication format different from that of the first access network;

accommodates both the first access router of the first access network and the second access router of the second access network, accommodates at least one of the first base stations and at least one of the second base stations;

the gateway apparatus that inter-converts, when a wireless terminal, the wireless terminal that can access both the first access network and the second access network, which are heterogeneous access networks, moves between the first access network and the second access network, a handover procedure in the first access network and a handover procedure in the second access network and relays the handover procedures, wherein when the wireless terminal moves to the first access network side and determines handover to the first access network, the gateway apparatus receives an encryption key MSK_GW or K_eNB* for protecting communication between the second access router and the gateway apparatus, the encryption key MSK_GW or K_eNB* being generated on the basis of an encryption key MSK_SRNC or K_ASME shared by a core network, the wireless terminal and the core network according to user authentication, the MSK_SRNC or the K_ASME received from the core network, and sets a data path between the second access router and the gateway apparatus is set by the MSK_GW or the K_eNB*, the gateway apparatus sends an encryption key AK_BS for protecting communication between the gateway apparatus and the first base stations, the encryption key AK_BS being generated by the gateway apparatus on the basis of the MSK_GW or the K_eNB* received from the second access router, to the first base station, and sets data paths between the gateway apparatus and the first base stations by the AK_BS, the wireless terminal and the first base stations perform wireless data link setting on a protected communication path using an encryption key TEK_BS for protecting communication between the wireless terminal and the first base stations, the encryption key TEK_BS being generated by the first base stations on the basis of the AK_BS received from the gateway apparatus, and the TEK_BS generated by the wireless terminal on the basis of the MSK_SRNC or the K_ASME or authentication information subjected to key exchange with the first base stations, the wireless terminal performs communication with the communication destination apparatus through the first base stations, the gateway apparatus, the second access router, and the core network, and thereafter, the wireless terminal performs user authentication with the first access network and executes the handover to the first access network.

* * * * *